(12) United States Patent  
Shibata et al.

(10) Patent No.: US 11,446,201 B2  
(45) Date of Patent: Sep. 20, 2022

(54) WALKING ASSIST DEVICE

(71) Applicant: JTEKT Corporation, Kariya (JP)

(72) Inventors: Yoshiyuki Shibata, Toyota (JP); Manabu Kanaya, Nara (JP); Shinji Takeuchi, Okazaki (JP); Yuki Matsuoka, Kariya (JP); Genki Murata, Shiki-gun (JP)

(73) Assignee: JTEKT Corporation, Kariya (JP)

( * ) Notice: Subject to any disclaimer, the term of this patent is extended or adjusted under 35 U.S.C. 154(b) by 625 days.

(21) Appl. No.: 16/456,032

(22) Filed: Jun. 28, 2019

(65) Prior Publication Data

US 2020/0009003 A1 Jan. 9, 2020

(30) Foreign Application Priority Data

Jul. 4, 2018 (JP) .............................. JP2018-127847  
Jan. 31, 2019 (JP) .............................. JP2019-015811

(51) Int. Cl.  
*A61H 3/04* (2006.01)  
*B62B 5/06* (2006.01)  
(Continued)

(52) U.S. Cl.  
CPC ................. *A61H 3/04* (2013.01); *A61H 3/00* (2013.01); *A61H 2003/006* (2013.01); *A61H 2003/043* (2013.01)

(58) Field of Classification Search  
CPC ...... A61H 3/04; A61H 1/0277; A61H 1/0281; A61H 2003/043; A61H 2003/046;  
(Continued)

(56) References Cited

U.S. PATENT DOCUMENTS 6,296,263 B1 * 10/2001 Schultz .................... A61H 3/04  
280/304.5  
7,669,863 B2 * 3/2010 Steiner .................... A61H 3/04  
280/648  
(Continued)

FOREIGN PATENT DOCUMENTS

DE 10 2011 080 056 A1 1/2013  
DE 10 2016 201 743 B3 4/2017  
(Continued)

OTHER PUBLICATIONS

Extended European Search Report dated Nov. 11, 2019 in European Patent Appiication No. 19183546.1, 17 pages  
(Continued)

*Primary Examiner* — Garrett K Atkinson  
(74) *Attorney, Agent, or Firm* — Oblon, McClelland, Maier & Neustadt, L.L.P.

(57) ABSTRACT

A walking assist device has a frame, a pair of right and left arm portions, a pair of right and left grasp portions, wheels including a pair of right and left drive wheels, drive units, a battery, a drive control unit, acting force measurement units that measure acting forces on the grasp portions, and holding units that hold the grasp portions at a predetermined position in the front-rear direction of the arm portions set in advance. The walking assist device travels forward together with a user. The holding units generate a restoring force for returning the grasp portions to the predetermined position. The  
(Continued)

drive control unit controls the drive units on the basis of acting forces calculated on the basis of detection signals from the acting force measurement units.

11 Claims, 35 Drawing Sheets

(51) Int. Cl.
| | |
|---|---|
| *A63B 23/12* | (2006.01) |
| *A63B 21/00* | (2006.01) |
| *A63B 23/035* | (2006.01) |
| *A63B 23/04* | (2006.01) |
| *A61H 1/02* | (2006.01) |
| *B62B 3/00* | (2006.01) |
| *B62B 5/00* | (2006.01) |
| *B62B 5/04* | (2006.01) |
| *A63B 22/00* | (2006.01) |
| *A63B 21/005* | (2006.01) |
| *A63B 22/20* | (2006.01) |
| *A61H 3/00* | (2006.01) |

(58) Field of Classification Search
CPC .... A61H 2201/0173; A61H 2201/0176; A61H 2201/1207; A61H 2201/1215; A61H 2201/1261; A61H 2201/14; A61H 2201/1635; A61H 2201/1664; A61H 2201/1669; A61H 2201/1676; A61H 2201/5007; A61H 2201/5061; A61H 2201/5064; A61H 2201/5069; A61H 2201/5071; A61H 2201/5079; A61H 2201/5082; A61H 2201/5084; A61H 2201/5097; A61H 2203/0406; A61H 2205/06; A61H 2205/065; A61H 2230/06; A61H 2230/25; A61H 2230/50; A61H 3/00; A61H 2003/006; A63B 21/4045; A63B 21/4047; A63B 23/03516; A63B 23/03533; A63B 23/03575; A63B 23/04; A63B 23/12; A63B 23/1209; A63B 21/0058; A63B 21/4035; A63B 22/0012; A63B 22/20; A63B 23/0405; A63B 2022/0094; A63B 21/023; A63B 21/0414; A63B 21/05; A63B 21/055; A63B 2220/13; A63B 2220/51; B62B 3/00; B62B 5/06; B62B 5/004; B62B 5/0069; B62B 5/0404; B62B 5/0043; B62B 5/0073; G01L 5/22; G01L 5/00
See application file for complete search history.

(56) References Cited

U.S. PATENT DOCUMENTS

| | | | |
|---|---|---|---|
| 7,708,120 B2* | 5/2010 | Einbinder | F16C 1/10 188/2 A |
| 7,900,940 B1* | 3/2011 | Vidmar | A61H 3/008 280/271 |
| 8,007,409 B2* | 8/2011 | Ellis | A63B 21/0616 482/54 |
| 8,627,909 B2* | 1/2014 | Chang | A61H 3/04 180/19.2 |
| 9,770,377 B2* | 9/2017 | Isozumi | A61G 5/14 |
| 10,765,586 B2* | 9/2020 | Liang | A61H 1/00 |
| 10,874,562 B2* | 12/2020 | Liang | A61G 5/1059 |
| 2007/0194547 A1* | 8/2007 | Steiner | A61H 3/04 280/87.021 |
| 2008/0129016 A1* | 6/2008 | Willis | A61G 5/08 280/639 |
| 2009/0045021 A1* | 2/2009 | Einbinder | B60T 17/22 74/502.2 |
| 2009/0298653 A1* | 12/2009 | Rodetsky | A61H 3/04 280/200 |
| 2010/0083994 A1* | 4/2010 | Liu | A61G 5/02 135/67 |
| 2012/0000496 A1* | 1/2012 | Razon | A61H 3/04 135/85 |
| 2012/0187661 A1* | 7/2012 | Kim | A61H 3/04 280/47.38 |
| 2015/0066275 A1 | 3/2015 | Masaki et al. | |
| 2017/0326019 A1* | 11/2017 | Bramsiepe | B62B 5/064 |
| 2019/0290513 A1* | 9/2019 | Liang | A61G 5/1059 |
| 2019/0290958 A1* | 9/2019 | Shahriar | A63B 23/03516 |
| 2020/0352815 A1* | 11/2020 | Raja | B60B 19/003 |
| 2021/0155278 A1* | 5/2021 | Raja | B62B 5/0036 |

FOREIGN PATENT DOCUMENTS

| | | |
|---|---|---|
| EP | 2 845 785 A1 | 3/2015 |
| EP | 2 851 055 A1 | 3/2015 |
| JP | 5-329186 | 12/1993 |
| JP | 2009-106446 | 5/2009 |
| JP | 2017-121820 A | 7/2017 |
| KR | 10-0717397 B1 | 5/2007 |
| WO | WO 201 6/136370 A1 | 9/2016 |

OTHER PUBLICATIONS

Partial European Search Report dated Sep. 25, 2019 in European Patent Application No. 191835461, 17 pages \* cited by examiner

WALKING ASSIST DEVICE

INCORPORATION BY REFERENCE

The disclosures of Japanese Patent Applications No. 2018-127847 and No. 2019-015811 respectively filed on Jul. 4, 2018 and Jan. 31, 2019, each including the specification, drawings and abstract, are incorporated herein by reference in their entireties.

BACKGROUND OF THE INVENTION

1. Field of the Invention

The present invention relates to a walking assist device.

2. Description of the Related Art

In order for a user that can walk on his/her own to perform training for high-quality natural walk, it is very important that the user swings his/her arms correctly in synchronization with his/her legs in a correct posture with his/her body trunk straight without leaning on a walker.

Japanese Patent Application Publication No. 2009-106446 (JP 2009-106446 A), for example, describes a walking cart 110 (corresponding to the "walking assist device") that includes a pair or right and left front wheels 160F, rear wheels 160B, main frames 140, side frames 130, sliders 122, handles 120, and connecting rods 132 as illustrated in FIG. 32. The sliders 122, to which the handles 120 are fixed, are slidable back and forth along the side frames 130. The sliders 122 are connected to the rear wheels 160B via the connecting rods 132. Consequently, when a user slides the right and left sliders 122 alternately back and forth by walking while grasping the right and left handles 120 with his/her right and left hands and swinging his/her arms, the right and left rear wheels 160B are rotationally driven. That is, the walking cart moves together with the user who walks while swinging his/her arms, and the power source of the walking cart is the force of the user to swing his/her arms back and forth.

Japanese Patent Application Publication No. 5-329186 (JP 5-329186 A) describes a walking helping device 210 (corresponding to the "walking assist device") that includes a mobile body 250 (corresponding to the "frame"), wheels 260FR and 260FL, a driven wheel 260R, grips 220R and 220L (corresponding to the "handles") to be grasped by a user, force detectors 234R and 234L that detect a force in the walking direction, a power source 200B, and a controller 240 as illustrated in FIG. 33. With the walking helping device 210, when the user moves the grips 220R and 220L in the direction he/she desires while grasping the grips 220R and 220L, a force applied to the grips 220R and 220L is detected by the force detectors 234R and 234L to be transmitted to the controller 240. The controller 240 controls the speed of the walking helping device 210 in accordance with the applied force.

In the walking cart 110 described in JP 2009-106446 A, as illustrated in FIG. 32, the width of front-rear swing of the arms is fixed by a link mechanism constituted by the handles 120, the sliders 122, the connecting rods 132, and the rear wheels 160B, irrespective of the stride length. Thus, it is difficult for the user to adjust motion of the legs (stride length) and motion of the arms (arm swing width) in conjunction with each other. In order to perform training for high-quality natural walk, the timing of arm swing preferably matches the walking pitch of the user. Since the force of the user to swing his/her arms back and forth is the power source of the walking cart 110, a relatively large load acts on the user. While the walking cart 110 is suitable to recover the function of swinging arms powerfully, the walking cart 110 is not suitable for training for high-quality natural walk, in which the user swings his/her arms correctly in synchronization with his/her legs in a correct posture with his/her body trunk straight without leaning on a walker.

In the walking helping device 210 described in JP 5-329186 A, meanwhile, a power source is provided, and thus a relatively small load acts on the user. However, the user cannot swing his/her arms correctly in synchronization with his/her legs, and thus the walking helping device 210 is not suitable for training for high-quality natural walk, in which the user swings his/her arms correctly in synchronization with his/her legs in a correct posture with his/her body trunk straight without leaning on a walker.

SUMMARY OF THE INVENTION

It is an object of the present invention to provide a walking assist device that can reduce a burden on a user, and that can assist the user in performing training for high-quality natural walk, in which the user swings his/her arms correctly in synchronization with his/her legs in a correct posture with his/her body trunk straight.

An aspect of the present invention provides a walking assist device including:
- a frame;
- a pair of right and left arm portions provided on the frame;
- a pair of right and left grasp portions provided on the pair of right and left arm portions, the grasp portions being graspable by a user and movable in a front-rear direction with respect to the frame;
- a plurality of wheels provided at a lower end of the frame and including a pair of right and left drive wheels;
- drive units that drive the respective drive wheels to cause the walking assist device to travel forward;
- a battery that serves as a power source for the drive units;
- a drive control unit that controls the drive units;
- acting force measurement units that measure acting forces on the respective grasp portions; and
- holding units that hold the respective grasp portions at a predetermined position set in advance with respect to the frame.

The walking assist device travels forward together with the user who walks while grasping the grasp portions and swinging his/her arms.

The holding units generate a restoring force for returning the respective grasp portions, which have been displaced from the predetermined position by arm swing by the user, to the predetermined position. The drive control unit controls the drive units on the basis of the acting forces which are calculated on the basis of detection signals from the acting force measurement units.

The walking assist device according to the aspect described above can be caused to operate in accordance with the state of arm swing by the user, and to travel forward as the user walks, by controlling the drive units in accordance with the acting forces which are input to the grasp portions which are grasped by the user. Thus, it is possible to reduce a burden on the user. The arm swing width is not fixed, and it is only necessary for the user to swing his/her arms with a natural swing width that matches his/her own stride length. Thus, it is possible to appropriately assist the user in performing training for high-quality natural walk, in which the user swings his/her arms correctly in synchronization with his/her legs in a correct posture with his/her body trunk straight.

In the walking assist device according to the aspect described above, the acting force measurement units may each include a forward acting force detection unit that detects a forward acting force which is an acting force directed forward and input to the corresponding grasp portion, and a rearward acting force detection unit that detects a rearward acting force which is an acting force directed rearward and input to the corresponding grasp portion; and the drive control unit may control the drive units on the basis of a grasp portion acting force which is the acting force which is based on a difference between the forward acting force which is detected using the forward acting force detection unit and the rearward acting force which is detected using the rearward acting force detection unit.

With the walking assist device according to the aspect described above, it is possible to eliminate a grasping force with which the user grasps the grasp portion, and to acquire only the grasp portion acting force which is the acting force which is input to the grasp portion.

In the walking assist device according to the aspect described above, the drive control unit may determine whether or not the user is walking while swinging his/her arms on the basis of a difference between a magnitude of a right grasp portion acting force which is the grasp portion acting force which is input to the right grasp portion and a magnitude of a left grasp portion acting force which is the grasp portion acting force which is input to the left grasp portion, and control the drive units on the basis of a determination result.

With the walking assist device according to the aspect described above, it is possible to vary drive control for the drive wheels of the walking assist device between a case where the user is walking while swinging his/her arms and a case where the user is not walking while swinging his/her arms.

In the walking assist device according to the aspect described above, the drive control unit may control the drive units, in the case where the determination result indicates that the user is walking while swinging his/her arms, so as to reduce meandering of the walking assist device caused along with arm-swing walk of the user.

The walking assist device according to the aspect described above can be caused to travel forward with higher straight driving stability by suppressing meandering of the walking assist device due to arm swing by the user.

In the walking assist device according to the aspect described above, the arm portions may be provided with respective grasp portion restraint units configured to restrain the grasp portions, which are held at the predetermined position by the restoring force of the holding units, at the predetermined position in the front-rear direction with respect to the frame.

The walking assist device according to the aspect described above can conveniently be used as a type of a walker to be pushed with both hands of the user without swinging his/her arms, with the grasp portions restrained with respect to the frame.

In the walking assist device according to the aspect described above, the grasp portion restraint units may be set to one of a restrained state, in which the grasp portions are restrained at the predetermined position, and a released state, in which the grasp portions are released rather than being restrained at the predetermined position; and the drive control unit may control the drive units on the basis of the acting forces which are calculated on the basis of the detection signals from the acting force measurement units in the case where the grasp portion restraint units are set to the restrained state.

The user can easily drive the walking assist device according to the aspect described above by only pushing the grasp portions forward, even without swinging his/her arms, in the restrained state.

Another aspect of the present invention provides a walking assist device including:

a frame;

a pair of right and left arm portions provided on the frame;

a pair of right and left grasp portions provided on the pair of right and left arm portions, the grasp portions being graspable by a user and movable in a front-rear direction with respect to the frame;

a plurality of wheels provided at a lower end of the frame and including a pair of right and left drive wheels;

drive units that drive the respective drive wheels to cause the walking assist device to travel forward;

a battery that serves as a power source for the drive units;

a drive control unit that controls the drive units;

grasp portion position detection units that detect positions of the respective grasp portions with respect to the frame; and holding units that hold the respective grasp portions at a predetermined position set in advance with respect to the frame.

The walking assist device travels forward together with the user who walks while grasping the grasp portions and swinging his/her arms. The holding units generate a restoring force for returning the respective grasp portions, which have been displaced from the predetermined position by arm swing by the user, to the predetermined position. The drive control unit controls the drive units on the basis of the positions of the respective grasp portions which are calculated on the basis of detection signals from the grasp portion position detection units.

The walking assist device according to the aspect described above can be caused to operate in accordance with the state of arm swing by the user, and to travel forward as the user walks, by controlling the drive units in accordance with the positions of the grasp portions, which are grasped by the user, with respect to the frame. Thus, it is possible to reduce a burden on the user. The arm swing width is not fixed, and it is only necessary for the user to swing his/her arms with a natural swing width that matches his/her own stride length. Thus, it is possible to appropriately assist the user in performing training for high-quality natural walk, in which the user swings his/her arms correctly in synchronization with his/her legs in a correct posture with his/her body trunk straight.

In the walking assist device according to the aspect described above, the drive control unit may calculate a user front-rear position, which is a position of the user in the front-rear direction with respect to the frame, on the basis of a right grasp portion front-rear position, which is a position of the right grasp portion in the front-rear direction with respect to the frame, and a left grasp portion front-rear position, which is a position of the left grasp portion in the front-rear direction with respect to the frame, the right grasp portion front-rear position and the left grasp portion front-rear position being calculated using the respective grasp portion position detection units, and control the drive units such that the user front-rear position approximates a predetermined position in the front-rear direction with respect to the frame.

With the walking assist device according to the aspect described above, rearward or forward displacement of the walking assist device relative to the user is prevented appropriately in the case where the speed of forward travel of the walking assist device is lower or higher than the walking speed of the user. Thus, the position, in the front-rear direction, of the walking assist device with respect to the user can be maintained at an appropriate position.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
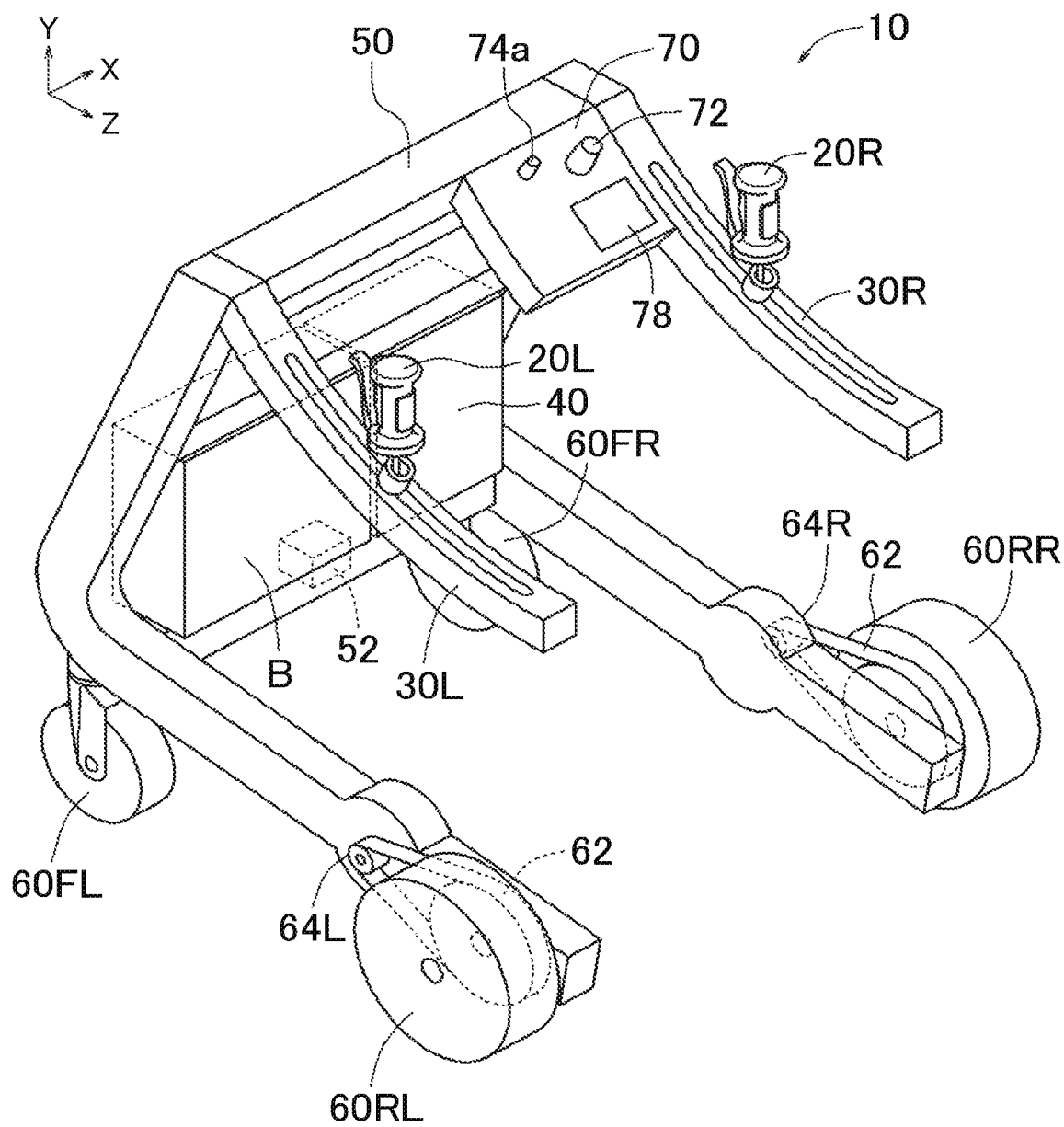
FIG. 1 is a perspective view illustrating an overall configuration of a walking assist device.

An embodiment of the present invention will be described below with reference to the drawings. The X axis, the Y axis, and the Z axis in the drawings are orthogonal to each other. In FIG. 1, the Z-axis direction indicates the direction from a front wheel 60FR to a rear wheel 60RR, and the X-axis direction indicates the direction from the left to the right in a frame 50. In the frame 50, the X-axis direction is referred to as "right", the direction opposite to the X-axis direction is referred to as "left", the direction opposite to the Z-axis direction is referred to as "front", and the Z-axis direction is referred to as "rear". In addition, the Y-axis direction is referred to as "upper", and the direction opposite to the Y-axis direction is referred to as "lower".

A schematic configuration of a first embodiment will be described with reference to FIG. 1. FIG. 1 illustrates a walking assist device 10 according to the present embodiment. The walking assist device 10 has handles 20R and 20L (corresponding to the "grasp portions"), rails 30R and 30L (corresponding to the "arm portions"), a drive control unit 40, the frame 50, front wheels 60FR and 60FL (corresponding to the "wheels"), rear wheels 60RR and 60RL (corresponding to the "drive wheels"), drive units 64R and 64L (e.g. electric motors), a control panel 70, and a battery B.

As illustrated in FIG. 1, the frame 50 is shaped symmetrically in the right-left direction. A user enters a space between the rail 30R and the rail 30L from the open side of the frame 50, and operates the walking assist device 10. The front wheels 60FR and 60FL are driven wheels (turnable caster wheels) provided at the lower front end of the frame 50. The rear wheels 60RR and 60RL are drive wheels provided at the lower rear end of the frame 50 to cause the walking assist device 10 to travel forward, and are driven by the drive units 64R and 64L, respectively, via belts 62. In the example illustrated in FIG. 1, a pair of right and left rear wheels are provided as the drive wheels, and are independently driven by the drive units 64R and 64L, respectively.

The rail 30R and the rail 30L are provided on the right side and the left side, respectively, of the frame 50. The rails 30R and 30L are provided with the handles 20R and 20L, respectively, which can be grasped by the user. The handles 20R and 20L are movable back and forth within the movable range in the rails 30R and 30L, respectively, in accordance with swing of the arms performed during walk of the user. A pair of right and left rails and handles are provided.

The frame 50 is provided with an angular speed sensor 52. The angular speed sensor 52 measures the angular speed (yaw angular speed) of rotation about the Y axis, and outputs a signal that matches the measured angular speed to the drive control unit 40.

As illustrated in FIG. 1, the control panel 70 is provided at a position at which the control panel 70 is easily operable by the user at the upper portion of the frame 50, for example. The control panel 70 has a main switch 72, an assist amount adjustment volume 74a, and a monitor 78.

The main switch 72 is a main switch of the walking assist device 10. When the main switch 72 is turned on, power is supplied from the battery B to the drive control unit 40 and the drive units 64R and 64L to enable operation of the walking assist device 10.

The assist amount adjustment volume 74a is a volume control for adjusting an amplification coefficient k. The monitor 78 is a monitor that displays a variety of states, and displays the charge amount of the battery B, the settings for the various modes, the state of operation, etc., for example.

The drive units 64R and 64L generate drive torque TrqR and TrqL, which is based on the amplification coefficient k and a force with which the user intends to cause the walking assist device to travel forward, for the rear wheels 60RR and 60RL (drive wheels), respectively.

Figure 2:
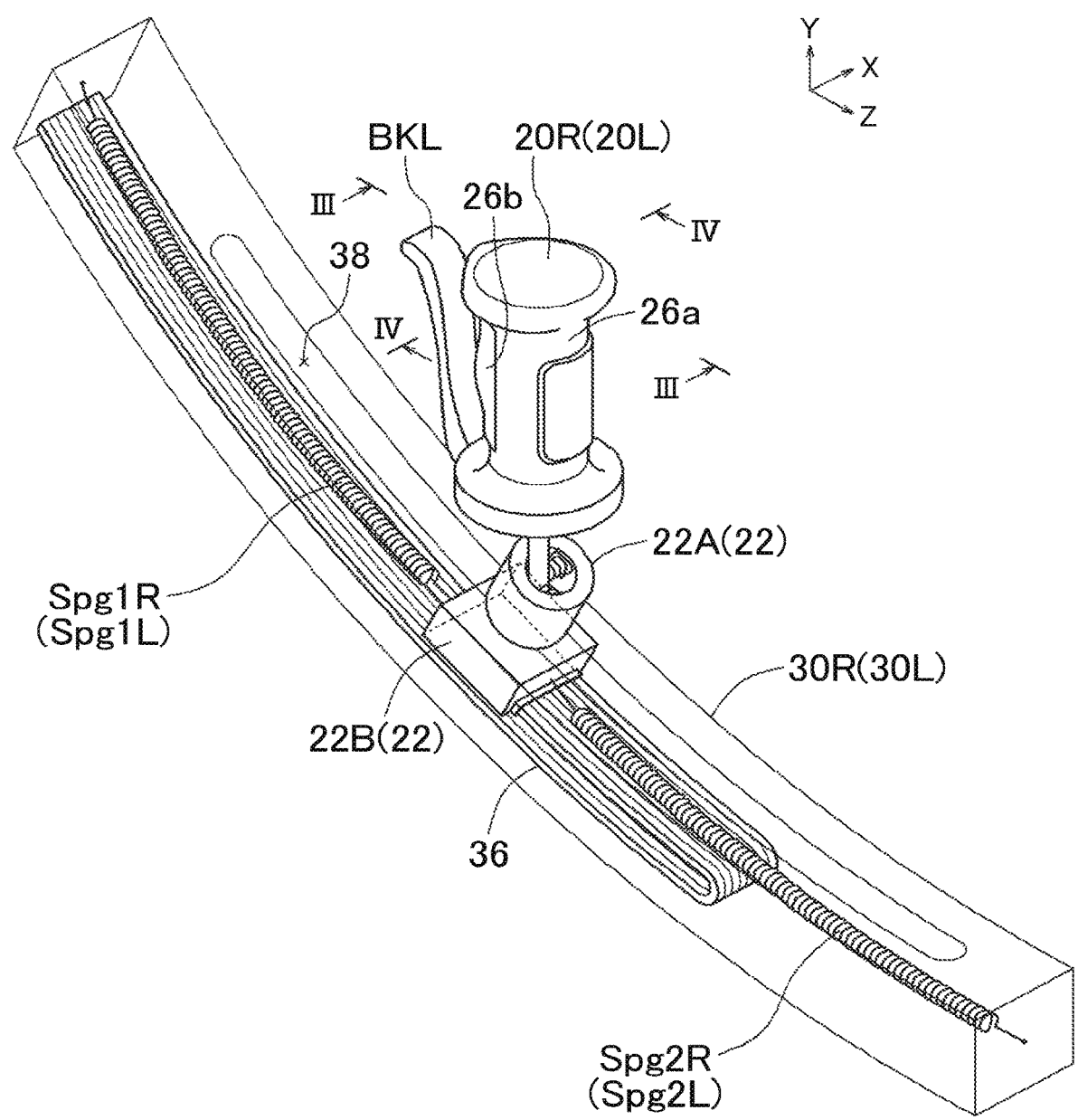
FIG. 2 is a perspective view illustrating a configuration and a function of a handle and a rail according to a first embodiment.
Figure 3:
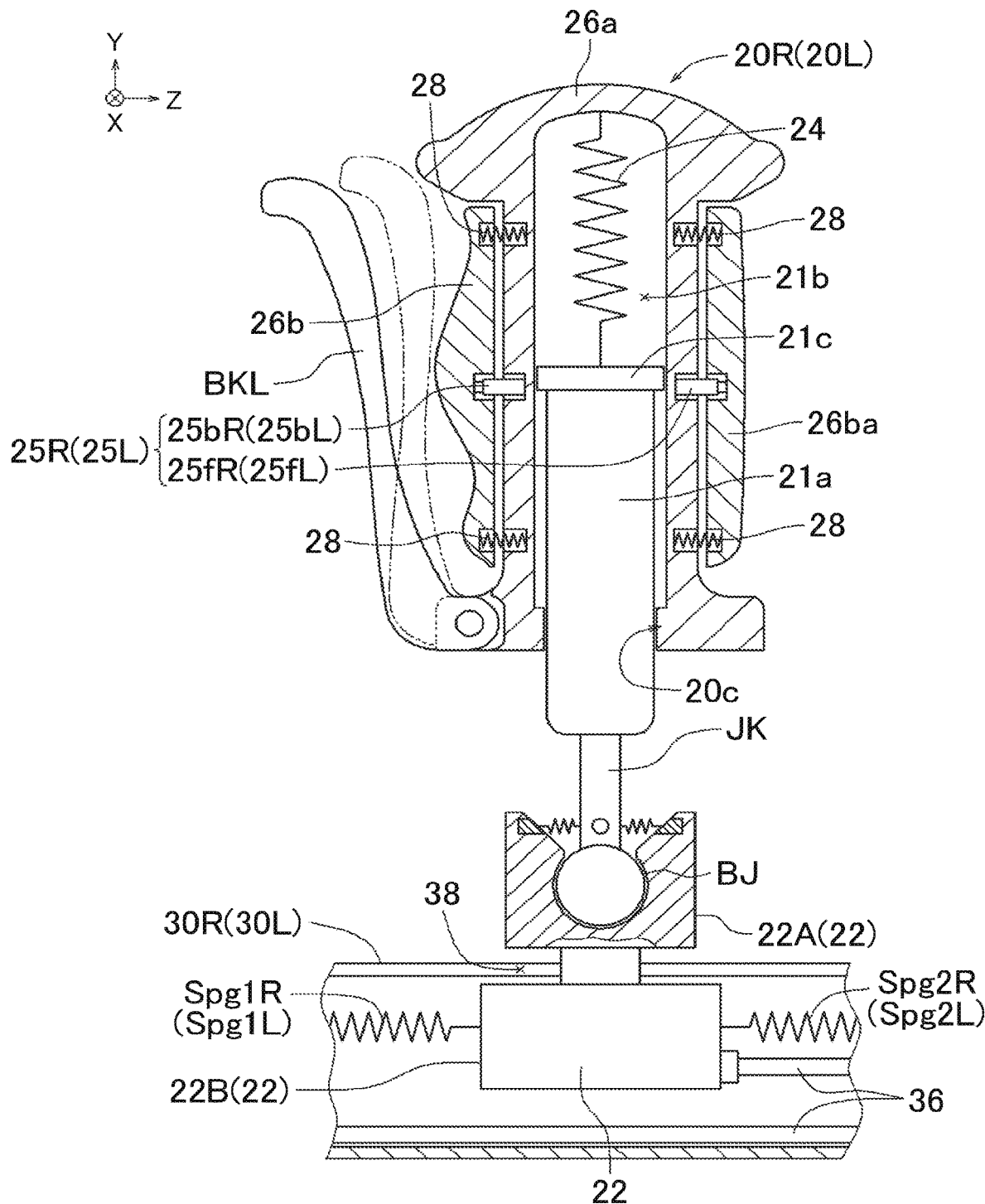
FIG. 3 is a sectional view of a handle as seen in the direction in FIG. 2.
Figure 4:
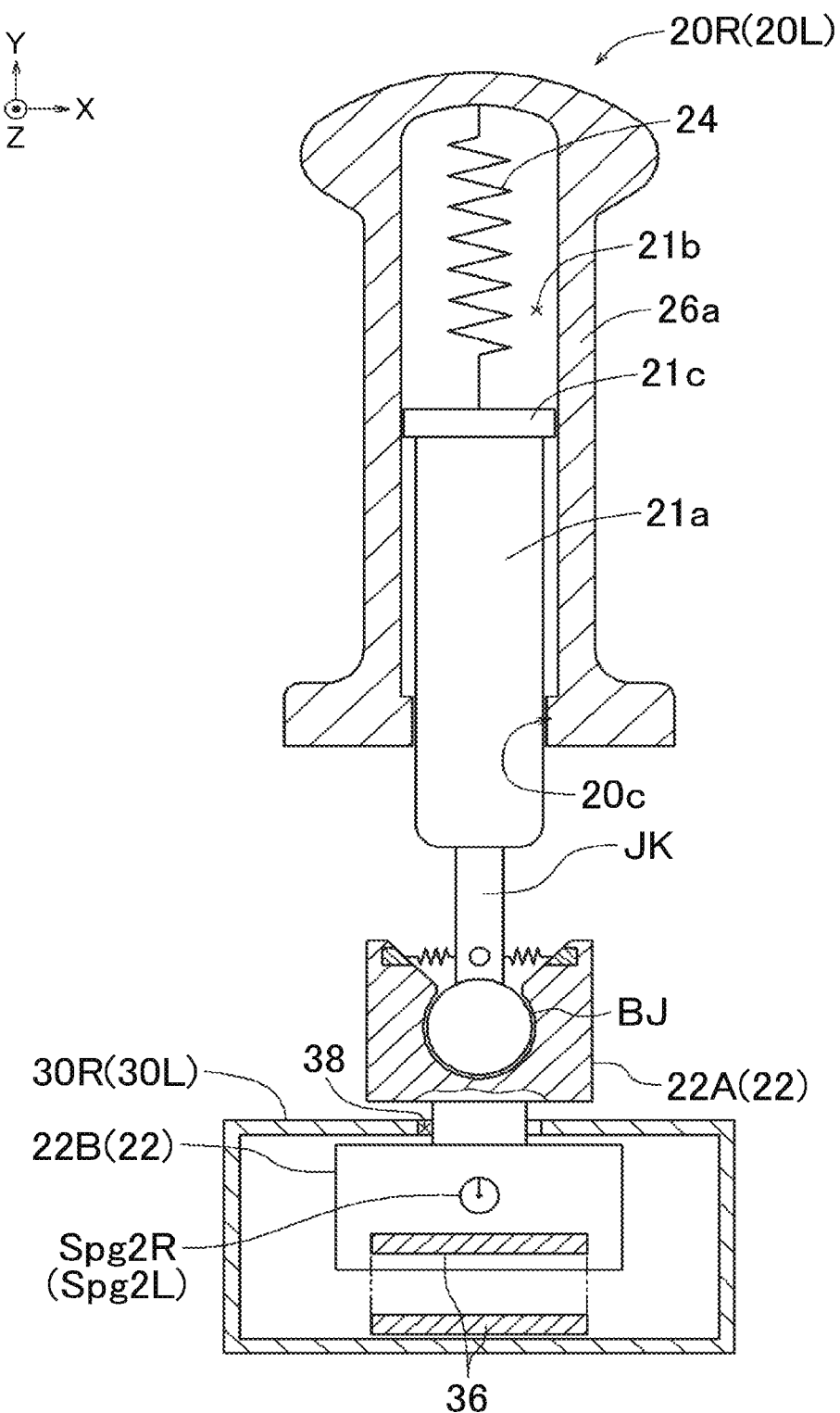
FIG. 4 is a sectional view of the handle as seen in the IV-IV direction in FIG. 2.

The structure of the walking assist device 10 will be described in detail with reference to FIGS. 2 to 4. The walking assist device 10 has a symmetrical structure between the right and the left of the frame 50 except for the control panel 70, the drive control unit 40, the angular speed sensor 52, and the battery B. Therefore, the structure on the right side will be mainly described, rather than the structure on the left side. FIG. 2 is a perspective view illustrating the configuration and the function of the handle 20R and the rail 30R. FIG. 3 is a sectional view of the handle 20R as seen in the III-III direction in FIG. 2. FIG. 4 is a sectional view of the handle 20R as seen in the IV-IV direction in FIG. 2.

As illustrated in FIG. 2, the rail 30R (30L) is provided with the handle 20R (20L). As illustrated in FIG. 3, the handle 20R has a handle shaft portion 21a, a shaft portion fitting hole 21b, a slider 22, a grip portion 26a, switch grip portions 26b and 26ba, and a brake lever BKL. The slider 22 is composed of a handle holding portion 22A and an anchor portion 22B.

As illustrated in FIG. 3, one end of an urging unit 24 is connected to the handle shaft portion 21a, and the other end thereof is connected to the bottom portion of the shaft portion fitting hole 21b. A flange portion 21c that extends in the circumferential direction is provided at the end portion of the handle shaft portion 21a to which the urging unit 24 is connected. An inner flange portion 20c is provided on an inside wall surface at an opening of the shaft portion fitting hole 21b. Consequently, the grip portion 26a is slidable up and down along the longitudinal direction of the handle shaft portion 21a without separating from the handle shaft portion 21a. That is, the handle 20R has an telescopic mechanism that enables expansion and contraction in the projecting direction.

A handle support shaft JK is provided on the side of the handle shaft portion 21a to which the urging unit 24 is not connected. The distal end of the handle support shaft JK is formed in a generally spherical shape, and forms a ball joint together with a recess provided in the handle holding portion 22A. Consequently, the handle 20R is tiltable to the front, rear, right, and left within a range defined by an opening with respect to the handle holding portion 22A (see FIGS. 3 and 4).

As illustrated in FIG. 3, the switch grip portions 26b and 26ba are provided such that a predetermined gap is formed between the grip portion 26a and the switch grip portions 26b and 26ba by grip urging units 28 (e.g. springs).

An acting force measurement unit 25R has a forward acting force detection unit 25fR and a rearward acting force detection unit 25bR. The acting force measurement unit 25R measures an acting force input to the right handle 20R. An acting force measurement unit 25L has a forward acting force detection unit 25fL and a rearward acting force detection unit 25bL. The acting force measurement unit 25L measures an acting force input to the left handle 20L.

The forward acting force detection units 25fR and 25fL and the rearward acting force detection units 25bR and 25bL are each a pressure sensor that detects an acting force (pressure) input to the handles 20R and 20L, respectively. The forward acting force detection units 25fR and 25fL and the rearward acting force detection units 25bR and 25bL may each be a load sensor that detects a load.

The forward acting force detection unit 25fR detects a forward acting force which is an acting force (pressure) directed forward and input to the corresponding right handle 20R. The rearward acting force detection unit 25bR detects a rearward acting force which is an acting force (pressure) directed rearward and input to the corresponding right handle 20R. The forward acting force detection unit 25fL detects a forward acting force which is an acting force (pressure) directed forward and input to the corresponding left handle 20L. The rearward acting force detection unit 25bL detects a rearward acting force which is an acting force (pressure) directed rearward and input to the corresponding left handle 20L.

The forward acting force detection unit 25fR is turned on when the user grasps the right handle 20R and a pressure is applied with the switch grip portion 26ba moved toward the grip portion 26a, and outputs a signal that matches the applied pressure (a rear pressure FRb on the right handle) (see FIG. 6). The forward acting force detection unit 25fR is turned off when a pressure is not applied. The forward acting force detection unit 25fL is turned on when the user grasps the left handle 20L and a pressure is applied with the switch grip portion 26ba moved toward the grip portion 26a, and outputs a signal that matches the applied pressure (a rear pressure FLb on the left handle) (see FIG. 6). The forward acting force detection unit 25fL is turned off when a pressure is not applied.

The rearward acting force detection unit 25bR is turned on when the user grasps the right handle 20R and a pressure is applied with the switch grip portion 26b moved toward the grip portion 26a, and outputs a signal that matches the applied pressure (a front pressure FRf on the right handle) (see FIG. 6). The rearward acting force detection unit 25bR is turned off when a pressure is not applied. The rearward acting force detection unit 25bL is turned on when the user grasps the left handle 20L and a pressure is applied with the switch grip portion 26b moved toward the grip portion 26a, and outputs a signal that matches the applied pressure (a front pressure FLf on the left handle) (see FIG. 6). The rearward acting force detection unit 25bL is turned off when a pressure is not applied.

One end of the brake lever BKL is connected to the lower front side of the grip portion 26a. A mechanism that locks rotation of the front wheels 60FR and 60FL and the rear wheels 60RR and 60RL when the brake lever BKL is grasped and pulled toward the grip portion 26a by the user, that maintains the locked state, and unlocks such rotation when the brake lever BKL is further pulled is provided (not illustrated).

As illustrated in FIG. 2, the rail 30R is shaped to be concavely curved upward, and has a rail slit portion 38 that opens upward and that extends along the front-rear direction. As illustrated in FIGS. 2 and 3, one end of a holding unit Spg1R (Spg1L) is connected to the front end of the rail 30R (30L), and the other end of the holding unit Spg1R (Spg1L) is connected to the front end surface of the anchor portion 22B. One end of a holding unit Spg2R (Spg2L) is connected to the rear end of the rail 30R (30L), and the other end of the holding unit Spg2R (Spg2L) is connected to the rear end surface of the anchor portion 22B. Examples of the holding units Spg1R and Spg2R include elastic members such as springs.

The holding units Spg1R and Spg2R (Spg1L and Spg2L) hold the handle 20R (20L) at a predetermined position set in advance in the front-rear direction of the rail 30R (30L) using an elastic force. The holding units Spg1R and Spg2R (Spg1L and Spg2L) generate a restoring force that returns the handle 20R (20L), which has been displaced from the predetermined position by arm swing by the user, to the predetermined position. The handle 20R (20L) is moved on the rail 30R (30L) with a constricted portion that connects between the handle holding portion 22A and the anchor portion 22B sliding in the rail slit portion 38. Consequently, the user can move the handle 20R (20L), which is provided on the rail 30R (30L), in the front-rear direction along the rail 30R (30L) (see FIGS. 1 and 2). When the user releases the handle 20R (20L), the handle 20R (20L) is returned to the predetermined position on the rail 30R (30L).

A signal cable 36 transfers detection signals from the forward acting force detection units 25fR and 25fL and the rearward acting force detection units 25bR and 25bL to the drive control unit 40 with one end of the signal cable 36 connected to the anchor portion 22B and with the other end thereof connected to the drive control unit 40. The signal cable 36 may be a cable that is flexible such as a flexible cable, for example.

Figure 5:
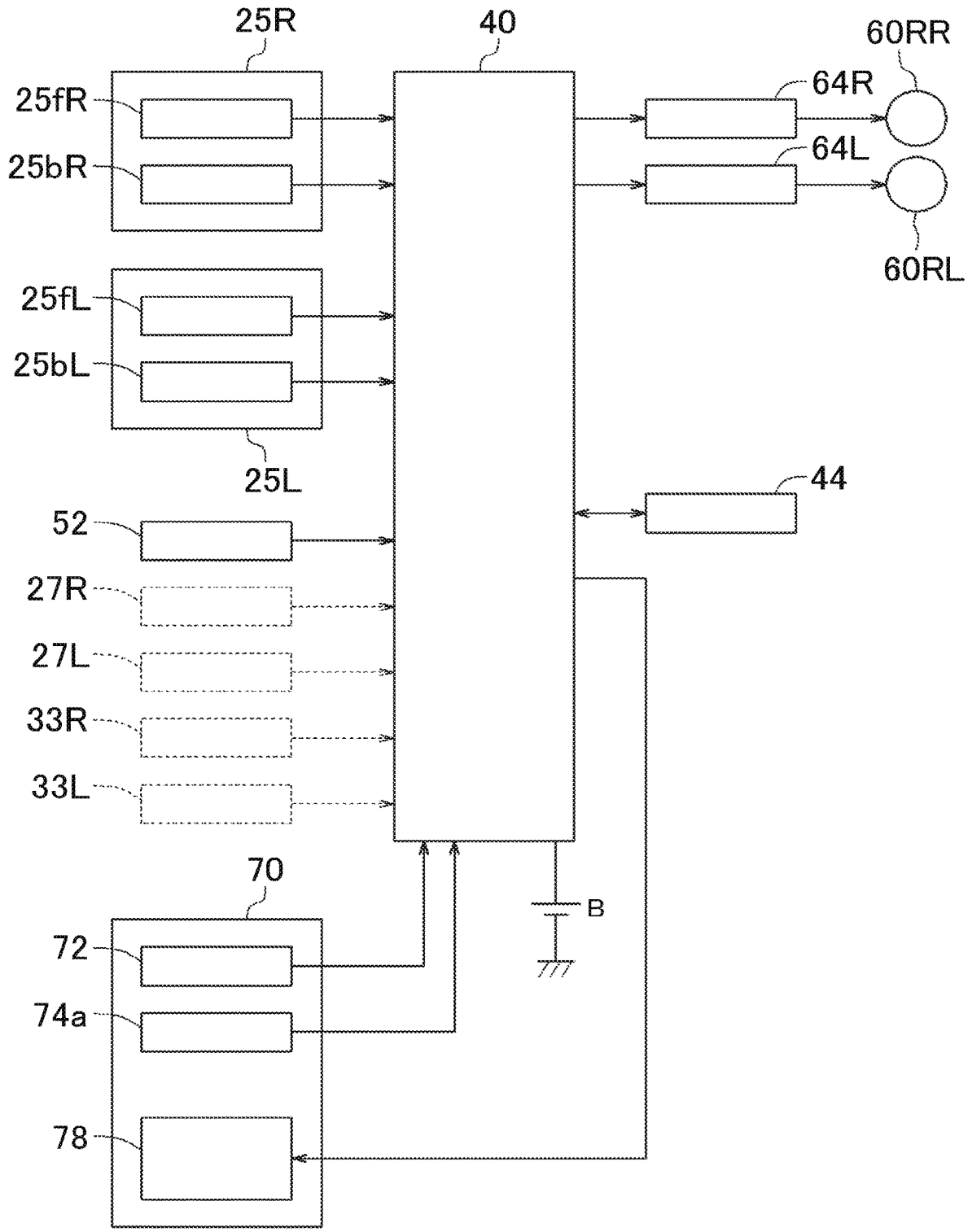
FIG. 5 is a block diagram illustrating inputs and outputs of a drive control unit of the walking assist device.

The function and operation of the walking assist device 10 (see FIG. 1) will be described in detail with reference to FIGS. 5 to 8. FIG. 5 is a block diagram illustrating inputs and outputs of the drive control unit 40 (e.g. a control device that includes a CPU) of the walking assist device 10. As illustrated in FIG. 5, the drive control unit 40 controls the drive units 64R and 64L on the basis of information input from the acting force measurement units 25R (25fR and 25bR) and 25L (25fL and 25bL) and information input from the angular speed sensor 52 and the control panel 70. A storage unit 44 is a unit that stores information, and stores and reads information in response to a request from the drive control unit 40. Signals are input to the drive control unit 40 from the main switch 72 and the assist amount adjustment volume 74a of the control panel 70, and an image signal etc. is output from the drive control unit 40 to the monitor 78. Grasp portion position detection units 27R and 27L and grasp portion inclination detection units 33R and 33L are used in a second embodiment to be discussed later. Therefore, such units are not described here, and will be described in relation to the second embodiment.

Figure 6A:
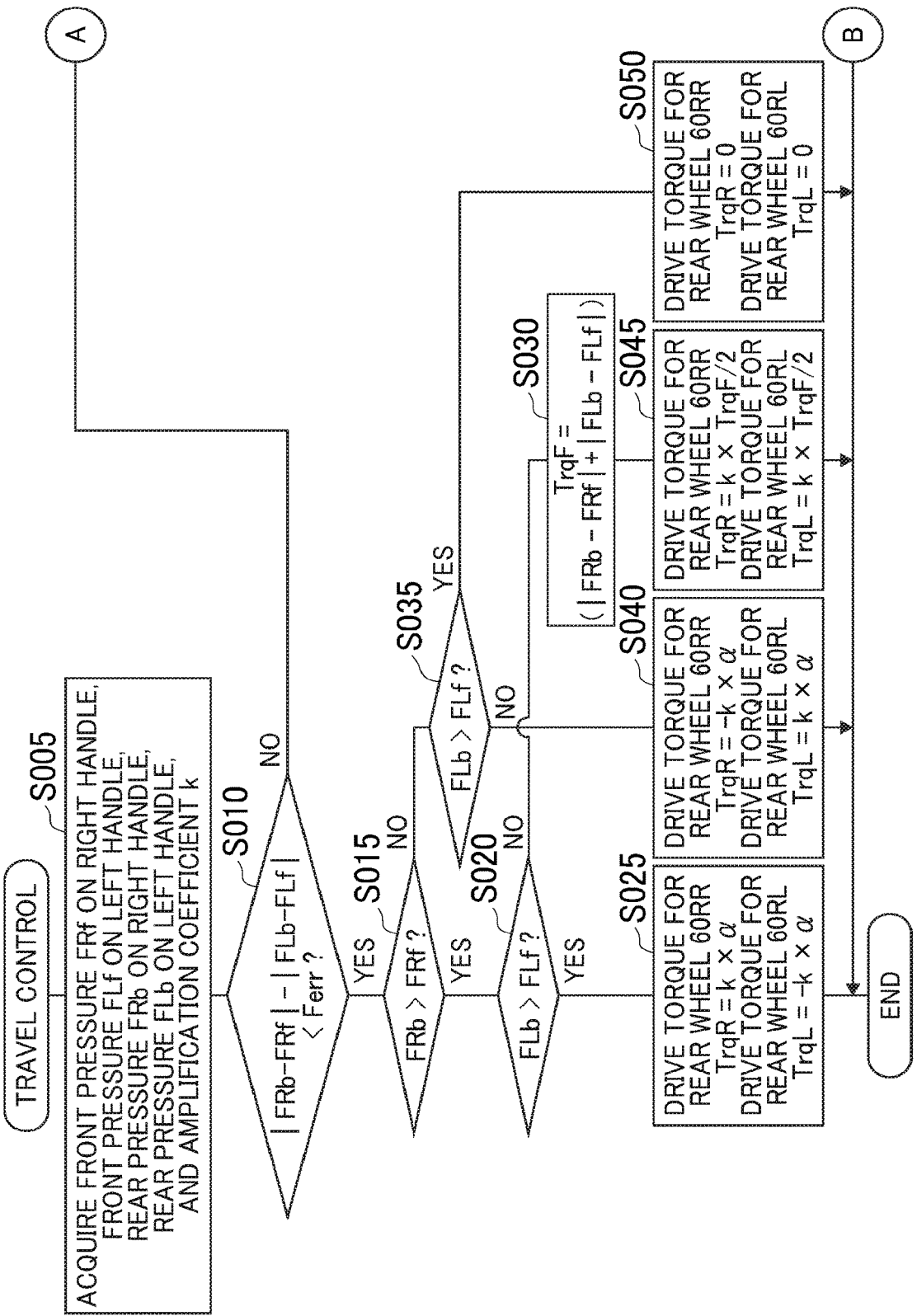
FIG. 6A is a flowchart illustrating a process procedure of travel control of the drive control unit of the walking assist device.
Figure 6B:
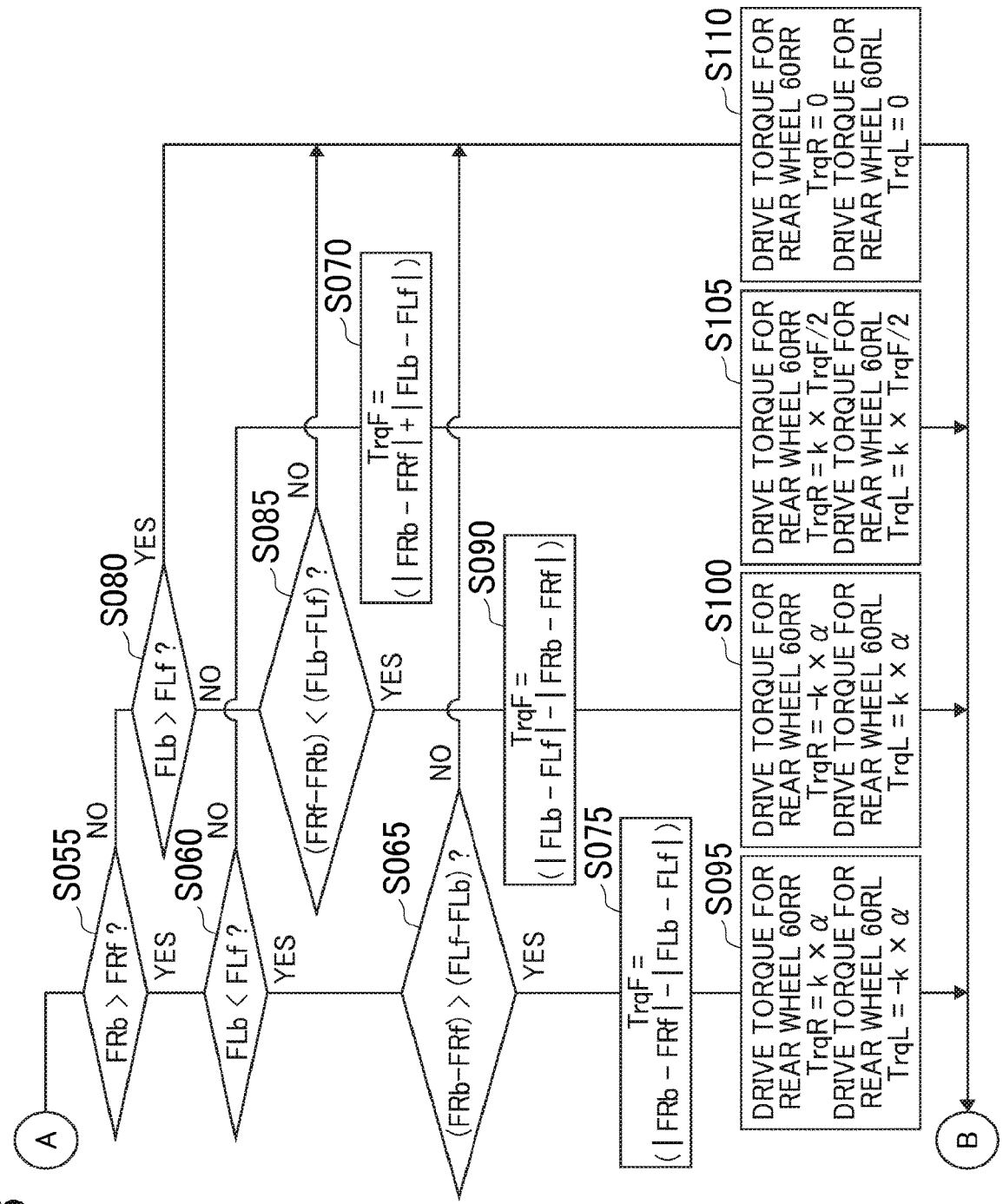
FIG. 6B is a flowchart illustrating a process procedure of travel control of the drive control unit of the walking assist device.
Figure 7:
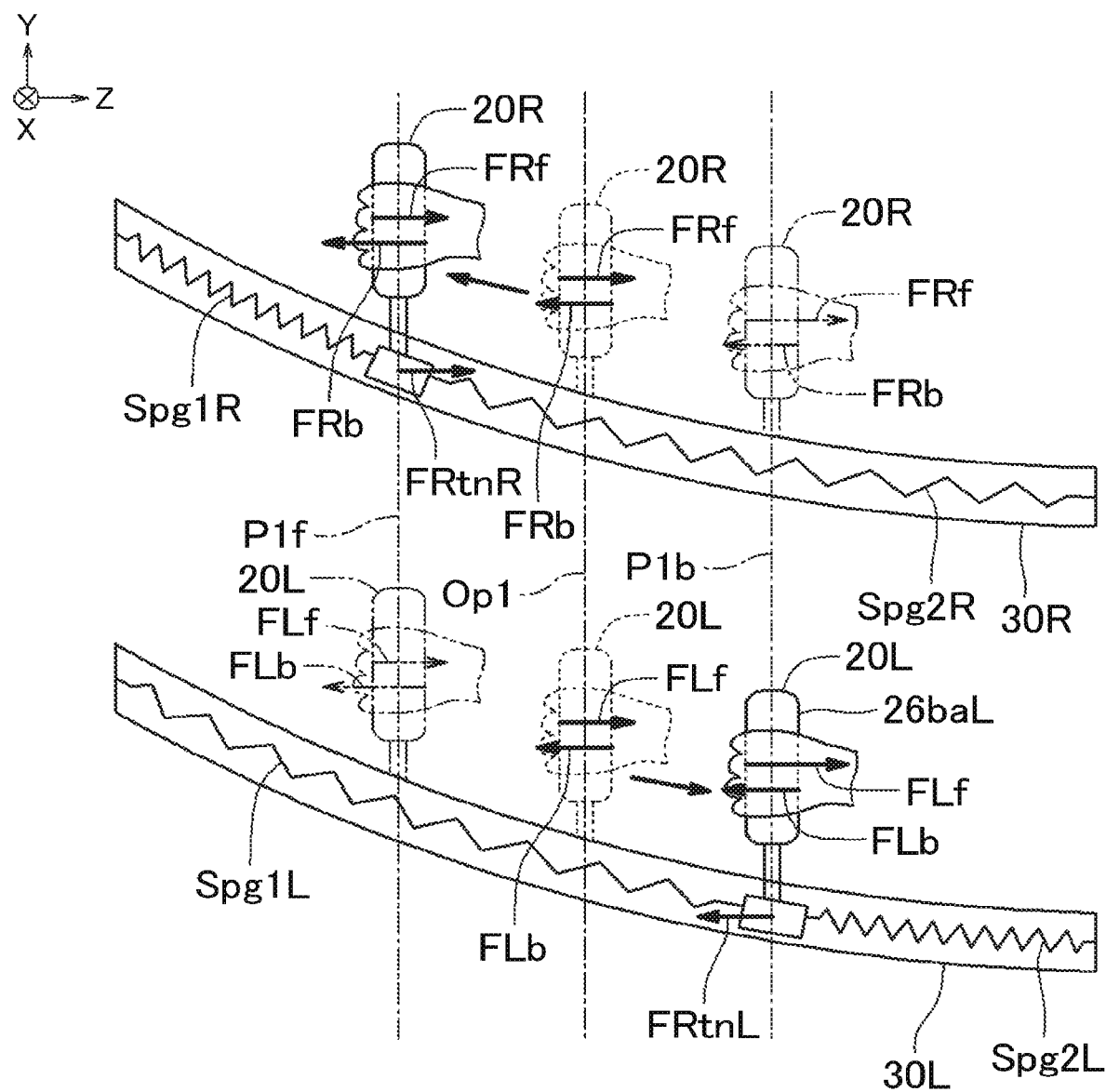
FIG. 7 illustrates operation of the walking assist device for a case where a user is not walking.
Figure 8:
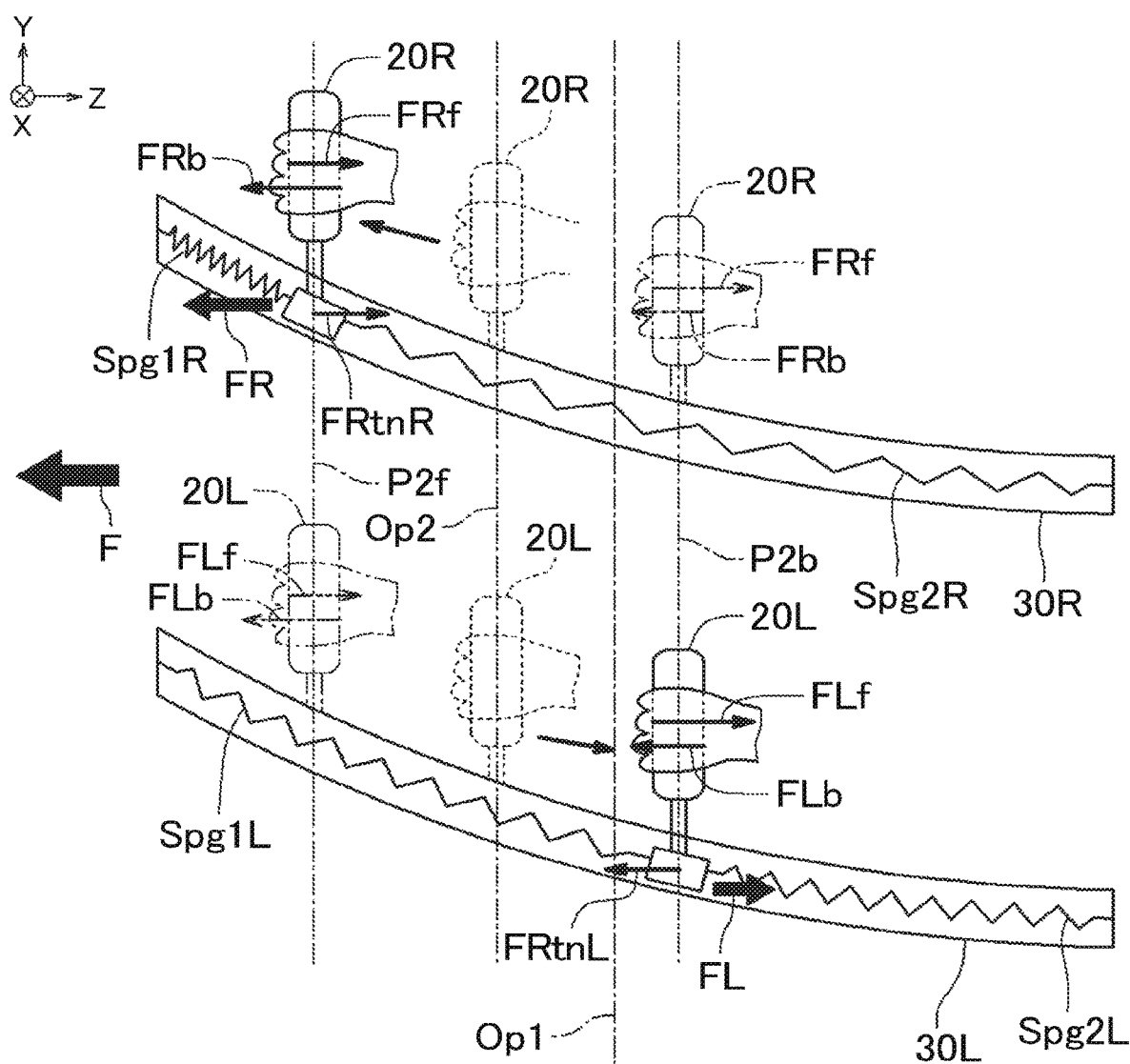
FIG. 8 illustrates operation of the walking assist device for a case where the user is walking.

FIGS. 6A and 6B are each a flowchart illustrating the process procedure for the drive control unit 40 (see FIG. 5) of the walking assist device 10 (see FIG. 1). FIG. 7 illustrates operation of the walking assist device 10 for a case where the user is not walking but only swinging his/her arms. FIG. 8 illustrates operation of the walking assist device 10 for a case where the user is walking while swinging his/her arms.

When the user turns on the main switch 72 (see FIG. 5), the drive control unit 40 starts operation. The drive control unit 40 determines, on the basis of the information (see FIG. 5) from the acting force measurement units 25R (25fR and 25bR) and 25L (25fL and 25bL), whether or not the user is walking while swinging his/her arms and grasping the handles 20R and 20L (see FIG. 1).

The drive units 64R and 64L (see FIG. 5) may include a lock mechanism, and the drive units 64R and 64L may be locked in the case where it is determined that the handles 20R and 20L are not grasped, and the drive units 64R and 64L may be unlocked in the case where it is determined that the handles 20R and 20L are grasped.

The process procedure of travel control of the drive control unit 40 (see FIG. 5) of the walking assist device 10 (see FIG. 1) will be described with reference to the flowcharts in FIGS. 6A and 6B. The drive control unit 40 executes travel control at intervals of a predetermined time (e.g. at intervals of several milliseconds) when started. Steps of the process of travel control will be described in detail below.

In step S005, the drive control unit 40 acquires information from the acting force measurement units 25R and 25L and the assist amount adjustment volume 74a (see FIG. 5), and proceeds to step S010. The acting force measurement unit 25R outputs, to the drive control unit 40 (see FIG. 5), the rear pressure FRb (forward acting force) on the right handle on the basis of the forward acting force detection unit 25fR and the front pressure FRf (rearward acting force) on the right handle on the basis of the rearward acting force detection unit 25bR. The acting force measurement unit 25L outputs, to the drive control unit 40 (see FIG. 5), the rear pressure FLb (forward acting force) on the left handle on the basis of the forward acting force detection unit 25fL and the front pressure FLf (rearward acting force) on the left handle on the basis of the rearward acting force detection unit 25bL.

The assist amount adjustment volume 74a outputs the adjusted value of the amplification coefficient k to the drive control unit 40 (see FIG. 5).

In step S010, the drive control unit 40 proceeds to step S015 in the case where it is determined that the difference (|FRb−FRf|−|FLb−FLf|) between |FRb−FRf| and |FLb−FLf| is smaller than a predetermined value Ferr (Yes), and proceeds to step S055 in the case where it is not determined that the difference between |FRb−FRf| and |FLb−FLf| is smaller than the predetermined value Ferr (No). The right grasp portion acting force (FRb−FRf) is a grasp portion acting force on the right handle 20R, which is an acting force based on the difference between the forward acting force (FRb) which is detected using the forward acting force detection unit 25fR and the rearward acting force (FRf) which is detected using the rearward acting force detection unit 25bR. The left grasp portion acting force (FLb−FLf) is a grasp portion acting force on the left handle 20L, which is an acting force based on the difference between the forward acting force (FLb) which is detected using the forward acting force detection unit 25fL and the rearward acting force (FLf) which is detected using the rearward acting force detection unit 25bL. Consequently, the respective grasping forces with which the user grasps the right and left handles 20R and 20L and which are input to such handles can cancel out each other. The drive control unit 40 determines that the user is not walking in the case where it is determined that the difference between the magnitude |(FRb−FRf)| of the right grasp portion acting force and the magnitude |(FLb−FLf)| of the left grasp portion acting force is smaller than the predetermined value Ferr which is stored in advance (|FLb−FLf|≈|FLb−FLf|). In the case where it is determined otherwise, on the other hand, the drive control unit 40 determines that the user is walking.

In step S015, the drive control unit 40 proceeds to step S020 in the case where it is determined that FRb is larger than FRf (FRb>FRf) (Yes), and proceeds to step S035 in the case where it is not determined that FRb is larger than FRf (No). The drive control unit 40 determines that the user is moving the right handle 20R forward on the rail 30R in the case where it is determined that FRb is larger than FRf, and determines that the user is moving the right handle 20R rearward on the rail 30R in the case where it is not determined that FRb is larger than FRf.

In step S020, the drive control unit 40 proceeds to step S025 in the case where it is determined that FLb is smaller than FLf (FLb<FLf) (Yes), and proceeds to step S030 in the case where it is not determined that FLb is smaller than FLf (No). In the case where it is determined that FLb is smaller than FLf, the drive control unit 40 determines that the user is moving the right handle 20R forward on the rail 30R and moving the left handle 20L rearward on the rail 30L without walking, and determines that the user desires to turn the walking assist device 10 to the left (left turn). In the case where it is not determined that FLb is smaller than FLf, the drive control unit 40 determines that the user is moving the right handle 20R forward on the rail 30R and moving the left handle 20L forward on the rail 30L without walking, and determines that the user desires to cause the walking assist device 10 to travel forward.

In step S035, the drive control unit 40 proceeds to step S050 in the case where it is determined that FLb is smaller than FLf (FLb<FLf) (Yes), and proceeds to step S040 in the case where it is not determined that FLb is smaller than FLf (No). In the case where it is not determined that FLb is smaller than FLf, the drive control unit 40 determines that the user is moving the right handle 20R rearward on the rail 30R and moving the left handle 20L forward on the rail 30L without walking, and determines that the user desires to turn the walking assist device 10 to the right (right turn). In the case where it is determined that FLb is smaller than FLf, the drive control unit 40 determines that the user is moving the right handle 20R rearward on the rail 30R and moving the left handle 20L rearward on the rail 30L without walking, and determines that the user desires to reverse or stop the walking assist device 10.

In step S025, the drive control unit 40 controls, on the basis of the determination result, the drive unit 64R such that the drive torque TrqR for the rear wheel 60RR (drive wheel) is k×α (TrqR=k×α), controls the drive unit 64L such that the drive torque TrqL for the rear wheel 60RL (drive wheel) is −k×α (TrqL=−k×α) (turns the walking assist device 10 to the left), and ends the process of travel control. α is a predetermined value of drive torque for the drive wheels (rear wheel 60RR and rear wheel 60RL) stored in advance.

In step S030, the drive control unit 40 sets forward travel torque TrqF to (|FRb−FRf|+|FLb−FLf|) (TrqF=(|FRb−FRf|+|FLb−FLf|)), and proceeds to step S045. The drive control unit 40 acquires the forward travel torque TrqF by calculating the sum of the magnitude |(FRb−FRf)| of the right grasp portion acting force and the magnitude |(FLb−FLf)| of the left grasp portion acting force. The forward travel torque TrqF is the sum of drive torque generated for the rear wheel 60RR (drive wheel) and the rear wheel 60RL (drive wheel) in order to cause the walking assist device 10 to travel forward.

In step S040, the drive control unit 40 controls, on the basis of the determination result, the drive unit 64R such that the drive torque TrqR for the rear wheel 60RR (drive wheel) is −k×α (TrqR=−k×α), controls the drive unit 64L such that the drive torque TrqL for the rear wheel 60RL (drive wheel) is k×α, (TrqL=k×α) (turns the walking assist device 10 to the right), and ends the process of travel control.

In step S045, the drive control unit 40 controls, on the basis of the determination result, the drive unit 64R such that the drive torque TrqR for the rear wheel 60RR (drive wheel) is k×TrqF/2 (TrqR=k×TrqF/2), controls the drive unit 64L such that the drive torque TrqL for the rear wheel 60RL (drive wheel) is k×TrqF/2 (TrqL=k×TrqF/2), and ends the process of travel control.

In step S050, the drive control unit 40 controls, on the basis of the determination result, the drive unit 64R such that the drive torque TrqR for the rear wheel 60RR (drive wheel) is 0 (TrqR=0), controls the drive unit 64L such that the drive torque TrqL for the rear wheel 60RL (drive wheel) is 0 (TrqL=0), and ends the process of travel control. In the case where it is determined that the user desires to reverse or stop the walking assist device 10, the drive control unit 40 does not perform drive control for the drive wheels (rear wheels 60RR and 60RL).

In step S055, the drive control unit 40 proceeds to step S060 in the case where it is determined that FRb is larger than FRf (FRb>FRf) (Yes), and proceeds to step S080 in the case where it is not determined that FRb is larger than FRf (No). The drive control unit 40 determines that the user is moving the right handle 20R forward on the rail 30R in the case where it is determined that FRb is larger than FRf, and determines that the user is moving the right handle 20R rearward on the rail 30R in the case where it is not determined that FRb is larger than FRf.

In step S060, the drive control unit 40 proceeds to step S065 in the case where it is determined that FLb is smaller than FLf (FLb<FLf) (Yes), and proceeds to step S070 in the case where it is not determined that FLb is smaller than FLf (No). In the case where it is determined that FLb is smaller than FLf, the drive control unit 40 determines that the user is moving the right handle 20R forward on the rail 30R and moving the left handle 20L rearward on the rail 30L. In the case where it is not determined that FLb is smaller than FLf, the drive control unit 40 determines that the user is moving the right handle 20R forward on the rail 30R and moving the left handle 20L forward on the rail 30L.

In step S065, the drive control unit 40 proceeds to step S075 in the case where it is determined that (FRb−FRf) is larger than (FLf−FLb) ((FRb−FRf)>(FLf−FLb)) (Yes), and proceeds to step S110 in the case where it is not determined that (FRb−FRf) is larger than (FLf−FLb) (No). The drive control unit 40 determines that the user is walking while swinging his/her arms in the case where it is determined that (FRb−FRf) is larger than (FLf−FLb). The drive control unit 40 determines that the user desires to reverse or stop the walking assist device 10 in the case where it is not determined that (FRb−FRf) is larger than (FLf−FLb).

In step 5070, the drive control unit 40 sets the forward travel torque TrqF to (|FRb−FRf|+|FLb−FLf|) (TrqF= (|FRb−FRf|+|FLb−FLf|)), and proceeds to step S105.

In step S075, the drive control unit 40 sets the forward travel torque TrqF to (|FRb−FRf|−|FLb−FLf|) (TrqF= (|FRb−FRf|−|FLb−FLf|)), and proceeds to step S095.

In step S080, the drive control unit 40 proceeds to step S110 in the case where it is determined that FLb is smaller than FLf (FLb<FLf) (Yes), and proceeds to step S085 in the case where it is not determined that FLb is smaller than FLf (No). In the case where it is determined that FLb is smaller than FLf, the drive control unit 40 determines that the user is moving the right handle 20R rearward on the rail 30R and moving the left handle 20L rearward on the rail 30L, and determines that the user desires to reverse or stop the walking assist device 10.

In step S085, the drive control unit 40 proceeds to step S090 in the case where it is determined that (FRf−FRb) is smaller than (FLb−FLf) ((FRf−FRb)<(FLb−FLf)) (Yes), and proceeds to step S110 in the case where it is not determined that (FRf−FRb) is smaller than (FLb−FLf) (No). The drive control unit 40 determines that the user is walking while swinging his/her arms in the case where it is determined that (FRf−FRb) is smaller than (FLb−FLf). The drive control unit 40 determines that the user desires to reverse or stop the walking assist device 10 in the case where it is not determined that (FRf−FRb) is smaller than (FLb−FLf).

In step S090, the drive control unit 40 sets the forward travel torque TrqF to (|FLb−FLf|−|FRb−FRf|) (TrqF= (|FLb−FLf|−|FRb−FRf|)), and proceeds to step S100.

In step S095, the drive control unit 40 controls, on the basis of the determination result, the drive unit 64R such that the drive torque TrqR for the rear wheel 60RR (drive wheel) is k×TrqF/2−β (TrqR=k×TrqF/2−β), controls the drive unit 64L such that the drive torque TrqL for the rear wheel 60RL (drive wheel) is k×TrqF/2+β (TrqL=k×TrqF/2+β), and ends the process of travel control. When the user moves the right handle 20R forward and moves the left handle 20L rearward, the walking assist device 10 is subjected to a left turning force generated to turn the walking assist device 10 to the left. In order to suppress the left turning force, the drive control unit 40 controls the drive units 64R and 64L such that the drive torque TrqL for the rear wheel 60RL is larger than the drive torque TrqR for the rear wheel 60RR. Consequently, meandering of the walking assist device 10 due to the left turning force which is generated by arm swing by the user can be suppressed, and the walking assist device 10 can be caused to travel forward with higher straight driving stability. β is a predetermined value of drive torque for the drive wheels (rear wheel 60RR and rear wheel 60RL) stored in advance. The drive control unit 40 may detect a turning force (yaw angular speed) generated for the walking assist device 10 using the angular speed sensor 52 (see FIGS. 1 and 5), and determine the value of β in accordance with the magnitude of the turning force. Consequently, meandering of the walking assist device 10 can be suppressed with more precision.

In step S100, the drive control unit 40 controls, on the basis of the determination result, the drive unit 64R such that the drive torque TrqR for the rear wheel 60RR (drive wheel) is k×TrqF/2+β (TrqR=k×TrqF/2+β), controls the drive unit 64L such that the drive torque TrqL for the rear wheel 60RL (drive wheel) is k×TrqF/2−β (TrqL=k×TrqF/2−β), and ends the process of travel control. When the user moves the right handle 20R rearward and moves the left handle 20L forward, the walking assist device 10 is subjected to a right turning force generated to turn the walking assist device 10 to the right. In order to suppress the right turning force, the drive control unit 40 controls the drive units 64R and 64L such that the drive torque TrqR for the rear wheel 60RR is larger than the drive torque TrqL for the rear wheel 60RL. Consequently, meandering of the walking assist device 10 due to the right turning force which is generated by arm swing by the user can be suppressed, and the walking assist device 10 can be caused to travel forward with higher straight driving stability.

In step S105, the drive control unit 40 controls, on the basis of the determination result, the drive unit 64R such that the drive torque TrqR for the rear wheel 60RR (drive wheel) is k×TrqF/2 (TrqR=k×TrqF/2), controls the drive unit 64L such that the drive torque TrqL for the rear wheel 60RL (drive wheel) is k×TrqF/2 (TrqL=k×TrqF/2), and ends the process of travel control.

In step 5110, the drive control unit 40 controls, on the basis of the determination result, the drive unit 64R such that the drive torque TrqR for the rear wheel 60RR (drive wheel) is 0 (TrqR =0), controls the drive unit 64L such that the drive torque TrqL for the rear wheel 60RL (drive wheel) is 0 (TrqL =0), and ends the process of travel control.

In FIG. 7, in the case where the user is not walking, the handles 20R and 20L are moved in the front-rear direction on the respective rails (30R and 30L), on which the handles 20R and 20L are provided, about a predetermined position Op1. A case where the handle 20R is located at a forward position P1f on the rail 30R and the handle 20L is located at a rearward position P1b on the rail 30L, that is, a case where the user brings his/her right arm forward and pulls his/her left arm rearward, is indicated by the continuous lines. A case where the handle 20R is located at the rearward position P1b on the rail 30R and the handle 20L is located at the forward position P1f on the rail 30L, that is, a case where the user pulls his/her right arm rearward and brings his/her left arm forward, is indicated by the long dashed short dashed lines. A case where the handle 20R is located at the predetermined position Op1 on the rail 30R and the handle 20L is located at the predetermined position Op1 on the rail 30L, that is, a case where the user neither brings forward nor pulls rearward any of his/her right and left arms, is indicated by the dashed lines. The phrase "the user brings his/her arm forward" indicates that the user moves the corresponding handle (20R and 20L) forward from the rear side on the rail (30R and 30L) on which the handle is provided. The phrase "the user pulls his/her arm rearward" indicates that the user moves the corresponding handle (20R and 20L) rearward from the front side on the rail (30R and 30L) on which the handle is provided.

In the case where the handle 20R is located at the predetermined position Op1, only a grasping force of the user is input to the handle 20R, and the rear pressure FRb (grasping force) on the right handle and the front pressure FRf (grasping force) on the right handle are equal in magnitude to each other. Therefore, the right grasp portion acting force (FRb−FRf) is 0. Similarly, in the case where the handle 20L is located at the predetermined position Op1, the left grasp portion acting force (FLb−FLf) is 0. Thus, both the sum and the difference of the magnitude |(FRb−FRf)| of the right grasp portion acting force and the magnitude |(FLb−FLf)| of the left grasp portion acting force are 0.

In the case where the handle 20R is located at the position P1f, the handle 20R receives, as inputs, a force with which the user pushes the handle 20R forward, together with the grasping force, and a restoring force FRtnR applied by the holding unit Spg1R and the holding unit Spg2R to return the handle 20R to the predetermined position Op1. In the case where the handle 20L is located at the position P1b, the handle 20L receives, as inputs, a force with which the user pulls the handle 20L rearward, together with the grasping force, and a restoring force FRtnL applied by the holding unit Spg1L and the holding unit Spg2L to return the handle 20L to the predetermined position Op1

In the case where the right handle 20R is located at the position P1f, the rear pressure FRb (grasping force+pushing force+restoring force FRtnR) on the handle 20R is higher than the front pressure FRf (grasping force) on the right handle, and the right grasp portion acting force (FRb−FRf) is "positive". In the case where the left handle 20L is located at the position P1b, the rear pressure FRb (grasping force) on the handle 20R is lower than the front pressure FLf (grasping force+pulling force+restoring force FRtnR) on the left handle, and the right grasp portion acting force (FRb−FRf) is "negative".

Thus, the drive control unit 40 (see FIG. 5) determines that the user is moving the handle 20R forward in the case where the right grasp portion acting force (FRb−FRf) on the right handle 20R is "positive", and determines that the user is moving the handle 20R rearward in the case where the right grasp portion acting force is "negative". Similarly, the drive control unit 40 determines that the user is moving the handle 20L forward in the case where the left grasp portion acting force (FLb−FLf) on the left handle 20L is "positive", and determines that the user is moving the handle 20L rearward in the case where the left grasp portion acting force is "negative".

In the case where the right grasp portion acting force (FRb−FRf) is "positive" and the left grasp portion acting force (FLb−FLf) is "negative", the drive control unit 40 determines that the user is bringing his/her right arm forward and pulling his/her left arm rearward, and determines that the user desires a left turn of the walking assist device 10. In the case where the right grasp portion acting force (FRb−FRf) is not "positive" and the left grasp portion acting force (FLb−FLf) is not "negative", the drive control unit 40 determines that the user is pulling his/her right arm rearward and bringing his/her left arm forward, and determines that the user desires a right turn of the walking assist device 10.

In the case where the right grasp portion acting force (FRb−FRf) is not "positive" and the left grasp portion acting force (FLb−FLf) is "negative", the drive control unit 40 determines that the user is pulling his/her right arm rearward and pulling his/her left arm rearward, and determines that the user desires to reverse or stop the walking assist device 10. In the case where the right grasp portion acting force (FRb−FRf) is "positive" and the left grasp portion acting force (FLb−FLf) is not "negative", the drive control unit 40 determines that the user is bringing his/her right arm forward and bringing his/her left arm forward, and determines that the user desires to cause the walking assist device 10 to travel forward.

In FIG. 8, in the case where the user is walking, the handles 20R and 20L are moved in the front-rear direction on the respective rails (30R and 30L), on which the handles 20R and 20L are provided, about a position Op2, which is located forward of the predetermined position Op1. A case where the handle 20R is located at a forward position P2f on the rail 30R and the handle 20L is located at a rearward position P2b on the rail 30L, that is, a case where the user brings his/her right arm forward and pulls his/her left arm rearward, is indicated by the continuous lines. A case where the handle 20R is located at the rearward position P2b on the rail 30R and the handle 20L is located at the forward position P2f on the rail 30L, that is, a case where the user pulls his/her right arm rearward and brings his/her left arm forward, is indicated by the long dashed short dashed lines. A case where the handle 20R is located at the position Op2 on the rail 30R and the handle 20L is located at the position Op2 on the rail 30L is indicated by the dashed lines. A vehicle drive force F is a force with which the user intends to cause the walking assist device 10 (see FIG. 1) to travel forward, and is composed of a right vehicle drive force FR generated on the right rail 30R and a left vehicle drive force FL generated on the left rail 30L.

In the case where the handle 20R is located at the position P2f, the rear pressure FRb (grasping force+pushing force+restoring force FRtnR) on the handle 20R is higher than the front pressure FRf (grasping force) on the right handle, and the right grasp portion acting force (FRb−FRf) is "positive" (FR). In the case where the handle 20L is located at the position P2b, the rear pressure FLb (grasping force) on the handle 20L is lower than the front pressure FLf (grasping force+pulling force+restoring force FLtnR) on the left handle, and the left grasp portion acting force (FLb−FLf) is "negative" (FL).

In the case where the right grasp portion acting force (FRb−FRf) is "positive" and the left grasp portion acting force (FLb−FLf) is "negative", the drive control unit 40 determines that the user is bringing his/her right arm forward and pulling his/her left arm rearward. In the case where the right grasp portion acting force (FRb−FRf) is "positive" and the left grasp portion acting force (FLb−FLf) is "negative", the drive control unit 40 determines that the user is walking while swinging his/her arms. In the case where it is determined that the magnitude |FRb−FRf| (|FR|) of the right grasp portion acting force is larger than the magnitude |FLb−FLf| (|FL|) of the left grasp portion acting force, the drive control unit 40 determines that the user desires to cause the walking assist device 10 to travel forward. Otherwise, on the other hand, the drive control unit 40 determines that the user desires to reverse or stop the walking assist device 10.

In the case where the right grasp portion acting force (FRb−FRf) is not "positive" and the left grasp portion acting force (FLb−FLf) is not "negative", the drive control unit 40 determines that the user is walking while swinging his/her arms. In the case where it is determined that the magnitude |FRb−FRf| (|FR|) of the right grasp portion acting force is smaller than the magnitude |FLb−FLf| (|FL|) of the left grasp portion acting force, the drive control unit 40 determines that the user desires to cause the walking assist device 10 to travel forward. Otherwise, on the other hand, the drive control unit 40 determines that the user desires to reverse or stop the walking assist device 10.

In the case where the right grasp portion acting force (FRb−FRf) is "positive" and the left grasp portion acting force (FLb−FLf) is not "negative", the drive control unit 40 determines that the user is walking without swinging his/her arms. In the case where it is determined that the magnitude |FRb−FRf| (|FR|) of the right grasp portion acting force is smaller than the magnitude |FLb−FLf| (|FL|) of the left grasp portion acting force, the drive control unit 40 determines that the user desires to cause the walking assist device 10 to travel forward. Otherwise, on the other hand, the drive control unit 40 determines that the user desires to reverse or stop the walking assist device 10.

In the case where the right grasp portion acting force (FRb−FRf) is not "positive" and the left grasp portion acting force (FLb−FLf) is "negative", the drive control unit 40 determines that the user is walking without swinging his/her arms, and determines that the user desires to reverse or stop the walking assist device 10.

The process of travel control of the drive control unit 40 according to a second embodiment will be described in detail with reference to FIGS. 9 to 14. In the second embodiment, travel control is performed in accordance with the state of movement of handles 20Ra and 20La (see FIG. 9) on rails 30Ra and 30La (state of arm swing by the user) (see FIG. 9), which differs from the first embodiment in which travel control is performed in accordance with the acting forces on the handles 20R and 20L (see FIG. 2).

Figure 9:
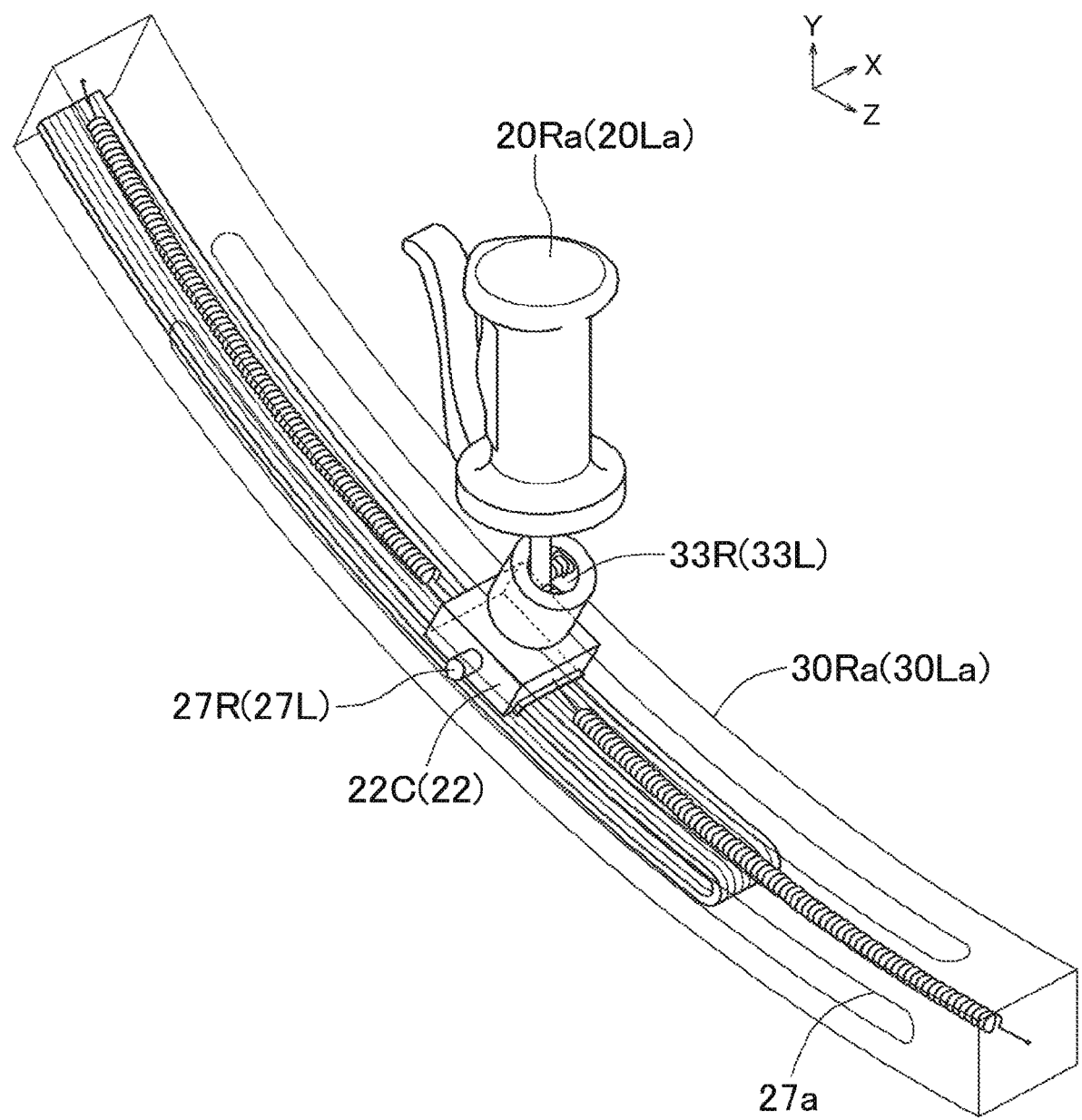
FIG. 9 is a perspective view illustrating a configuration and a function of a handle and a rail according to a second embodiment.

FIG. 9 is a perspective view illustrating the configuration and the function of the right handle 20Ra and the right rail 30Ra according to the second embodiment. As in the first embodiment, the walking assist device 10 has a symmetrical structure between the right and the left of the frame 50 (see FIG. 1). Therefore, the structure on the right side will be mainly described, rather than the structure on the left side. The rail 30Ra (30La) differs from the rail 30R (30L) according to the first embodiment (see FIG. 2) in having a grasp portion position detection plate 27a provided on the inner side of the left side surface to extend along the front-rear direction as illustrated in FIG. 9. The right handle 20Ra differs from the handle 20R in having an anchor portion 22C provided with the grasp portion position detection unit 27R. The left handle 20La differs from the handle 20L in having an anchor portion 22C provided with the grasp portion position detection unit 27L.

The grasp portion position detection unit 27R outputs, to the drive control unit 40 (see FIG. 5), a signal that matches the position of the handle 20Ra in the front-rear direction with respect to the grasp portion position detection plate 27a. The grasp portion position detection unit 27L outputs, to the drive control unit 40, a signal that matches the position of the handle 20La in the front-rear direction with respect to the grasp portion position detection plate 27a. Examples of the grasp portion position detection plate 27a include a resistor, the resistance value of which may be varied in accordance with the position in the front-rear direction. Consequently, the grasp portion position detection units 27R and 27L output a signal that matches the position in the front-rear direction with respect to the grasp portion position detection plate 27a.

As illustrated in FIG. 9, a connection portion at the lower end of the handle 20Ra and the anchor portion 22C are a ball joint and a recessed portion as discussed above, and the handle 20Ra is connected so as to be inclinable to the front, rear, right, and left with respect to the anchor portion 22C. The connection portion is configured such that the handle 20Ra is held upright, rather than being inclined, with respect to the anchor portion 22C by elastic bodies or the like. The grasp portion inclination detection unit 33R, which is capable of detecting the direction of inclination, in the front-rear direction and the right-left direction, and the amount of inclination of the handle 20Ra with respect to the anchor portion 22C, is provided around the connection portion. The grasp portion inclination detection unit 33R may be a pressure sensor, for example, and outputs, to the drive control unit 40 (see FIG. 5), a detection signal that matches the direction of inclination (in the front-rear direction and the right-left direction) and the amount of inclination of the handle 20Ra with respect to the anchor portion 22C. Since the same applies to the handle 20La, the handle 20La is not described.

The process procedure of travel control of the drive control unit 40 of the walking assist device 10 (see FIG. 1) will be described with reference to the flowcharts in FIGS. 10 to 12. The drive control unit 40 executes travel control at intervals of a predetermined time (e.g. at intervals of several milliseconds) when started. Steps of the process of travel control will be described in detail below.

Figure 10:
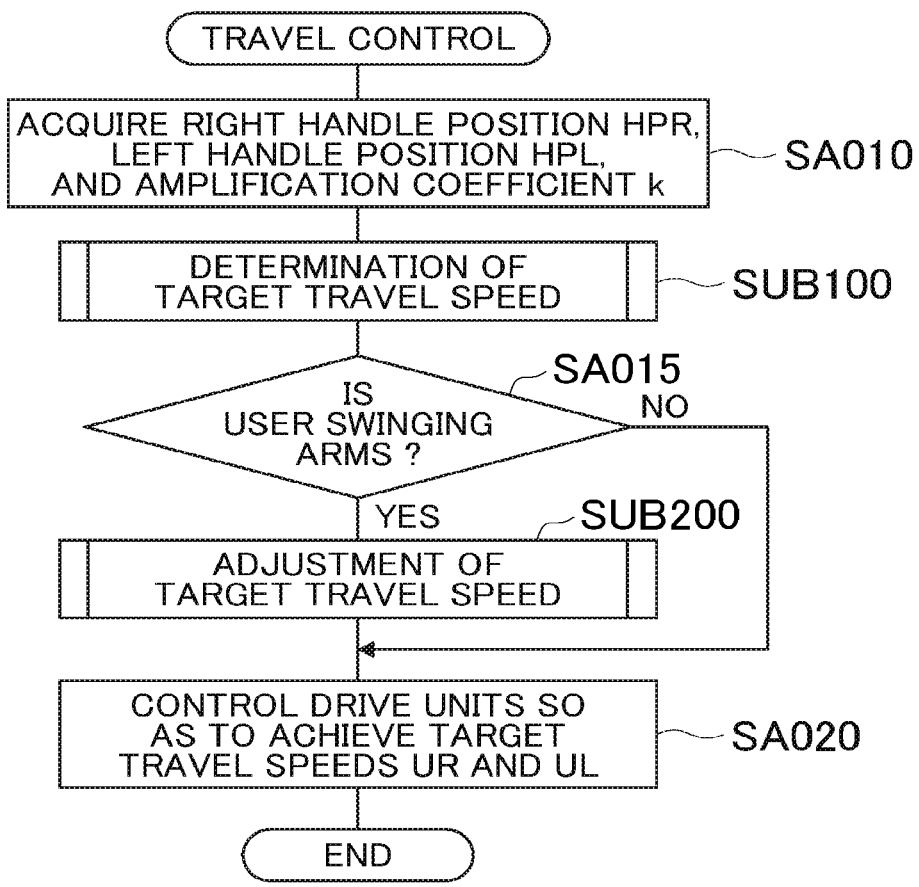
FIG. 10 is a flowchart illustrating a procedure of an overall process of travel control of a drive control unit of a walking assist device according to the second embodiment.

FIG. 10 is a flowchart illustrating the procedure of the overall process of travel control of the drive control unit of the walking assist device 10 according to the second embodiment.

In step SA010, the drive control unit 40 calculates a right handle position HPR and a left handle position HPL from the grasp portion position detection units 27R and 27L, respectively, acquires an amplification coefficient k from the assist amount adjustment volume 74a (see FIG. 5), and proceeds to step SUB100 (determination of target travel speeds). The right handle position HPR is the position of the right handle 20Ra in the front-rear direction of the rail 30Ra. The left handle position HPL is the position of the left handle 20La in the front-rear direction of the rail 30La. The right handle position HPR corresponds to the right grasp portion front-rear position, which is the position of the right handle (grasp portion) in the front-rear direction with respect to the frame. The left handle position HPL corresponds to the left grasp portion front-rear position, which is the position of the left handle (grasp portion) in the front-rear direction with respect to the frame.

Figure 11A:
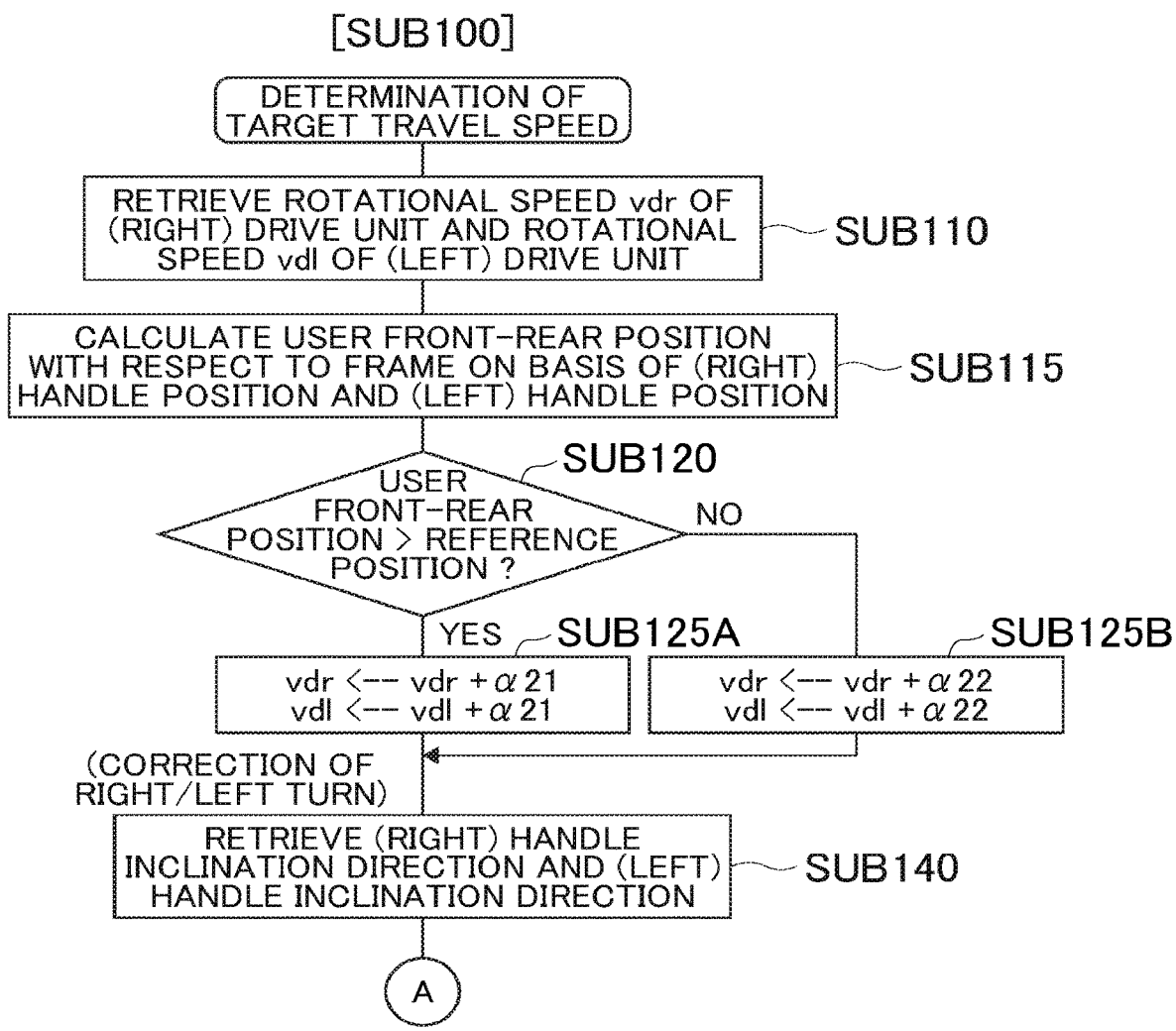
FIG. 11A is a flowchart illustrating a process procedure for determining a target travel speed for the walking assist device.

In step SUB100, the drive control unit 40 performs a process in step SUB100 (determination of target travel speeds) illustrated in FIG. 11A, and proceeds to step SA015. The process in step SUB100 will be discussed in detail later.

In step SA015, the drive control unit 40 proceeds to step SUB200 (adjustment of target travel speeds) in the case where it is determined that the user is swinging his/her arms (Yes), and proceeds to step SA020 in the case where it is determined that the user is not swinging his/her arms (No). For example, the drive control unit 40 determines whether or not the user is swinging his/her arms on the basis of the state of variation in the right grasp portion front-rear position which is calculated on the basis of the preceding right grasp portion front-rear position and the current right grasp portion front-rear position, and the state of variation in the left grasp portion front-rear position which is calculated on the basis of the preceding left grasp portion front-rear position and the current left grasp portion front-rear position.

Figure 12:
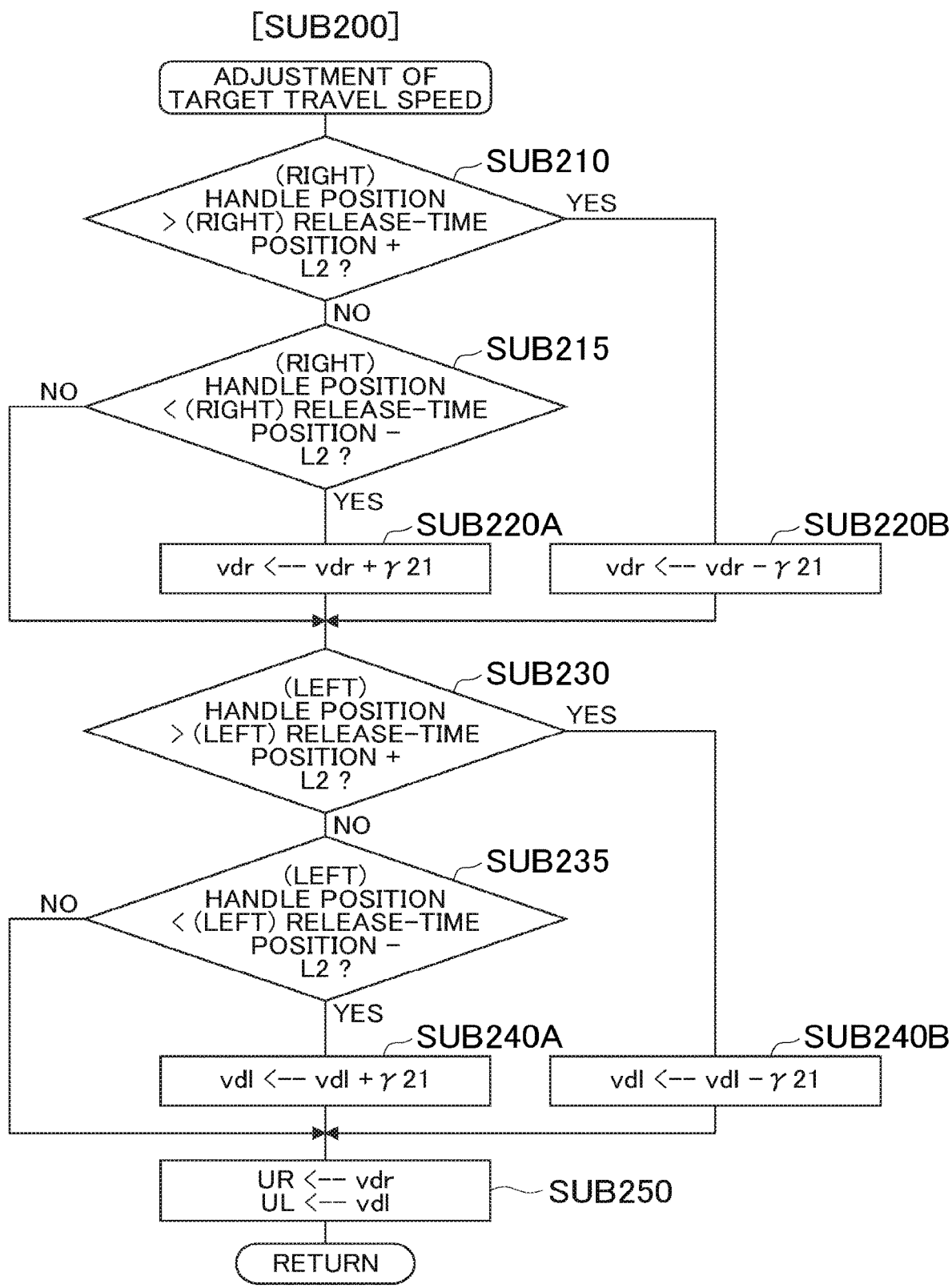
FIG. 12 is a flowchart illustrating a process procedure for adjusting the target travel speed.

In the case where the process proceeds to step SUB200, the drive control unit 40 performs a process in step SUB200 (adjustment of target travel speeds) illustrated in FIG. 12, and proceeds to step SA020. The process in step SUB200 will be discussed in detail later.

In step SA020, the drive control unit 40 controls the drive units 64R and 64L so as to achieve target travel speeds UR and UL, respectively, and ends the travel control.

Figure 11B:
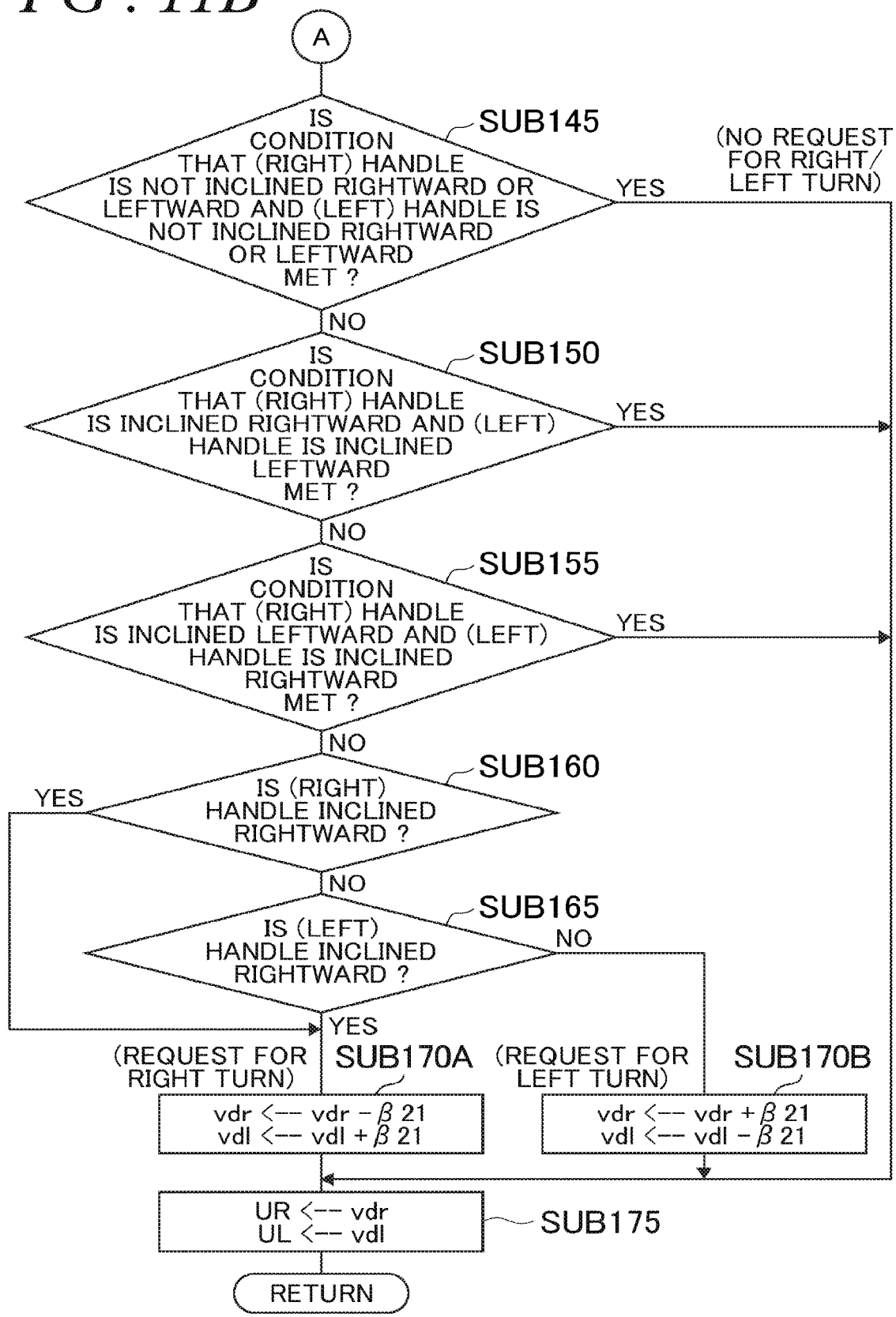
FIG. 11B is a flowchart illustrating a process procedure for determining a target travel speed for the walking assist device.

FIG. 11A and FIG. 11B are flowcharts illustrating the procedure of a process (SUB100) for determining target travel speeds (UR and UL) for the walking assist device 10 (see FIG. 1). The target travel speeds (UR and UL) are target speeds at which the walking assist device 10 is to be caused to travel. The drive control unit 40 (see FIG. 5) controls the drive units 64R and 64L so as to achieve the target travel speeds (UR and UL), respectively. Step SUB100 will be described in detail below. In the case where the process proceeds to step SUB100, the drive control unit 40 proceeds to step SUB110 in FIG. 11A.

In step SUB110, the drive control unit 40 retrieves a rotational speed vdr of the (right) drive unit 64R (see FIG. 1), retrieves a rotational speed vdl of the (left) drive unit 64L (see FIG. 1), and proceeds to step SUB115.

Figure 13:
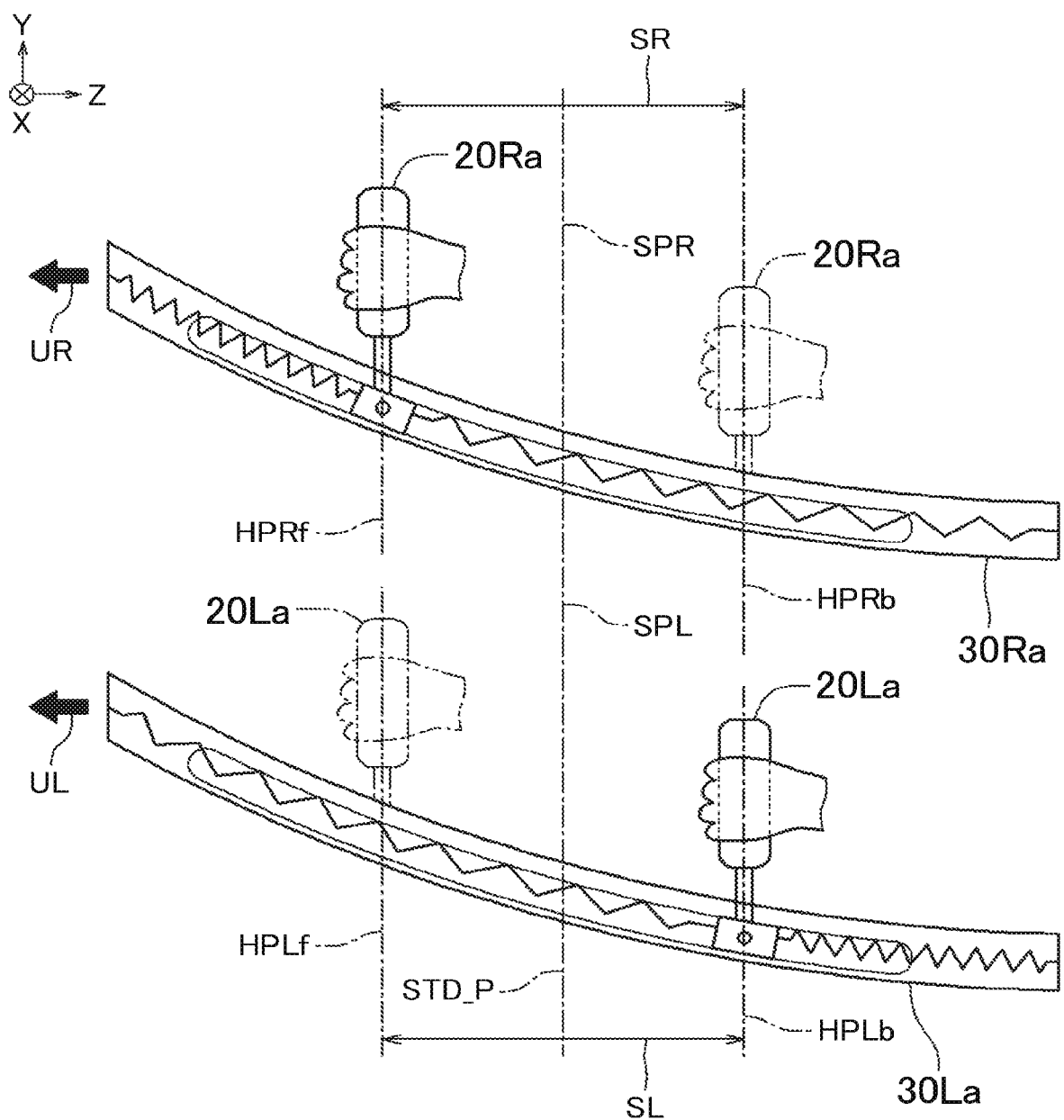
FIG. 13 illustrates operation of the walking assist device according to the second embodiment.
Figure 14:
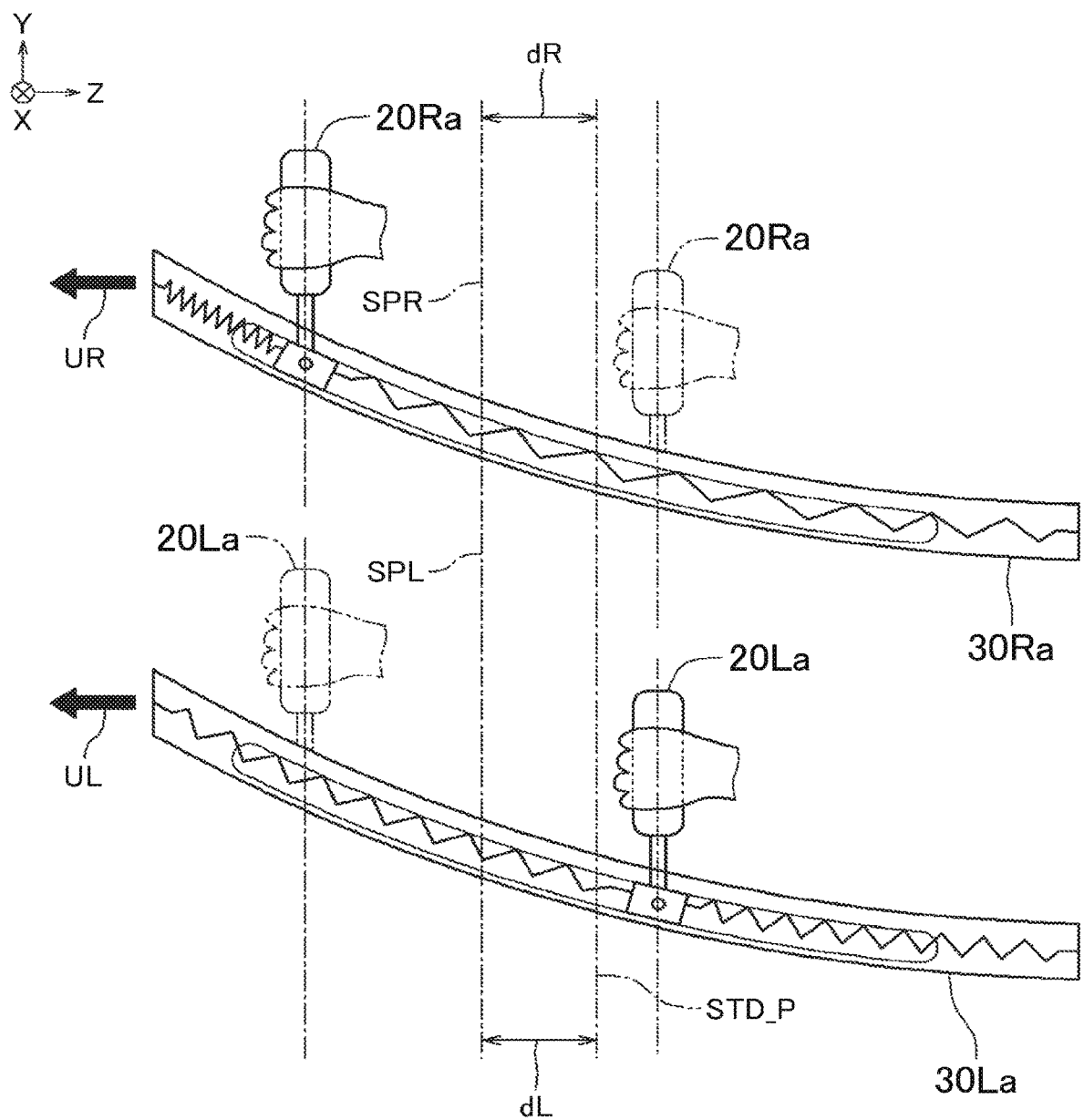
FIG. 14 illustrates operation of the walking assist device for a case where a user front-rear position is forward of a reference position (predetermined position)

In step SUB115, the drive control unit 40 calculates a user front-rear position, which is the position of the user in the front-rear direction with respect to the frame, on the basis of the position HPR of the right handle 20Ra and the position HPL of the left handle 20La, and proceeds to step SUB120. For example, the drive control unit 40 calculates the user front-rear position as [current position HPR+current position HPL]/2 (i.e. a position obtained by averaging the present position HPR and the present position HPL). The user front-rear position can be calculated both when the user is swinging his/her arms and when the user is not swinging his/her arms. For example, as illustrated in FIG. 13, in the case where the current position of the right handle 20Ra is a position HPRf and the current position of the left handle 20La is a position HPLb, the user front-rear position is calculated as a position SPR (SPL) at the middle between the position HPRf (corresponding to the "right grasp portion front-rear position") and the position HPLb (corresponding to the "left grasp portion front-rear position") in accordance with the user front-rear position=[position HPRf +position HPLb]/2.

In step SUB120, the drive control unit 40 determines whether or not the user front-rear position is forward of a reference position (in this case, it is indicated that being larger equals being forward). In the case where the user front-rear position is forward of the reference position (Yes), the process proceeds to step SUB125A. In the case where the user front-rear position is the same as or rearward of the reference position (No), the process proceeds to step SUB125B. The reference position (corresponding to the "predetermined position") is set to substantially the middle position, in the front-rear direction, of the frame. In the example in FIG. 14, a position STD_P that is substantially at the middle, in the front-rear direction, of the frame is set as the reference position (predetermined position). In the example in FIG. 14, the user front-rear position which is calculated from the current position of the right handle 20Ra, which is indicated by the continuous line, and the current position of the left handle 20La, which is indicated by the continuous line, is the position SPR (SPL). In the example in FIG. 14, the user front-rear position (position SPR) is forward of the reference position (position STD_P) (position SPR>position STD_P). In this case, the walking assist device is delayed with respect to the user, and thus the process proceeds to step SUB125A, in which the rotational speeds vdr and vdl are increased.

In the case where the process proceeds to step SUB125A, the drive control unit 40 stores a value obtained by adding a travel correction speed α21 to the (right) rotational speed vdr as a new (right) rotational speed vdr. The drive control unit 40 also stores a value obtained by adding the travel correction speed α21 to the (left) rotational speed vdl as a new (left) rotational speed vdl, and proceeds to step SUB140. A value k×α21 obtained by multiplying α21 by the amplification coefficient k may be added instead of adding α21.

In the case where the process proceeds to step SUB125B, the drive control unit 40 stores a value obtained by subtracting a travel correction speed α22 from the (right) rotational speed vdr as a new (right) rotational speed vdr. The drive control unit 40 also stores a value obtained by subtracting the travel correction speed α22 from the (left) rotational speed vdl as a new (left) rotational speed vdl, and proceeds to step SUB140. A value k×α22 obtained by multiplying α22 by the amplification coefficient k may be subtracted instead of subtracting α22.

As described above, the drive control unit 40 calculates the rotational speeds vdr and vdl (i.e. controls the respective drive units) such that the user front-rear position approximates the reference position (a predetermined position in the front-rear direction with respect to the frame) in steps SUB120, SUB125A, and SUB125B.

In the case where the process proceeds to step SUB140, the drive control unit 40 acquires the (right) handle direction inclination and the (left) handle direction inclination on the basis of detection signals from the grasp portion inclination detection units 33R and 33L (see FIG. 9), and proceeds to step SUB145. In the processes in steps SUB140 to SUB175, a request for a right turn or a left turn from the user is detected on the basis of the (right) handle and (left) handle inclination directions, and a difference in rotation is provided between the rotational speeds vdr and vdl to turn the walking assist device in the case where a request for a turn is detected.

In step SUB145, the drive control unit 40 determines whether or not a condition that the (right) handle is not inclined rightward or leftward and the (left) handle is not inclined rightward or leftward is met. In the case where the condition is met (Yes), the process proceeds to step SUB175. In the case where the condition is not met (No), the process proceeds to step SUB150.

In the case where the process proceeds to step SUB150, the drive control unit 40 determines whether or not a condition that the (right) handle is inclined rightward and the (left) handle is inclined leftward is met. In the case where the condition is met (Yes), the process proceeds to step SUB175. In the case where the condition is not met (No), the process proceeds to step SUB155.

In the case where the process proceeds to step SUB155, the drive control unit 40 determines whether or not a condition that the (right) handle is inclined leftward and the (left) handle is inclined rightward is met. In the case where the condition is met (Yes), the process proceeds to step SUB175. In the case where the condition is not met (No), the process proceeds to step SUB160.

In the case where the process proceeds to step SUB160, the drive control unit 40 determines whether or not the (right) handle is inclined rightward. In the case where the (right) handle is inclined rightward (Yes), the process proceeds to step SUB170A. In the case where the (right) handle is not inclined rightward (No), the process proceeds to step SUB165.

In the case where the process proceeds to step SUB165, the drive control unit 40 determines whether or not the (left) handle is inclined rightward. In the case where the (left) handle is inclined rightward (Yes), the process proceeds to step SUB170A. In the case where the (left) handle is not inclined rightward (No), the process proceeds to step SUB170B.

In the case where the process proceeds to step SUB170A, the drive control unit 40 stores a value obtained by subtracting a turn correction speed $\beta21$ from the (right) rotational speed vdr as a new (right) rotational speed vdr. The drive control unit 40 also stores a value obtained by adding the turn correction speed $\beta21$ to the (left) rotational speed vdl as a new (left) rotational speed vdl, and proceeds to step SUB175.

In the case where the process proceeds to step SUB170B, the drive control unit 40 stores a value obtained by adding the turn correction speed $\beta21$ to the (right) rotational speed vdr as a new (right) rotational speed vdr. The drive control unit 40 also stores a value obtained by subtracting the turn correction speed $\beta21$ from the (left) rotational speed vdl as a new (left) rotational speed vdl, and proceeds to step SUB175.

In the case where the process proceeds to step SUB175, the drive control unit 40 substitutes the (right) rotational speed vdr into the (right) target travel speed UR to store the value, substitutes the (left) rotational speed vdl into the (left) target travel speed UL to store the value, and ends the process (in this case, the process returns and proceeds to step SA015 in FIG. 10).

In the case where the user is walking while swinging his/her arms in step SA015 in FIG. 10, the drive control unit 40 makes an adjustment for reducing meandering of the walking assist device caused along with arm-swing walk of the user in step SUB200 illustrated in FIG. 12. In the case where the user is walking while swinging his/her arms and pushes the (right) handle forward and pulls the (left) handle rearward, the walking assist device receives a force to turn leftward. In the case where the user pulls the (right) handle rearward and pushes the (left) handle forward, the walking assist device receives a force to turn rightward. Thus, in the case where the user walks while alternately swinging his/her right and left arms, the walking assist device receives a force to meander rightward and leftward. The process in step SUB200 for reducing meandering of the walking assist device will be described in detail below. In the case where the process proceeds to step SUB200, the drive control unit 40 proceeds to step SUB210 in FIG. 12.

In step SUB210, the drive control unit 40 determines whether or not the (right) handle position is forward of (larger than) a (right) release-time position plus a distance L2. In the case where the (right) handle position is forward of (larger than) the (right) release-time position plus the distance L2 (Yes), the process proceeds to step SUB220B. Otherwise (No), the process proceeds to step SUB215. The (right) release-time position is the position in the vicinity of the center of the rail 30R to which the (right) handle is returned by the elastic members when the user is not grasping the (right) handle. For example, the drive control unit 40 stores the position of the (right) handle at the time when the (right) handle is not grasped by the user as the (right) release-time position. The distance L2 is a distance set as a dead band as appropriate.

In the case where the process proceeds to step SUB215, the drive control unit 40 determines whether or not the (right) handle position is rearward of (smaller than) the (right) release-time position minus the distance L2. In the case where the (right) handle position is rearward of (smaller than) the (right) release-time position minus the distance L2 (Yes), the process proceeds to step SUB220A. Otherwise (No), the process proceeds to step SUB230.

In the case where the process proceeds to step SUB220A, the drive control unit 40 stores a value obtained by adding a meandering correction speed $\gamma21$ to the (right) rotational speed vdr as a new (right) rotational speed vdr, and proceeds to step SUB230.

In the case where the process proceeds to step SUB220B, the drive control unit 40 stores a value obtained by subtracting the meandering correction speed $\gamma21$ from the (right) rotational speed vdr as a new (right) rotational speed vdr, and proceeds to step SUB230.

In step SUB230, the drive control unit 40 determines whether or not the (left) handle position is forward of (larger than) a (left) release-time position plus a distance L2. In the case where the (left) handle position is forward of (larger than) the (left) release-time position plus the distance L2 (Yes), the process proceeds to step SUB240B. Otherwise (No), the process proceeds to step SUB235. The (left) release-time position is the position in the vicinity of the center of the rail 30L to which the (left) handle is returned by the elastic members when the user is not grasping the (left) handle. For example, the drive control unit 40 stores the position of the (left) handle at the time when the (left) handle is not grasped by the user as the (left) release-time position. The distance L2 is a distance set as a dead band as appropriate.

In the case where the process proceeds to step SUB235, the drive control unit 40 determines whether or not the (left) handle position is rearward of (smaller than) the (left) release-time position minus the distance L2. In the case where the (left) handle position is rearward of (smaller than) the (left) release-time position minus the distance L2 (Yes), the process proceeds to step SUB240A. Otherwise (No), the process proceeds to step SUB250.

In the case where the process proceeds to step SUB240A, the drive control unit 40 stores a value obtained by adding the meandering correction speed $\gamma21$ to the (left) rotational speed vdl as a new (left) rotational speed vdl, and proceeds to step SUB250.

In the case where the process proceeds to step SUB240B, the drive control unit 40 stores a value obtained by subtracting the meandering correction speed $\gamma21$ from the (left) rotational speed vdl as a new (left) rotational speed vdl, and proceeds to step SUB250.

In the case where the process proceeds to step SUB250, the drive control unit 40 substitutes the (right) rotational speed vdr into the (right) target travel speed UR to store the value, substitutes the (left) rotational speed vdl into the (left) target travel speed UL to store the value, and ends the process (in this case, the process returns and proceeds to step SA020 in FIG. 10).

As described above, in the process in step SUB200, the drive control unit 40 corrects control amounts (in this case, the rotational speeds vdr and vdl) for the respective drive units using the meandering correction speed $\gamma21$ so as to reduce meandering of the walking assist device caused along with arm-swing walk of the user. In the second embodiment, the rotational speed of the (right) drive unit is defined as vdr, and the rotational speed of the (left) drive unit is defined as vdl. However, vdr may indicate the rotational speed of the (right) rear wheel 60RR, and vdl may indicate the rotational speed of the (left) rear wheel 60RL.

Figure 15:
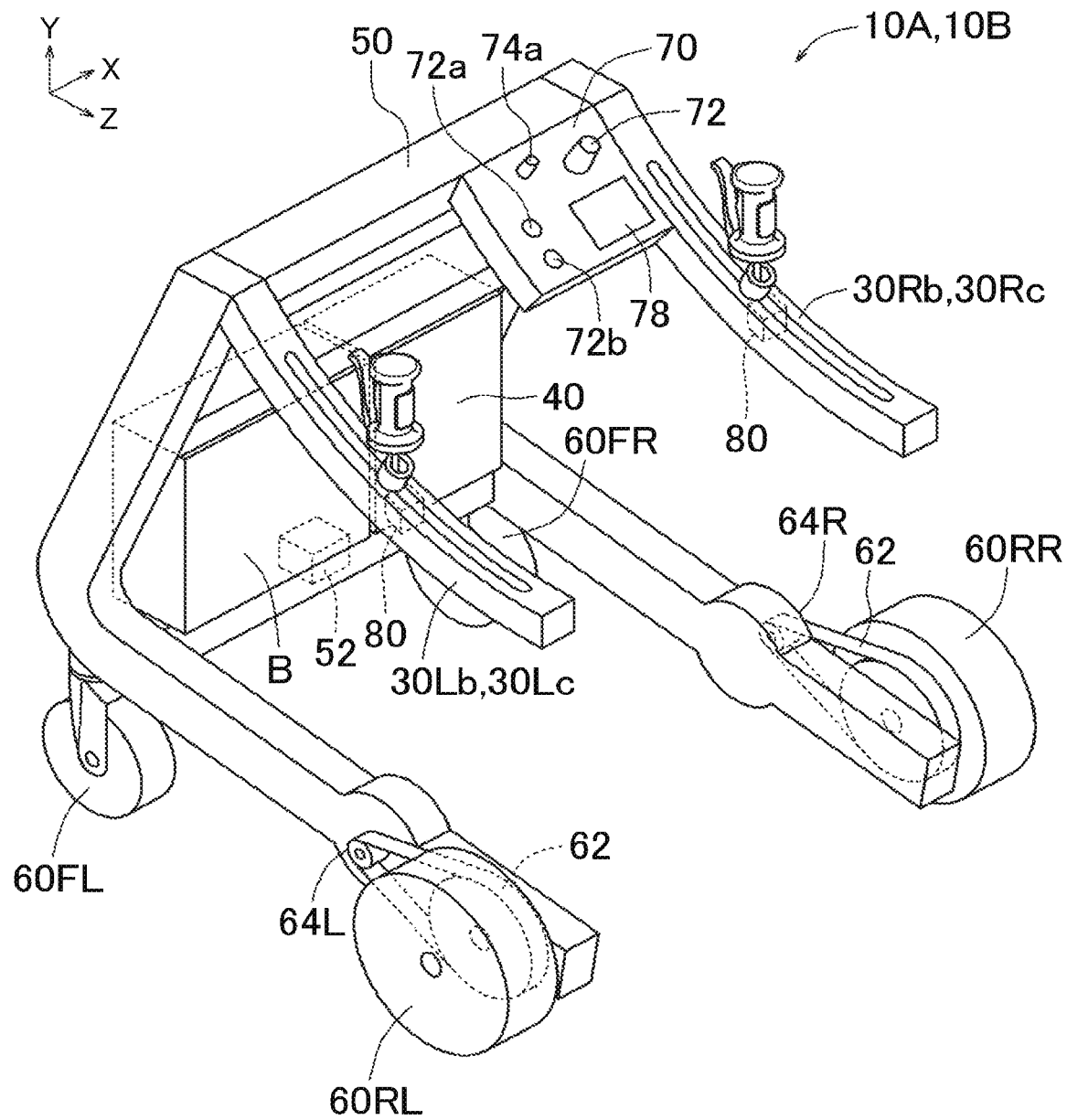
FIG. 15 is a perspective view illustrating an overall configuration of a walking assist device according to third and fourth embodiments.

FIG. 15 is a perspective view illustrating the overall configuration of walking assist devices 10A and 10B according to a third embodiment and a fourth embodiment to be discussed later.

The walking assist devices 10A and 10B differ from the walking assist device 10 in having an assist mode changeover switch 72a and a training mode changeover switch 72b. The walking assist device 10A differs from the walking assist device 10 in having rails 30Rb and 30Lb in place of the rails 30R and 30L. The walking assist device 10B differs from the walking assist device 10 in having rails 30Rc and 30Lc in place of the rails 30R and 30L.

The assist mode changeover switch 72a is set to ON in the case where the user desires an "assist mode", and set to OFF in the case where the user desires a "training mode". The training mode changeover switch 72b is set to ON in the case where the user desires the "training mode", and set to OFF in the case where the user desires the "assist mode". The assist mode changeover switch 72a and the training mode changeover switch 72b may be a single switch that switches between the "assist mode" and the "training mode".

In the "assist mode", the handles (20R, 20L, 20Rb, and 20Lb) (corresponding to the "grasp portions") (see FIGS. 17 and 20) are restrained (in a "restrained state" to be discussed later) in the front-rear direction with respect to the rails (30Rb, 30Lb, 30Rc, and 30Lc) by a lock mechanism (corresponding to the "grasp portion restraint unit"), and the walking assist devices 10A and 10B operate as a normal walker (a type of a walker to be pushed with both hands of the user without swinging his/her arms). In the "training mode", the handles (20R, 20L, 20Rb, and 20Lb) are rendered movable (in a "released state" to be discussed later) in the front-rear direction with respect to the rails (30Rb, 30Lb, 30Rc, and 30Lc) by the lock mechanism, and the walking assist devices 10A and 10B are driven in accordance with arm swing by the user.

Figure 16:
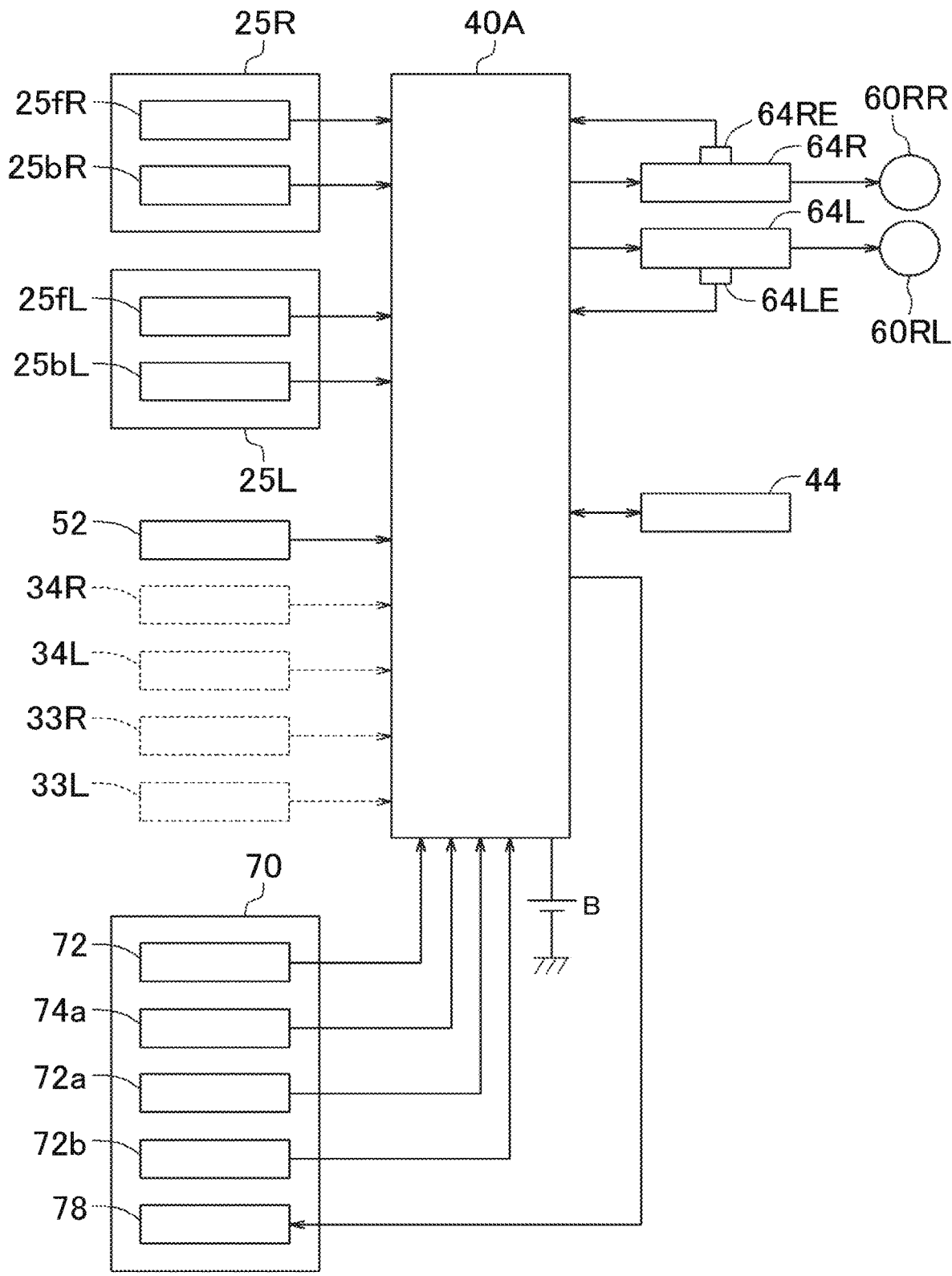
FIG. 16 illustrates inputs and outputs of a drive control unit of the walking assist device according to the third and fourth embodiments.

FIG. 16 illustrates inputs and outputs of a drive control unit 40A of the walking assist devices 10A and 10B according to the third and fourth embodiments. The drive control unit 40A differs from the drive control unit 40 in having grasp portion position detection units 34R and 34L, travel speed detection units 64RE and 64LE, the assist mode changeover switch 72a, and the training mode changeover switch 72b in place of the grasp portion position detection units 27R and 27L.

The acting force measurement units 25R and 25L are used in the walking assist device 10A according to the third embodiment. The grasp portion inclination detection units 33R and 33L and the grasp portion position detection units 34R and 34L, which are indicated by the dashed lines, are used in the walking assist device 10B according to the fourth embodiment.

Figure 17:
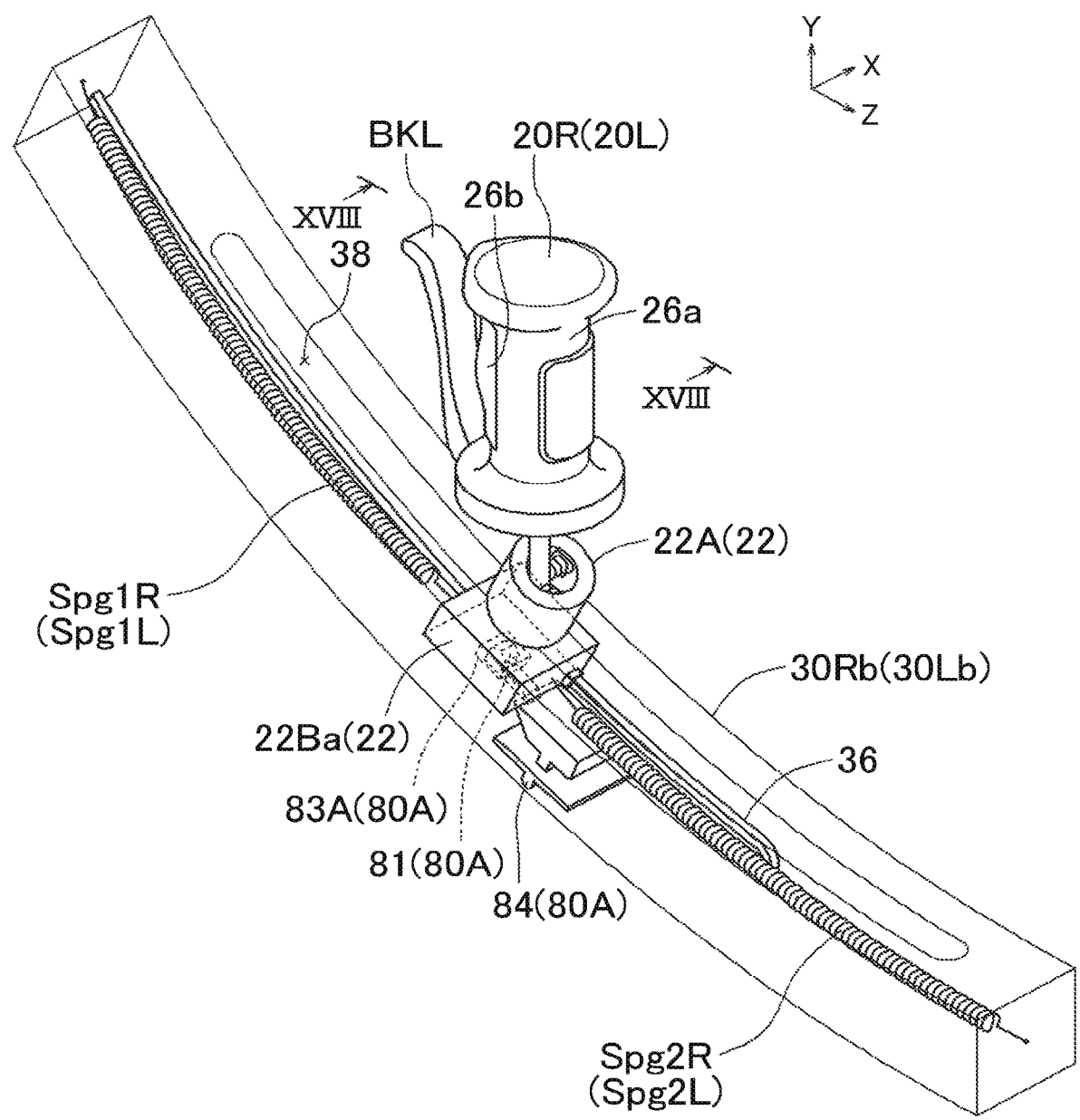
FIG. 17 is a perspective view illustrating a configuration and a function of a handle and a rail according to the third embodiment.
Figure 18:
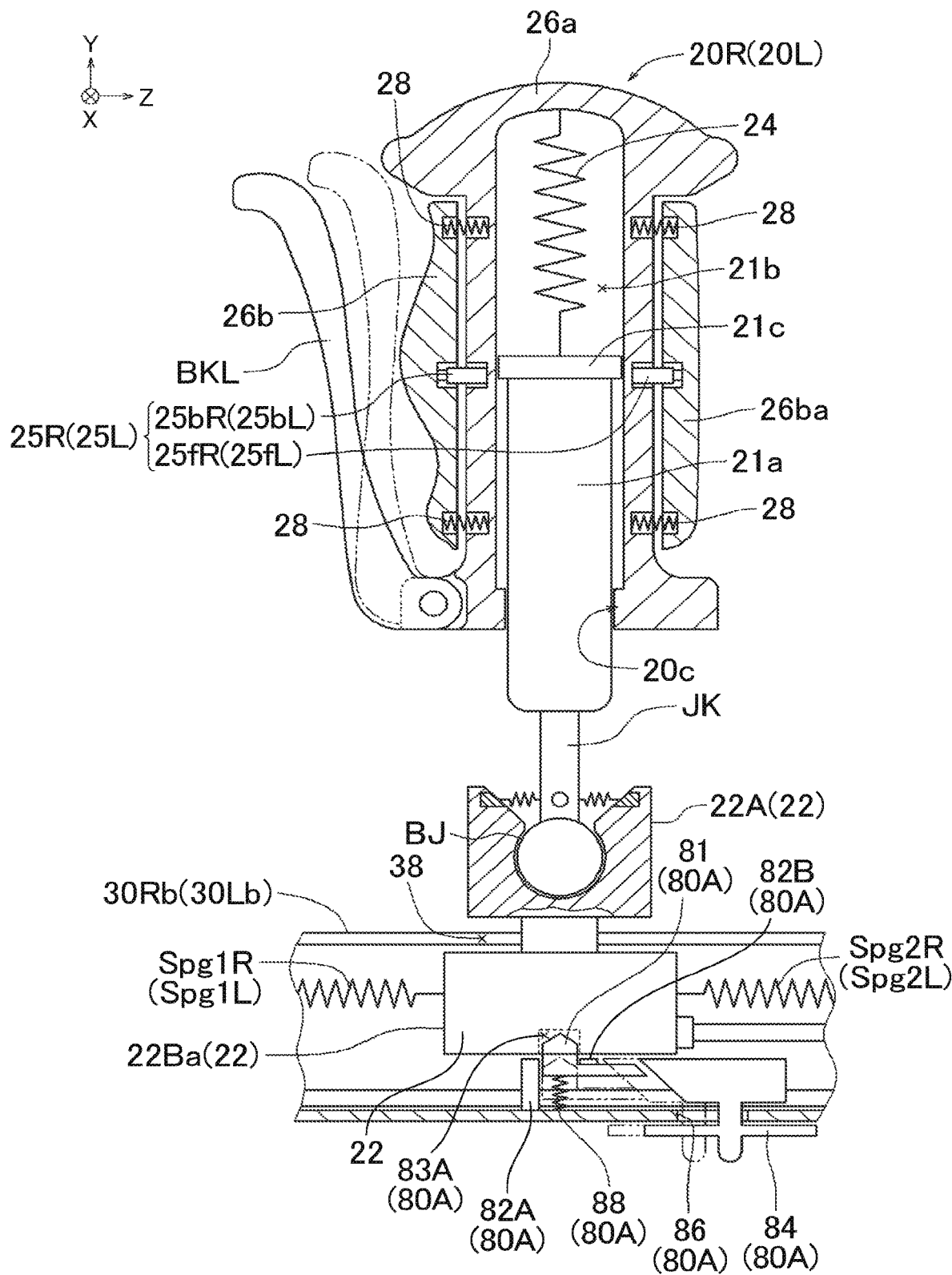
FIG. 18 is a sectional view of a handle as seen in the XVIII-XVIII direction in FIG. 17.

FIG. 17 is a perspective view illustrating the configuration and the function of a handle and a rail according to the third embodiment. FIG. 18 is a sectional view of the handle as seen in the XVIII-XVIII direction in FIG. 17.

As illustrated in FIG. 17, the rails 30Rb and 30Lb differ from the rails 30R and 30L (see FIG. 2) in having a lock mechanism 80A (corresponding to the "grasp portion restraint unit") that locks (restrains) movement of the handles (20R and 20L) in the front-rear direction. The lock mechanism 80A is provided in each of the rails 30Rb and 30Lb (corresponding to the "arm portions"), and enables the handles 20R and 20L (corresponding to the "grasp portions"), which are held at the predetermined position Op1 (see FIG. 7) by the restoring force of the holding units Spg1R, Spg2R, Spg1L, and Spg2L, to be restrained at the predetermined position Op1 in the front-rear direction with respect to the frame 50.

As illustrated in FIG. 18, the lock mechanism 80A has a lock pin 81, a lock groove 83A, pin guides 82A and 82B, a slide switch 84, a switch groove 86, and an urging unit 88, for example. The lock pin 81 is provided in each of the rails 30Rb and 30Lb such that the position of the upper distal end of the lock pin 81 in the front-rear direction is substantially equal to the predetermined position Op1. The lock groove 83A is provided in the bottom surface of an anchor portion 22Ba. The lock groove 83A has an opening sized to allow insertion of the distal end portion of the lock pin 81, and is deep enough to allow insertion of the distal end portion of the lock pin 81. Examples of the urging unit 88 include a spring.

When the user slides the slide switch 84 forward along the switch groove 86 which is provided in the rail (30Rb and 30Lb), the lock pin 81 is moved upward as guided by the pin guides 82A and 82B, and the distal end portion of the lock pin 81 is inserted into the lock groove 83A. Consequently, the lock pin 81 restricts movement of the anchor portion 22Ba in the front-rear direction, and therefore the handle (20R and 20L) is restrained at the predetermined position Op1 (see FIG. 7) in the front-rear direction with respect to the frame 50 (see FIG. 15).

When the user slides the slide switch 84 rearward along the switch groove 86 which is provided in the rail (30Rb and 30Lb), the lock pin 81 is moved downward as guided by the pin guides 82A and 82B, and the distal end portion of the lock pin 81 is extracted from the lock groove 83A. Consequently, the handle (20R and 20L) is rendered freely movable in the front-rear direction with respect to the frame 50.

The lock mechanism 80A can be set to one of a restrained state, in which the handle 20R or 20L (grasp portion) is restrained at the predetermined position Op1, and a released state, in which the handle 20R or 20L is released, rather than being restrained at the predetermined position Op1. In the case where the lock mechanism 80A is set to the restrained state, the drive control unit 40A (see FIG. 16) controls the corresponding drive unit 64R or 64L (see FIG. 16) on the basis of the corresponding acting force which is calculated on the basis of a detection signal from the corresponding acting force measurement unit 25R or 25L (see FIG. 5).

Figure 19:
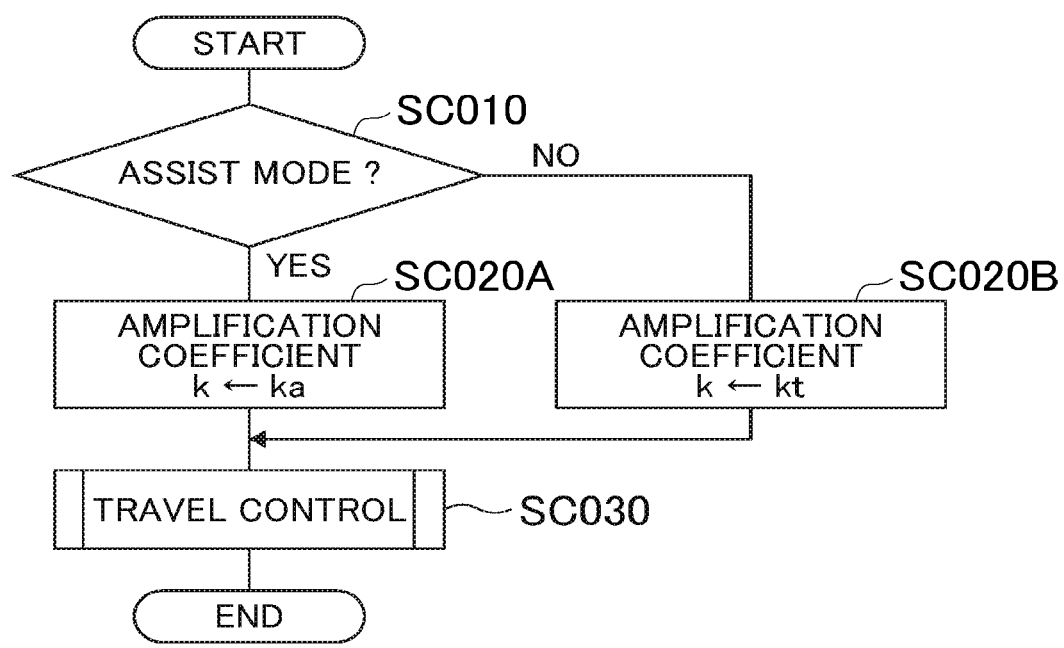
FIG. 19 is a flowchart illustrating a procedure of an overall process of travel control of the drive control unit of the walking assist device according to the third embodiment.

FIG. 19 is a flowchart illustrating the procedure of the overall process of travel control of the drive control unit 40A of the walking assist device 10A according to the third embodiment. The drive control unit 40A executes travel control at intervals of a predetermined time (e.g. at intervals of several milliseconds) when started. Steps of the process of travel control will be described in detail below.

In step SC010, the drive control unit 40A proceeds to step SC020A in the case where it is determined that the operation mode is the assist mode (Yes), and proceeds to step SC020B in the case where it is determined that the operation mode not is the assist mode (No). The drive control unit 40A determines that the operation mode is the "assist mode" in the case where the assist mode changeover switch 72a is turned on (in this case, the training mode changeover switch 72b is turned off), and determines that the operation mode is the "training mode" in the case where the training mode changeover switch 72b is turned on (in this case, the assist mode changeover switch 72a is turned off).

In step SC020A, the drive control unit 40A sets the amplification coefficient k to a predetermined value ka, and proceeds to step SC030. The predetermined value ka is the initial value of the amplification coefficient in the assist mode, and has been calculated through an experiment as appropriate and stored in advance in the storage unit 44.

In step SC020B, the drive control unit 40A sets the amplification coefficient k to a predetermined value kt, and proceeds to step SC030. The predetermined value kt is the initial value of the amplification coefficient in the training mode, and has been calculated through an experiment as appropriate and stored in advance in the storage unit 44.

In step SC030, the drive control unit 40A executes the process of travel control in FIG. 6, and ends the process.

Figure 20:
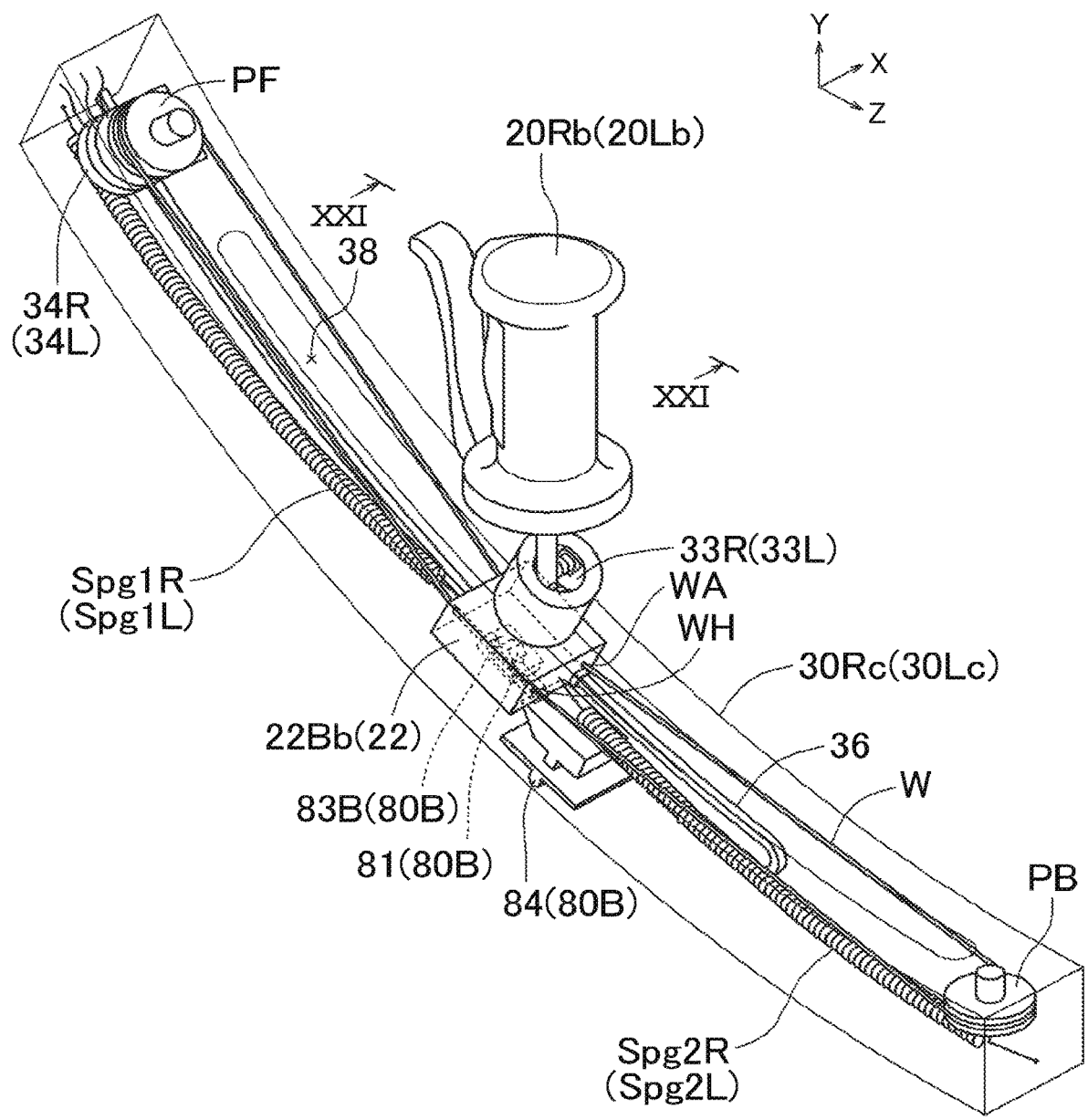
FIG. 20 is a perspective view illustrating a configuration and a function of a handle and a rail according to the fourth embodiment.
Figure 21:
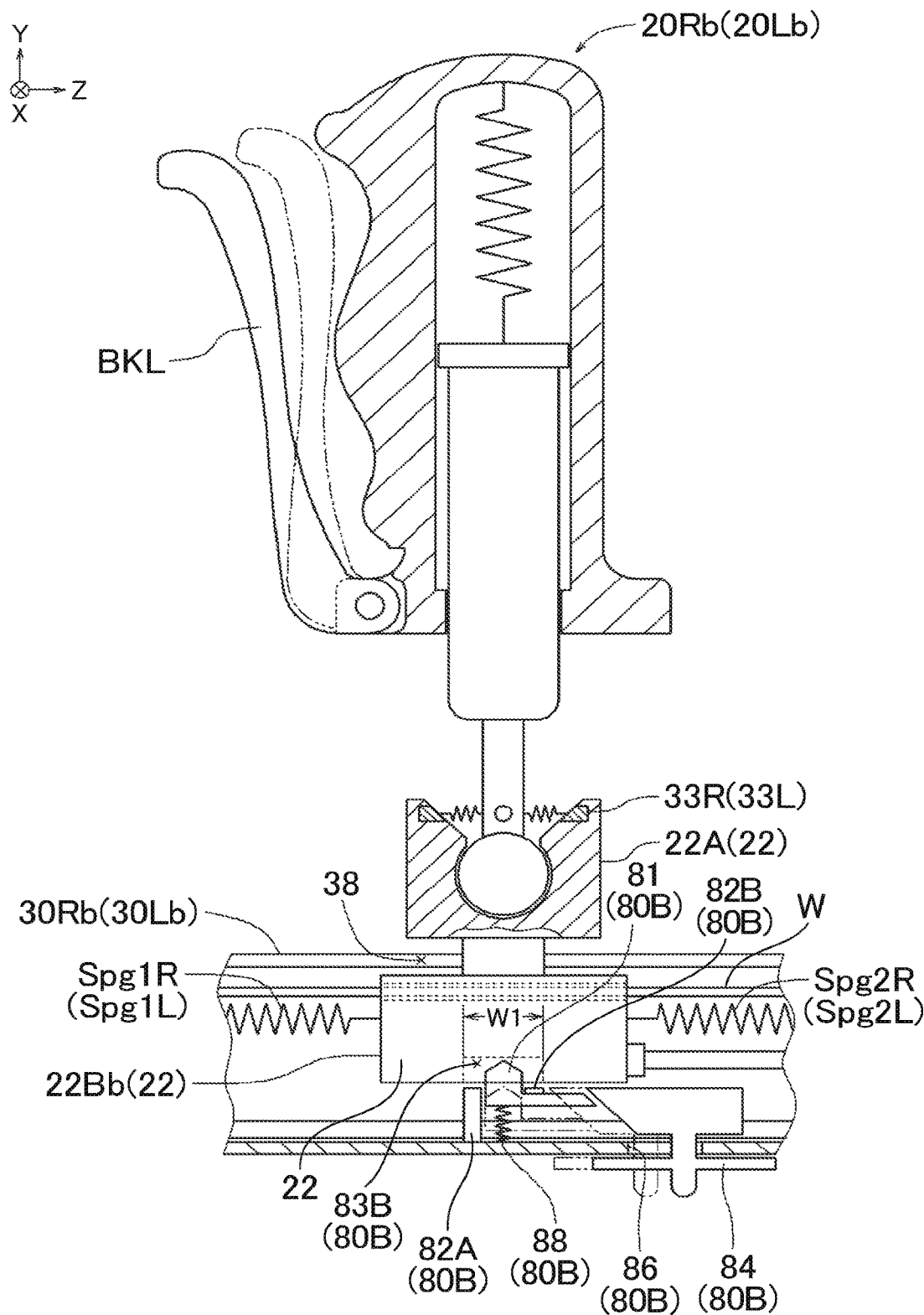
FIG. 21 is a sectional view of a handle as seen in the XXI-XXI direction in FIG. 20.

FIG. 20 is a perspective view illustrating the configuration and the function of a handle and a rail according to the fourth embodiment. FIG. 21 is a sectional view of the handle as seen in the XXI-XXI direction in FIG. 20.

As illustrated in FIG. 20, the rail 30Rc (30Lc) differs from the rail 30R (30L) in having the handle 20Rb (20Lb), pulleys PB and PF, and a wire W.

The rail 30Rc (30Lc) is provided with the pulleys PB and PF at both ends thereof in the front-rear direction. The wire W is wound around the pulley PF, which is provided on the front side, and the pulley PB, which is provided on the rear side, so that the pulleys PF and PB are rotated in conjunction with each other. The wire W is fixed to a wire connection portion WA of an anchor portion 22Bb, and the wire W is inserted through a wire hole WH without being fixed. The handle 20Rb (20Lb) is connected to the anchor portion 22Bb.

The grasp portion position detection units 34R are 34L may be an encoder, for example, and are each provided coaxially with the pulley PF. Consequently, when the user grasps and moves the handle 20Rb (20Lb) in the front-rear direction of the frame 50, the amount of rotation of the pulley PF, that is, the amount of movement of the handle 20Rb (20Lb) is output to the drive control unit 40A (see FIG. 16).

As illustrated in FIG. 16, the drive unit 64L is provided with the travel speed detection unit 64LE such as an encoder, which outputs a detection signal that matches rotation of the drive unit 64L to the drive control unit 40A. The drive control unit 40A can detect the travel speed of the walking assist device 10B (speed of travel by the rear wheel 60RL) on the basis of the detection signal from the travel speed detection unit 64LE. Similarly, the drive unit 64R is provided with the travel speed detection unit 64RE such as an encoder, which outputs a detection signal that matches rotation of the drive unit 64R to the drive control unit 40A. The drive control unit 40A can detect the travel speed of the walking assist device 10B (speed of travel by the rear wheel 60RR) on the basis of the detection signal from the travel speed detection unit 64RE.

The rails 30Rc and 30Lc differ from the rails 30R and 30L in having a lock mechanism 80B (corresponding to the "grasp portion restraint unit") that locks movement of the handles (20Rb and 20Lb) in the front-rear direction. The lock mechanism 80B is provided in each of the rails 30Rc and 30Lc (corresponding to the "arm portions"), and enables the handles 20Rb and 20Lb (corresponding to the "grasp portions"), which are held at the predetermined position Op1 (see FIG. 7) by the restoring force of the holding units Spg1R, Spg2R, Spg1L, and Spg2L, to be restrained in the vicinity of the predetermined position Op1 in the front-rear direction with respect to the frame 50 (see FIG. 15). The vicinity of the predetermined position Op1 is within a margin movement distance W1 about the predetermined position Op1.

As illustrated in FIG. 21, the lock mechanism 80B differs from the lock mechanism 80A in having a lock groove 83B in place of the lock groove 83A. The lock groove 83B is provided in the bottom surface of the anchor portion 22Bb, has a width of the margin movement distance W1 in the front-rear direction, and is deep enough to allow insertion of the distal end portion of the lock pin 81.

When the user slides the slide switch 84 forward along the switch groove 86 which is provided in the rail (30Rc and 30Lc), the lock pin 81 is moved upward as guided by the pin guides 82A and 82B, and the distal end portion of the lock pin 81 is inserted into the lock groove 83B. Consequently, the handle (20Rb and 20Lb) is restrained in the vicinity of the predetermined position Op1 (see FIG. 7) in the front-rear direction with respect to the frame 50.

When the user slides the slide switch 84 rearward along the switch groove 86 which is provided in the rail (30Rc and 30Lc), the lock pin 81 is moved downward as guided by the pin guides 82A and 82B, and the distal end portion of the lock pin 81 is extracted from the lock groove 83A. Consequently, the handle (20R and 20L) is rendered freely movable in the front-rear direction with respect to the frame 50.

The lock mechanism 80B can be set to one of a restrained state, in which the handle 20Rb or 20Lb (grasp portion) is restrained in the vicinity of the predetermined position Op1, and a released state, in which the handle 20Rb or 20Lb is released, rather than being restrained at the predetermined position Op1. In the case where the lock mechanism 80B is set to the restrained state, the drive control unit 40A (see FIG. 16) controls the corresponding drive unit 64R or 64L (see FIG. 16) on the basis of the position of the corresponding handle 20Rb or 20Lb (grasp portion) in the front-rear direction with respect to the frame 50, which is calculated on the basis of a detection signal from the corresponding grasp portion position detection unit 34R or 34L.

Figure 22:
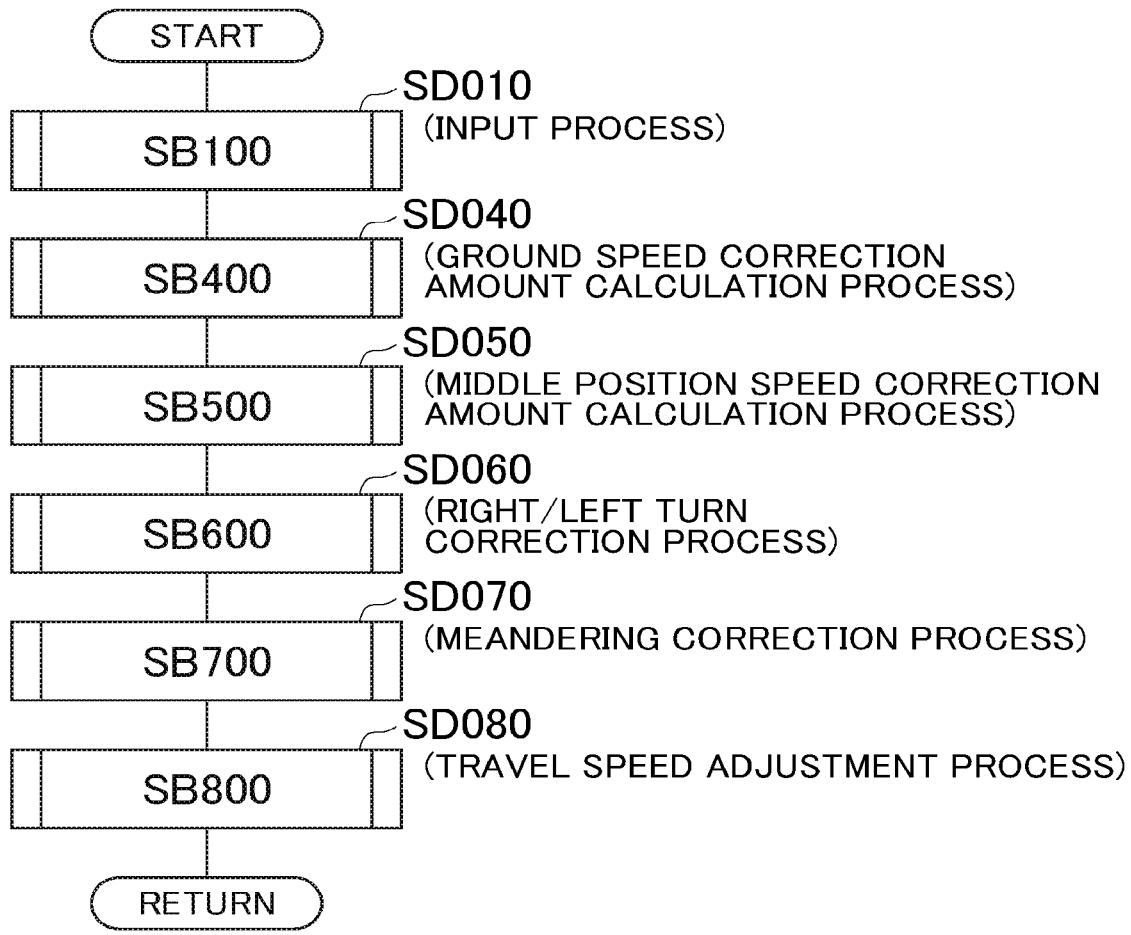
FIG. 22 is a flowchart illustrating a process procedure (an overall process) of the drive control unit of the walking assist device.

FIG. 22 illustrates the overall process of the process procedure of the drive control unit 40A. When the user turns on the main switch 72, the process illustrated in FIG. 22 is started at intervals of a predetermined time (e.g. at intervals of several milliseconds). When the process illustrated in FIG. 22 is started, the drive control unit 40A proceeds to step SD010. An example of a case where the user walks to travel forward together with the walking assist device will be described below.

In step SD010, the drive control unit 40A executes SB100 (input process), and proceeds to step SD040. SB100 (input process) will be discussed in detail later.

In step SD040, the drive control unit 40A executes SB400 (ground speed correction amount calculation process), and proceeds to step SD050. SB400 (ground speed correction amount calculation process) will be discussed in detail later.

In step SD050, the drive control unit 40A executes SB500 (middle position speed correction amount calculation process), and proceeds to step SD060. SB500 (middle position speed correction amount calculation process) will be discussed in detail later.

In step SD060, the drive control unit 40A executes SB600 (right/left turn correction process), and proceeds to step SD070. SB600 (right/left turn correction process) will be discussed in detail later.

In step SD070, the drive control unit 40A executes SB700 (meandering correction process), and proceeds to step SD080. SB700 (meandering correction process) will be discussed in detail later.

In step SD080, the drive control unit 40A executes SB800 (travel speed adjustment process), and ends the process (returns). SB800 (travel speed adjustment process) will be discussed in detail later.

Figure 23:
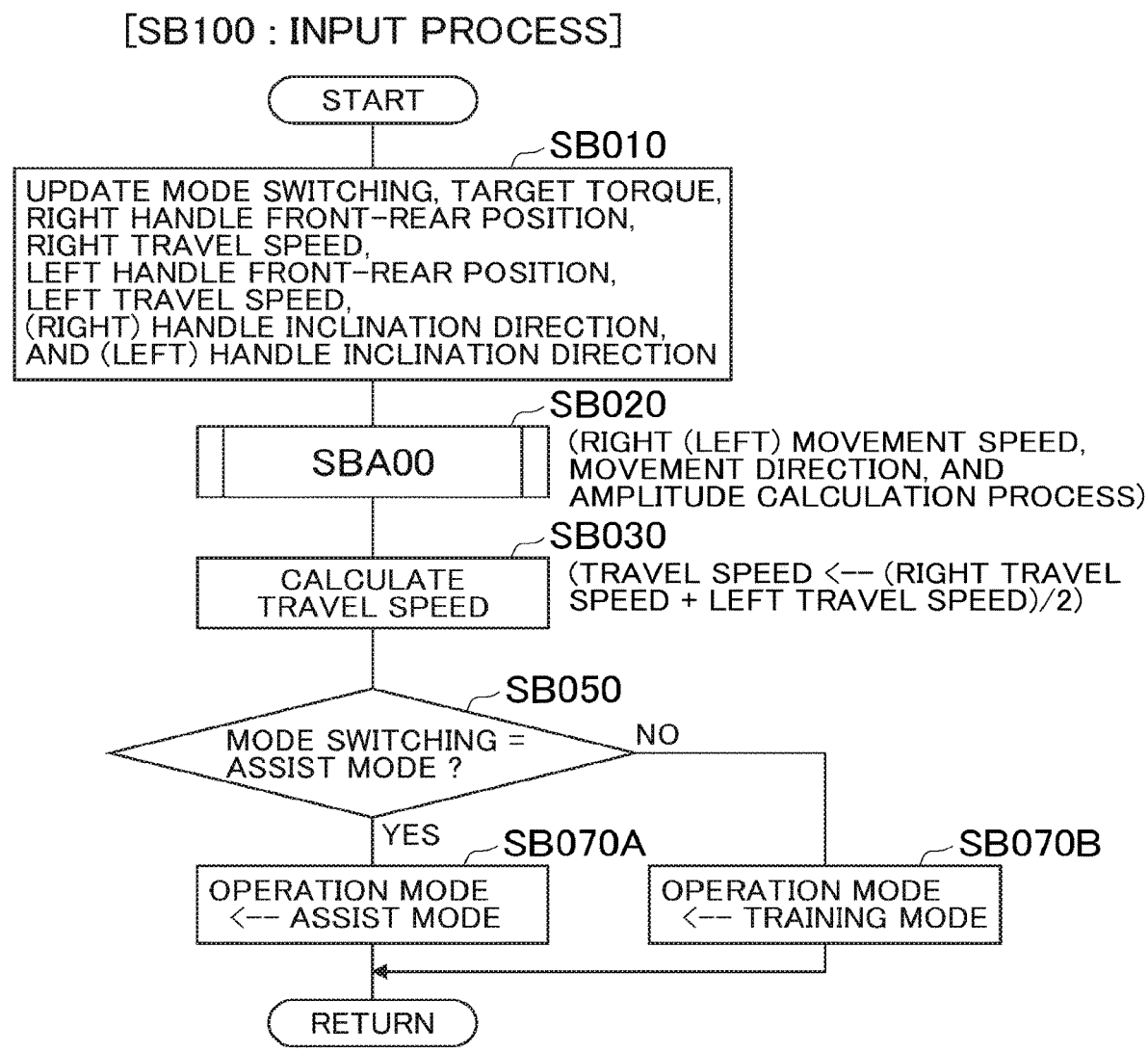
FIG. 23 is a flowchart illustrating a process procedure of an input process, of the overall process illustrated in FIG. 22.

Next, SB100 (input process) will be described in detail with reference to FIG. 23. When executing SB100 in step SD010 illustrated in FIG. 22, the drive control unit 40A proceeds to step SB010 illustrated in FIG. 23.

In step SB010, the drive control unit 40A updates the mode switching, target torque, right handle front-rear position, right travel speed, left handle front-rear position, left travel speed, (right) handle inclination direction, and (left) handle inclination direction, which are stored in the storage unit, and proceeds to step SB020.

Specifically, the drive control unit 40A stores one of the "training mode" and the "assist mode" as the mode switching on the basis of information input from the assist mode changeover switch 72a and the training mode changeover switch 72b (see FIG. 16). The drive control unit 40A stores target torque based on information input from the assist amount adjustment volume 74a (see FIG. 16). The drive control unit 40A stores, as the right handle front-rear position, the position of the (right) handle 20Rb with respect to the frame 50 (position in the front-rear direction of the frame), which is calculated on the basis of a detection signal from the grasp portion position detection unit 34R (see FIG. 20). The drive control unit 40A detects the rotational speed of the (right) drive unit 64R for travel on the basis of a detection signal from the (right) travel speed detection unit 64RE for the (right) drive unit 64R for travel, detects the speed of travel by the rear wheel 60RR from the rotational speed of the rear wheel 60RR, and stores the detected travel speed as the right travel speed (see FIG. 1). The drive control unit 40A detects the direction of inclination, in the front-rear direction and the right-left direction, and the amount of inclination of the (right) handle 20Rb with respect to the anchor portion 22Bb on the basis of a detection signal from the grasp portion inclination detection unit 33R for the (right) handle 20Rb, and stores the detected direction and amount as the (right) handle inclination direction (see FIG. 20). Similarly, the drive control unit 40A stores the left handle front-rear position, the left travel speed, and the (left) handle inclination direction.

In step SB020, the drive control unit 40A executes SBA00 (right (left) movement speed, movement direction, and amplitude calculation process), and proceeds to step SB030. SBA00 (right (left) movement speed, movement direction, and amplitude calculation process) will be discussed in detail later.

In step SB030, the drive control unit 40A calculates the travel speed of the walking assist device on the basis of the right travel speed and the left travel speed which are stored in step SB010, stores the calculated travel speed, and proceeds to step SB050. For example, the drive control unit 40A calculates the travel speed as travel speed=(right travel speed+left travel speed)/2.

The drive control unit 40a which executes the process in step SB030 calculates the travel speed of the walking assist device 10 with respect to the ground on the basis of detection signals from the travel speed detection units.

In step SB050, the drive control unit 40A determines whether or not the mode is switched to the assist mode. The drive control unit 40A proceeds to step SB070A in the case where the mode is switched to the assist mode (Yes), and proceeds to step SB070B otherwise (No).

In the case where the process proceeds to step SB070A, the drive control unit 40A stores the assist mode as the operation mode, and ends the process (returns).

In the case where the process proceeds to step SB070B, the drive control unit 40A stores the training mode as the operation mode, and ends the process (returns).

Figure 24A:
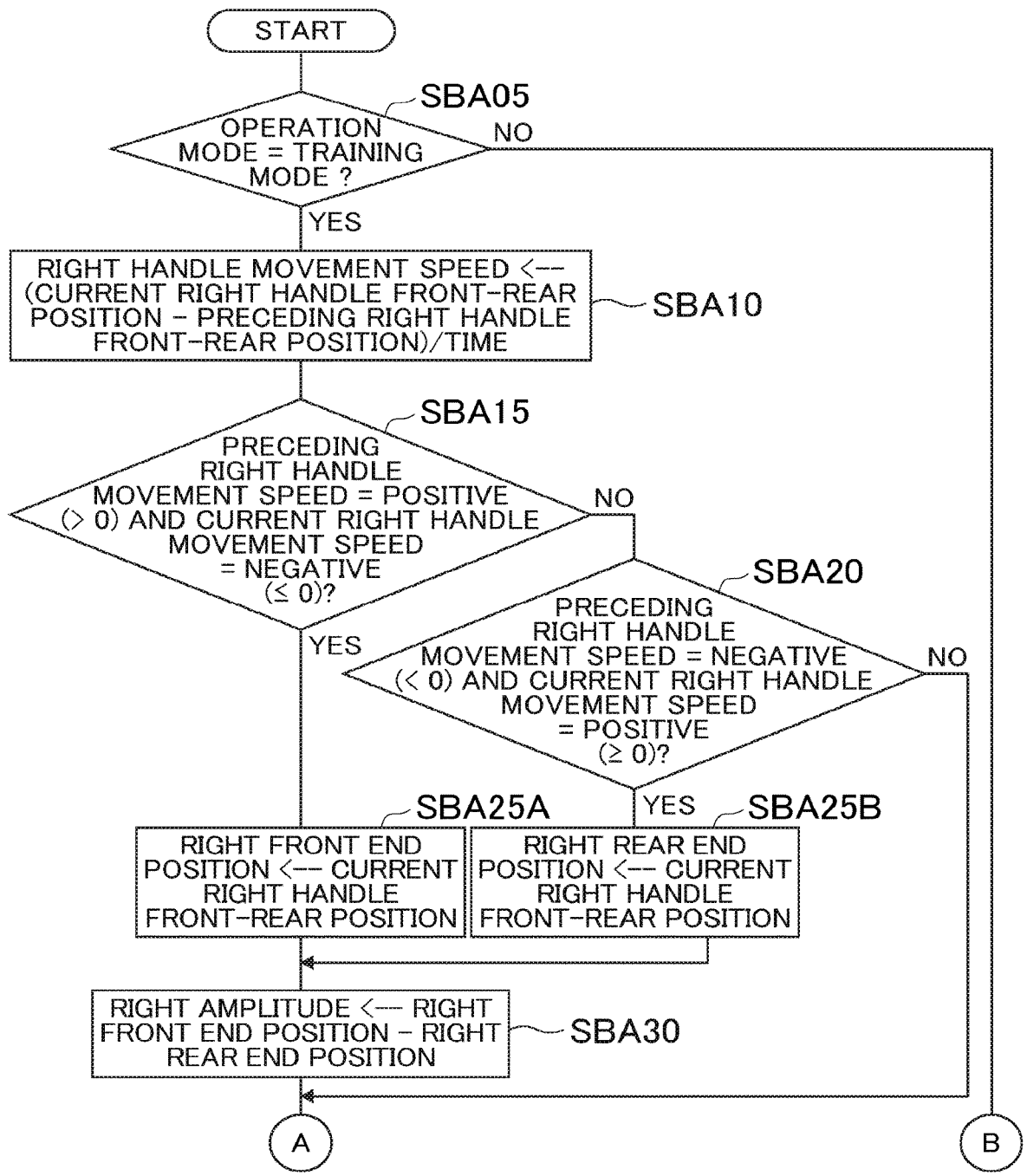
FIG. 24A is a flowchart illustrating a process procedure of a right (left) movement speed, movement direction, and amplitude calculation process, of the input process illustrated in FIG. 23.
Figure 24B:
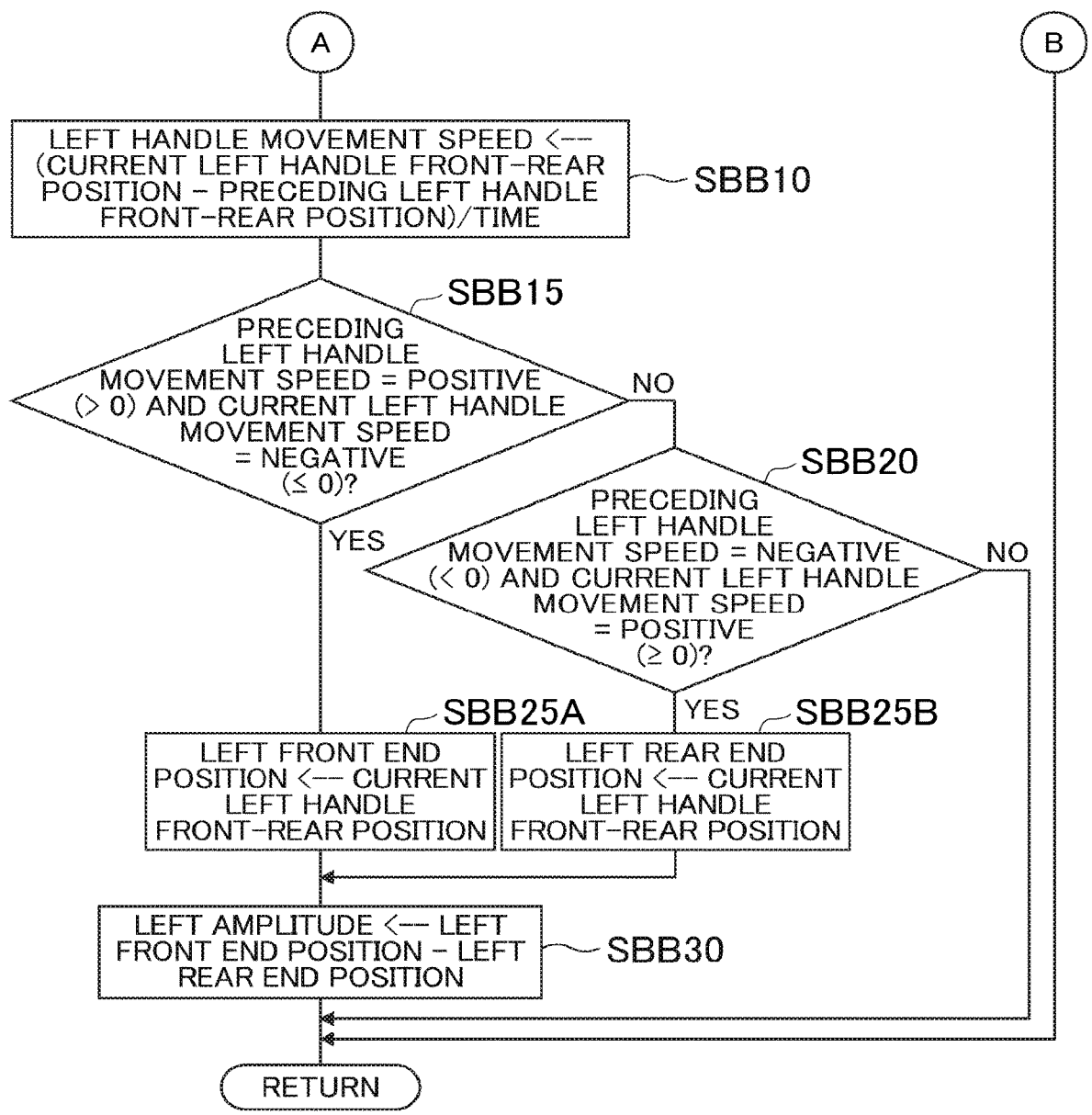
FIG. 24B is a flowchart illustrating a process procedure of a right (left) movement speed, movement direction, and amplitude calculation process, of the input process illustrated in FIG. 23.

Next, SBA00 (right (left) movement speed, movement direction, and amplitude calculation process) will be described in detail with reference to FIG. 24A and FIG. 24B. When executing SBA00 in step SB020 illustrated in FIG. 23, the drive control unit 40A proceeds to step SBA05 illustrated in FIG. 24A.

In step SBA05, the drive control unit 40A determines whether or not the operation mode is the training mode. The drive control unit 40A proceeds to step SBA10 in the case where the operation mode is the training mode (Yes), and ends the process (returns) in the case where the operation mode is not the training mode (No).

In the case where the process proceeds to step SBA10, the drive control unit 40A stores, as the right handle movement speed, a speed calculated as "(right handle front-rear position at the time of the current processing (current right handle front-rear position)−right handle front-rear position at the time of the preceding processing (preceding right handle front-rear position))/time", and proceeds to step SBA15. In this case, the term "time" indicates the time of intervals at which the process in FIG. 22 is started (e.g. 10 [ms] in the case where the process is started at intervals of 10 [ms]). In the case where the current right handle front-rear position is forward of the preceding right handle front-rear position, the right handle movement speed is a "positive" speed. In the case where the current right handle front-rear position is rearward of the preceding right handle front-rear position, the right handle movement speed is a "negative" speed.

In step SBA15, the drive control unit 40A determines whether or not the right handle movement speed at the time of the preceding processing (preceding right handle movement speed) is positive (more than 0) and the right handle movement speed at the time of the current processing (current right handle movement speed) is negative (equal to or less than 0). The drive control unit 40A proceeds to step SBA25A in the case where such conditions are met (Yes), and proceeds to step SBA20 in the case where such conditions are not met (No).

In the case where the process proceeds to step SBA25A, the drive control unit 40A stores the current right handle front-rear position as the right front end position, and proceeds to step SBA30.

In the case where the process proceeds to step SBA20, the drive control unit 40A determines whether or not the right handle movement speed at the time of the preceding processing (preceding right handle movement speed) is negative (less than 0) and the right handle movement speed at the time of the current processing (current right handle movement speed) is positive (equal to or more than 0). The drive control unit 40A proceeds to step SBA25B in the case where such conditions are met (Yes), and proceeds to step SBB10 in the case where such conditions are not met (No).

In the case where the process proceeds to step SBA25B, the drive control unit 40A stores the current right handle front-rear position as the right rear end position, and proceeds to step SBA30.

In the case where the process proceeds to step SBA30, the drive control unit 40A stores, as the right amplitude, a length calculated as the right front end position minus the right rear end position (right front end position>right rear end position), and proceeds to step SBB10.

Steps SBB10 to SBB30, in which the left movement speed of the left handle 20L, the left front end position, the left rear end position, and the left amplitude are calculated, are similar to steps SBA10 to SBA30, in which the right movement speed of the right handle 20R, the right front end position, the right rear end position, and the right amplitude are calculated, and thus are not described.

The drive control unit 40A which executes the processes in steps SBA10 and SBB10 corresponds to a handle movement speed calculation unit 40C (see FIG. 13), which calculates the respective handle movement speeds (right handle movement speed and left handle movement speed), which are the respective movement speeds of the handles with respect to the walking assist device 10B, on the basis of the respective handle front-rear positions (right handle front-rear position and left handle front-rear position).

Figure 25:
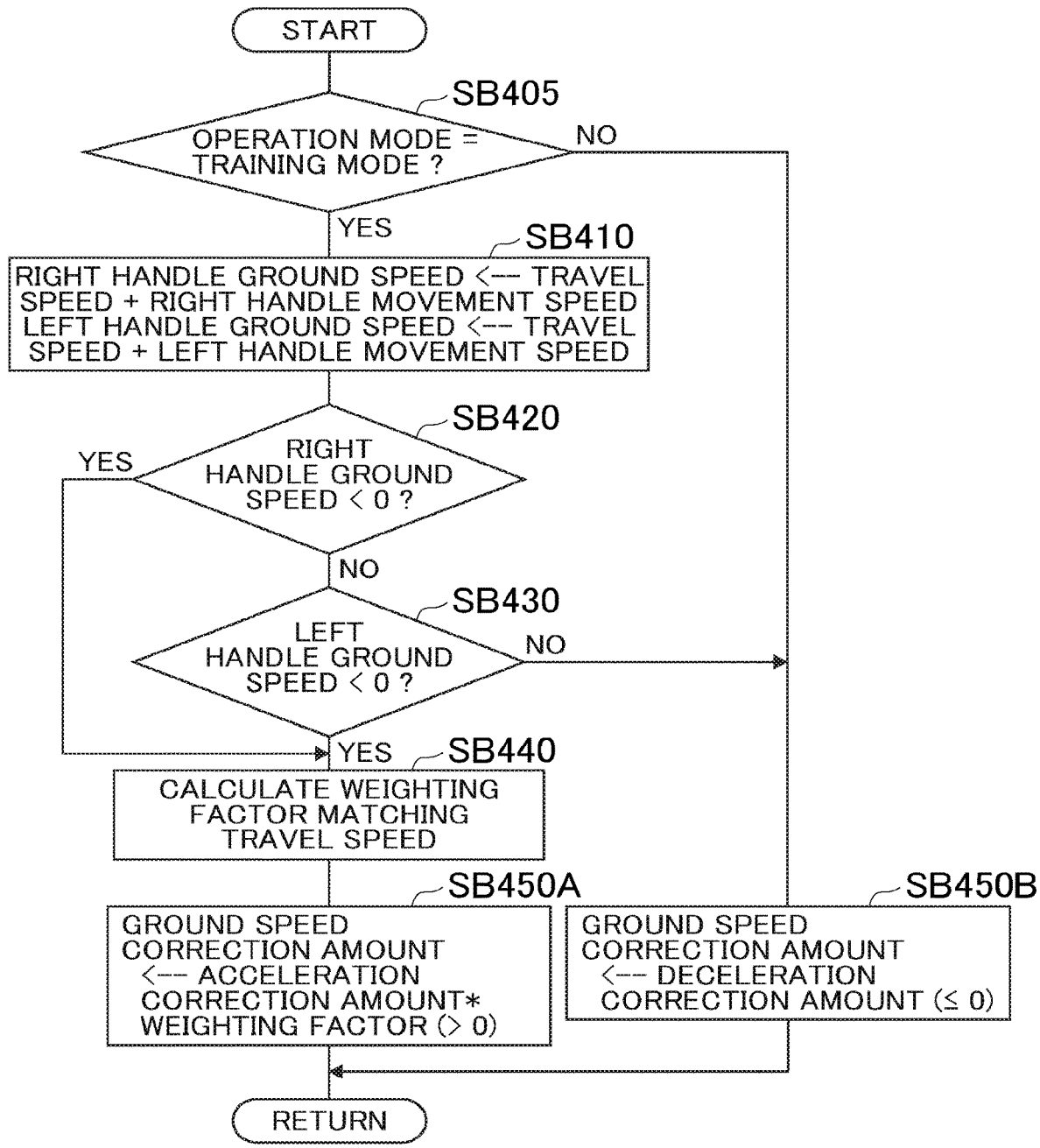
FIG. 25 is a flowchart illustrating a process procedure of a ground speed correction amount calculation process, of the overall process illustrated in FIG. 22.

Next, SB400 (ground speed correction amount calculation process) will be described in detail with reference to FIG. 25. When executing SB400 in step SD040 illustrated in FIG. 22, the drive control unit 40A proceeds to step SB405 illustrated in FIG. 25.

In step SB405, the drive control unit 40A determines whether or not the operation mode is the training mode. The drive control unit 40A proceeds to step SB410 in the case where the operation mode is the training mode (Yes), and proceeds to step SB450B in the case where the operation mode is not the training mode (No).

In step SB410, the drive control unit 40A calculates and stores "travel speed+right handle movement speed" as the right handle ground speed, calculates and stores "travel speed+left handle movement speed" as the left handle ground speed, and proceeds to step SB420. The "travel speed" is the speed of the walking assist device with respect to the ground. The "right handle movement speed" is the speed of movement, in the front-rear direction of the frame, of the (right) handle 20Rb with respect to the walking assist device. The "right handle ground speed" is the speed of movement, in the front-rear direction of the frame, of the (right) handle 20Rb with respect to the ground. The "right handle movement speed" is set to a "positive" speed when the "right handle movement speed" is in the same direction as the "travel speed", and set to a "negative" speed when the "right handle movement speed" is in the opposite direction to the "travel speed". That is, in the case where the travel speed is the speed of forward travel, the speed of forward movement of the right handle is "positive", and the speed of rearward movement of the right handle is "negative". The left handle ground speed is calculated in a similar manner. 101831 The drive control unit 40A which executes the process in step SB410 calculates the handle ground speeds (right handle ground speed and left handle ground speed), which are the respective speeds of the handles with respect to the ground, on the basis of the respective movement speeds of the handles and the travel speed.

In step SB420, the drive control unit 40A determines whether or not the right handle ground speed is negative (less than 0). The drive control unit 40A proceeds to step SB440 in the case where the right handle ground speed is negative (less than 0) (Yes), and proceeds to step SB430 otherwise (No).

In the case where the process proceeds to step SB430, the drive control unit 40A determines whether or not the left handle ground speed is negative (less than 0). The drive control unit 40A proceeds to step SB440 in the case where the left handle ground speed is negative (less than 0) (Yes), and proceeds to step SB450B otherwise (No).

In the case where the process proceeds to step SB440, the drive control unit 40A calculates a weighting factor that matches the travel speed, and proceeds to step SB450A. The weighting factor is set so as to become smaller as the travel speed becomes higher, for example.

In step SB450A, the drive control unit 40A stores, as the ground speed correction amount, a value calculated by multiplying an acceleration correction amount set in advance by the weighting factor, and ends the process (returns). The acceleration correction amount has been determined through a variety of experiments, simulations, etc. The ground speed correction amount in this case is a value that is more than 0 (a positive value; a correction amount for acceleration).

In the case where the travel speed is "positive" and at least one of the respective handle ground speeds of the handles is a "negative" speed, the drive control unit 40A which executes the processes in steps SB440 and SB450A calculates a ground speed correction amount that accelerates the walking assist device in the direction of the travel speed.

In the case where the process proceeds to step SB450B, the drive control unit 40A stores a deceleration correction amount set in advance as the ground speed correction amount, and ends the process (returns). The deceleration correction amount has been determined through a variety of experiments, simulations, etc. The ground speed correction amount in this case is a value that is equal to or less than 0 (zero or a negative value; a correction amount for deceleration).

In the case where the ground speed correction amount is a positive value which is more than 0, the travel speed of the walking assist device can be increased. In the case where the ground speed correction amount is a negative value which is less than 0, the travel speed of the walking assist device can be reduced. In the case where the ground speed correction amount is zero, the walking assist device coasts, but the travel speed of the walking assist device is decreased by a rolling resistance etc.

Figure 26:
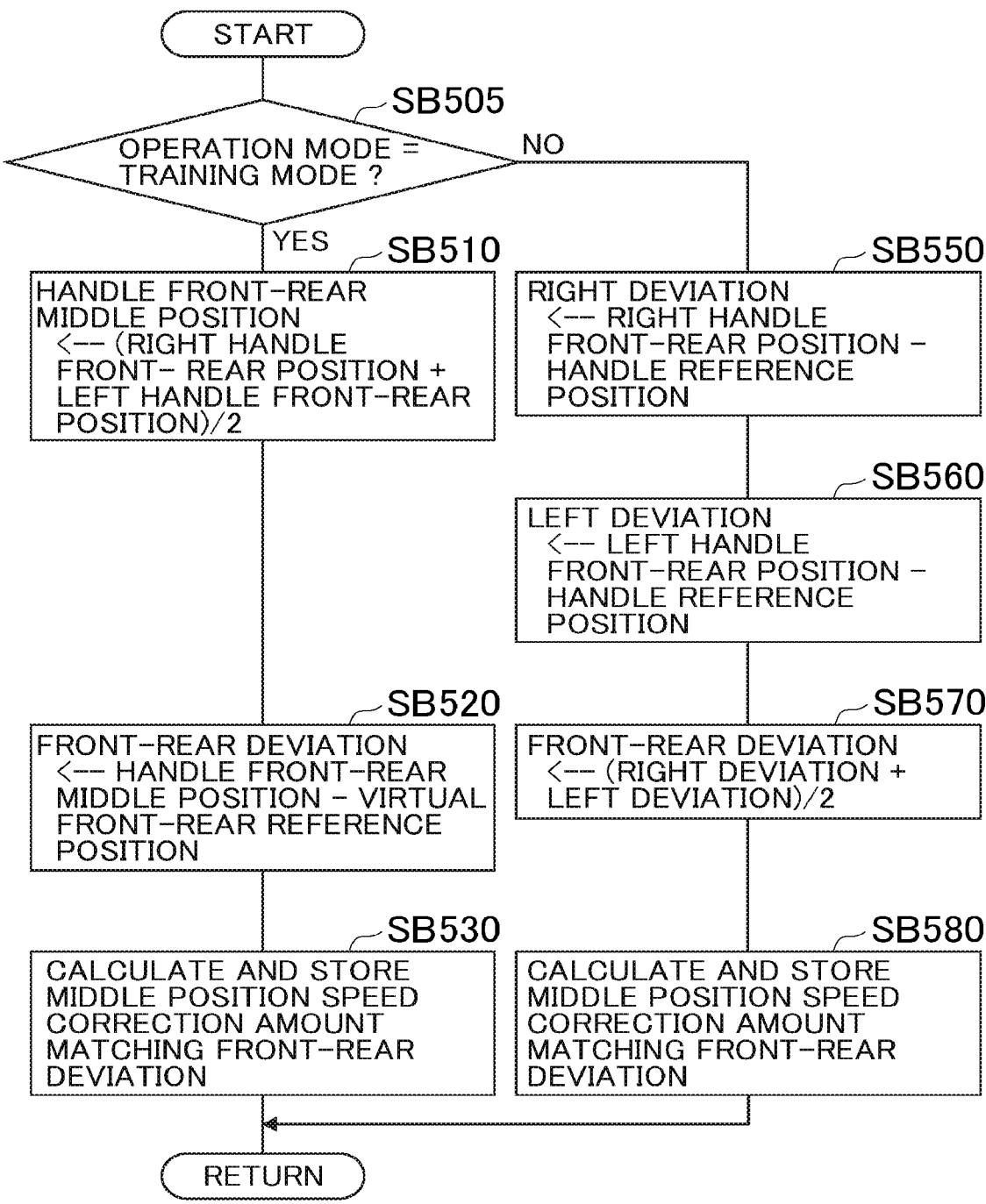
FIG. 26 is a flowchart illustrating a process procedure of a middle position speed correction amount calculation process, of the overall process illustrated in FIG. 22.

Next, SB500 (middle position speed correction amount calculation process) will be described in detail with reference to FIG. 26. When executing SB500 in step SD050 illustrated in FIG. 22, the drive control unit 40A proceeds to step SB505 illustrated in FIG. 26.

In step SB505, the drive control unit 40A determines whether or not the operation mode is the training mode. The drive control unit 40A proceeds to step SB510 in the case where the operation mode is the training mode (Yes), and proceeds to step SB550 in the case where the operation mode is not the training mode (No).

In the case where the process proceeds to step SB510, the drive control unit 40A calculates and stores "(right handle front-rear position+left handle front-rear position)/2" as the handle front-rear middle position, and proceeds to step SB520.

The drive control unit 40A which executes the process in step SB510 calculates the handle front-rear middle position, which is the middle of the respective handle front-rear positions in the front-rear direction of the frame.

Figure 30:
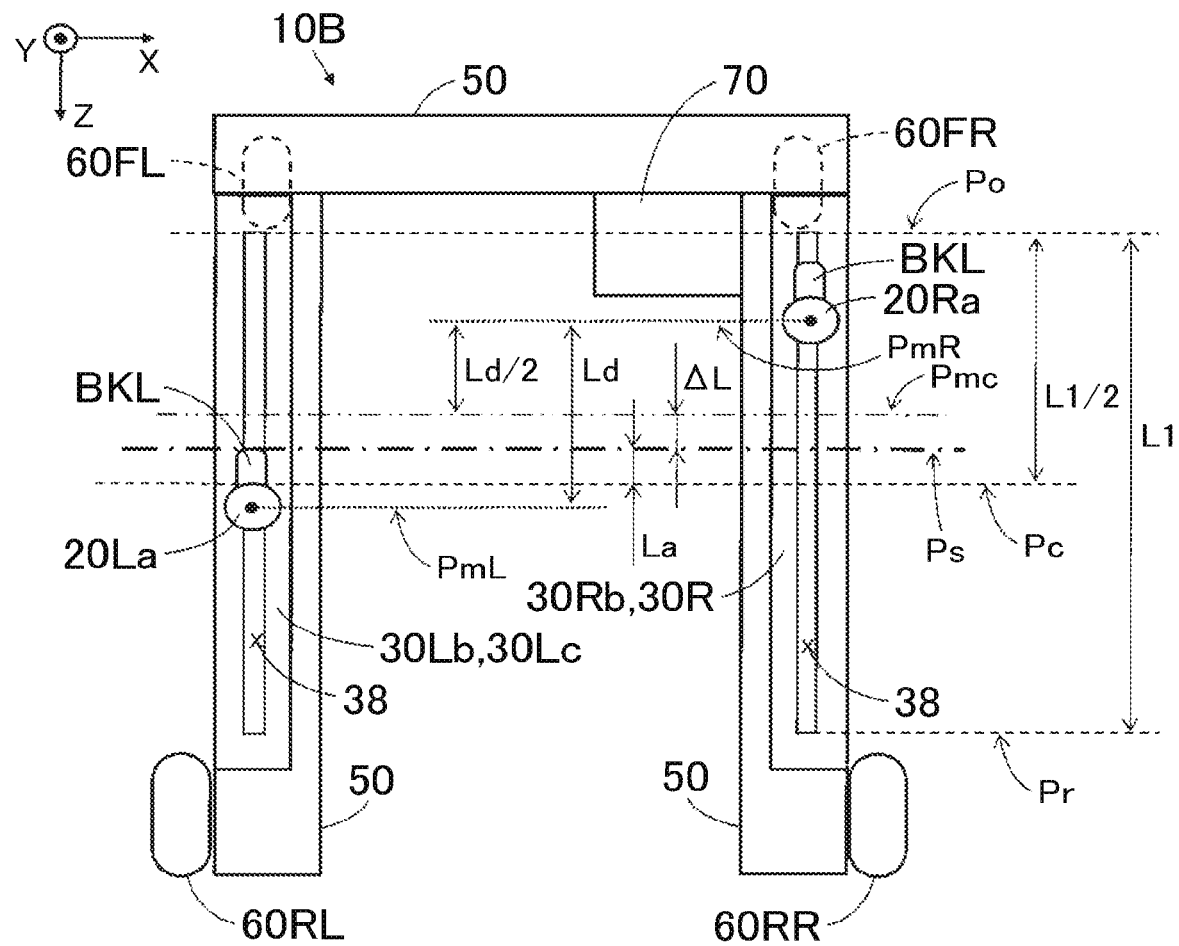
FIG. 30 is a plan view of the walking assist device, illustrating handle front-rear positions, a handle front-rear middle position, a virtual front-rear reference position, etc.

FIG. 30 illustrates the walking assist device 10B (see FIG. 15) as seen from the above, and illustrates a handle front-rear position (PmR) of the (right) handle 20Rb, a handle front-rear position (PmL) of the (left) handle 20Lb, a virtual front-rear reference position (Ps), a handle front-rear middle position (Pmc), and a middle position (Pc) of a movable range (range of movement of the handles 20Rb and 20Lb in the front-rear direction of the frame). For example, in the front-rear direction of the frame, a movable range L1 of the handles 20Rb and 20Lb extends from a front end position (Po) of the movable range L1 to a rear end position (Pr) of the movable range. The middle position (Pc) is the position of the middle of the movable range L1 in the front-rear direction of the frame. For example, the virtual front-rear reference position (Ps), which is a predetermined position in the front-rear direction of the frame, is set to a position that is a predetermined distance La forward of the middle position (Pc) of the movable range L1 The handle front-rear middle position (Pmc) is determined as the position of the middle, in the front-rear direction of the frame, between the right handle front-rear position (PmR) and the left handle front-rear position (PmL).

In step SB520, the drive control unit 40A calculates and stores "handle front-rear middle position−virtual front-rear reference position" as the front-rear deviation, and proceeds to step SB530. As illustrated in FIG. 30, the front-rear deviation ΔL is the deviation between the handle front-rear middle position (Pmc) and the virtual front-rear reference position (Ps).

Figure 31:
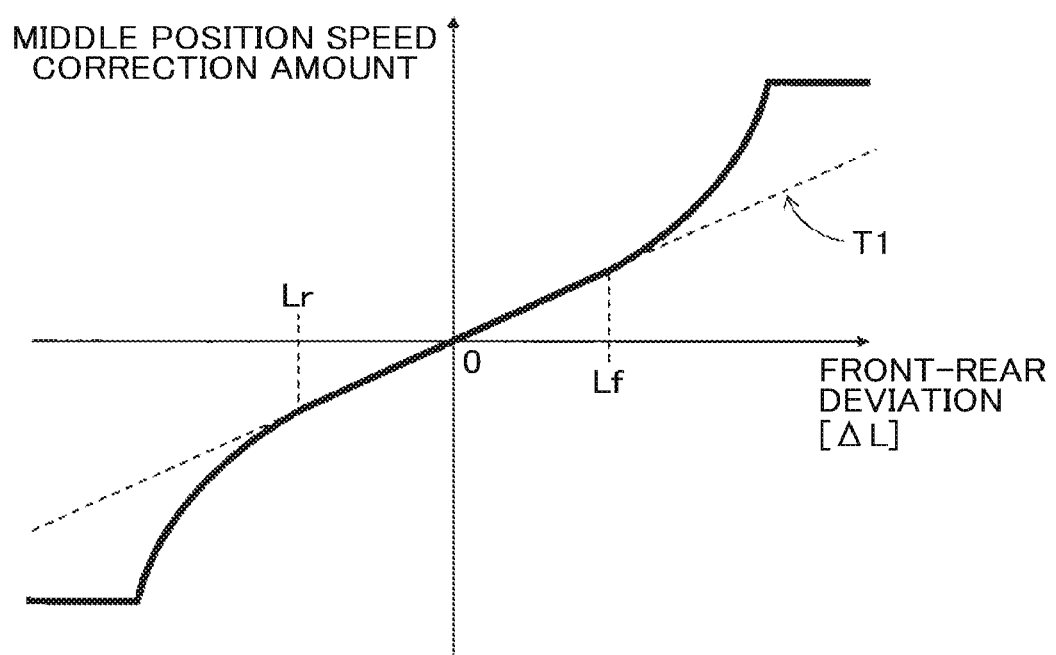
FIG. 31 illustrates an example of front-rear direction deviation/middle position speed correction amount properties.
Figure 32:
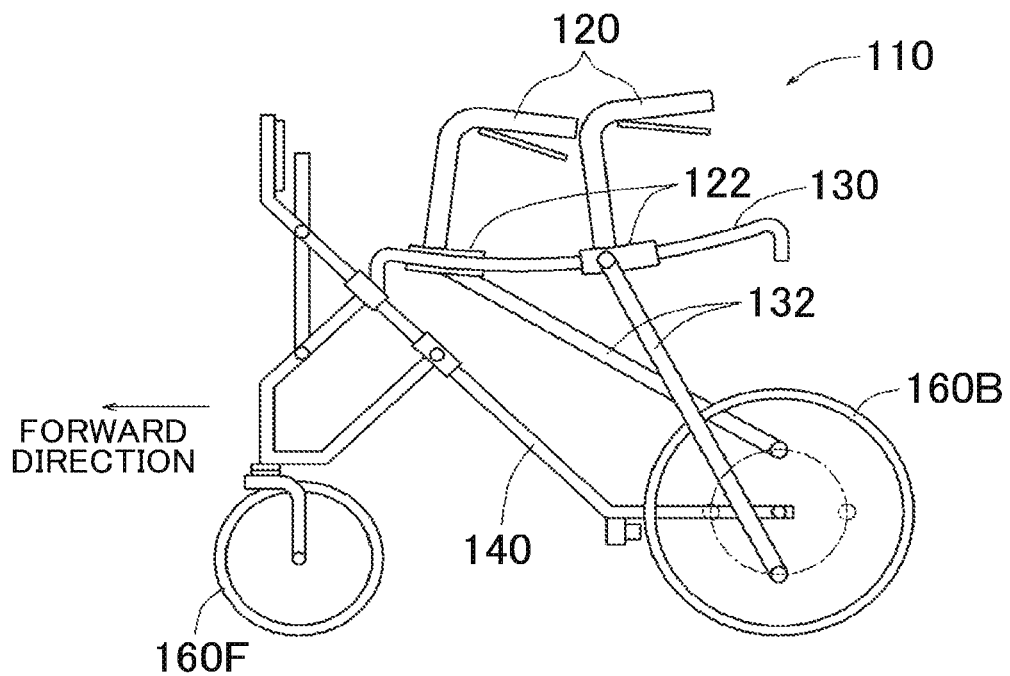
FIG. 32 is a left side view illustrating an overall configuration of a walking assist device (walking cart) according to the related art.
Figure 33:
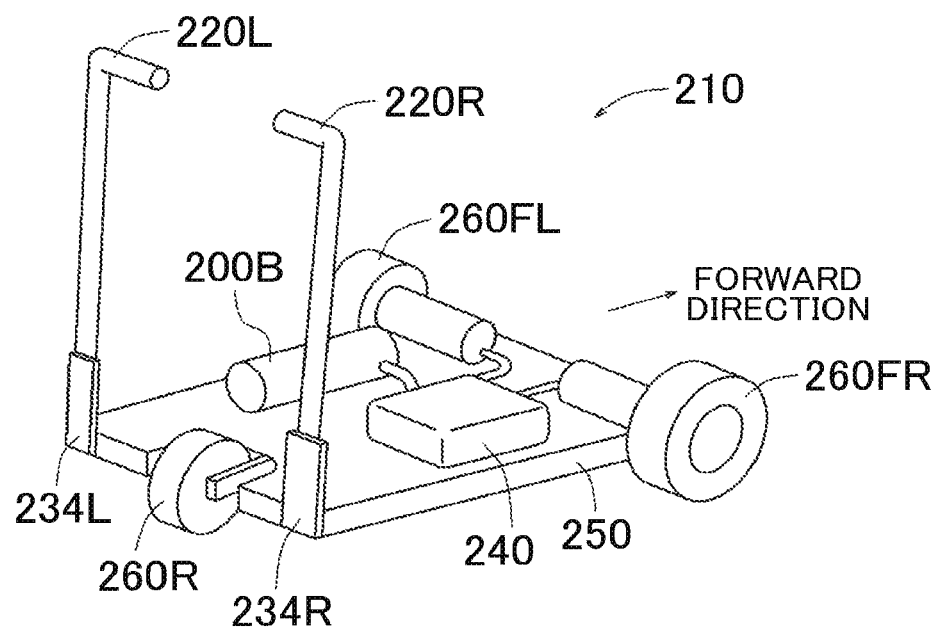
FIG. 33 is a perspective view illustrating an overall configuration of a walking assist device (walking helping device) according to the related art.

In step SB530, the drive control unit 40A calculates the middle position speed correction amount which matches the front-rear deviation, stores the calculated middle position speed correction amount, and ends the process (returns). For example, the storage unit stores the front-rear deviation/middle position speed correction amount properties indicated in FIG. 31, and the drive control unit 40A calculates and stores the middle position speed correction amount on the basis of the front-rear deviation/middle position speed correction amount properties and the front-rear deviation.

In the case where the process proceeds to step SB550, the drive control unit 40A calculates and stores "right handle front-rear position−handle reference position" as the right deviation, and proceeds to step SB560. In the case where the operation mode is the "assist mode", the handles are in the "restrained state", and thus the user cannot walk while grasping the handles and swinging his/her arms. In the case of the "assist mode", the walking assist device 10B is accelerated forward through middle position speed correction in the case where the handles are pushed forward in the following steps SB550 to SB580. The handle reference position is the predetermined position Op1 to which the handles are returned by a restoring force as illustrated in FIG. 7, for example.

In step SB560, the drive control unit 40A calculates and stores "left handle front-rear position−handle reference position" as the left deviation, and proceeds to step SB570.

In step SB570, the drive control unit 40A calculates and stores "(right deviation+left deviation)/2" as the front-rear deviation, and proceeds to step SB580

In step SB580, the drive control unit 40A calculates the middle position speed correction amount which matches the front-rear deviation, stores the calculated middle position speed correction amount, and ends the process (returns). For example, the storage unit stores the front-rear deviation/middle position speed correction amount properties indicated in FIG. 31, and the drive control unit 40A calculates and stores the middle position speed correction amount on the basis of the front-rear deviation/middle position speed correction amount properties and the front-rear deviation. The middle position speed correction amount (step SB580) in the restrained state is preferably larger than the middle position speed correction amount (step SB530) in the released state, even if the front-rear deviation has the same value.

Figure 27:
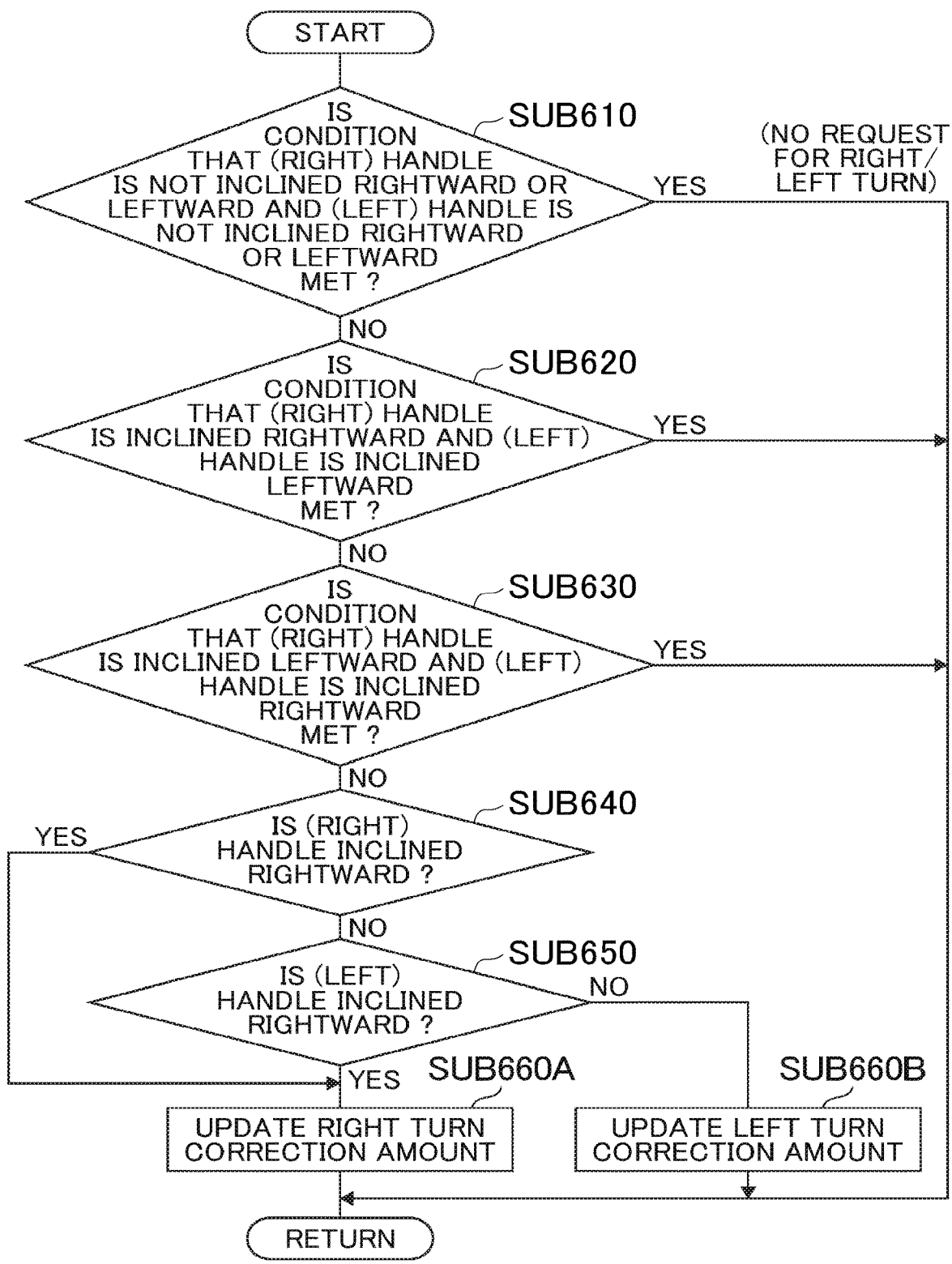
FIG. 27 is a flowchart illustrating a process procedure of a right/left turn correction process, of the overall process illustrated in FIG. 22.

Next, SB600 (right/left turn correction process) will be described in detail with reference to FIG. 27. When executing SB600 in step SD060 illustrated in FIG. 22, the drive control unit 40A proceeds to step SUB610 illustrated in FIG. 27.

In step SUB610, the drive control unit 40A determines whether or not a condition that the (right) handle is not inclined rightward or leftward and the (left) handle is not inclined rightward or leftward is met. In the case where the condition is met (Yes), the process ends (in this case, the process returns and proceeds to step SD070 in FIG. 22). In the case where the condition is not met (No), the process proceeds to step SUB620.

In step SUB620, the drive control unit 40A determines whether or not a condition that the (right) handle is inclined rightward and the (left) handle is inclined leftward is met. In the case where the condition is met (Yes), the process ends (in this case, the process returns and proceeds to step SD070 in FIG. 22). In the case where the condition is not met (No), the process proceeds to step SUB630.

In step SUB630, the drive control unit 40A determines whether or not a condition that the (right) handle is inclined leftward and the (left) handle is inclined rightward is met. In the case where the condition is met (Yes), the process ends (in this case, the process returns and proceeds to step SD070 in FIG. 22). In the case where the condition is not met (No), the process proceeds to step SUB640.

In the case where the process proceeds to step SUB640, the drive control unit 40A determines whether or not the (right) handle is inclined rightward. In the case where the (right) handle is inclined rightward (Yes), the process proceeds to step SUB660A. In the case where the (right) handle is not inclined rightward (No), the process proceeds to step SUB650.

In the case where the process proceeds to step SUB650, the drive control unit 40A determines whether or not the (left) handle is inclined rightward. In the case where the (left) handle is inclined rightward (Yes), the process proceeds to step SUB660A. In the case where the (left) handle is not inclined rightward (No), the process proceeds to step SUB660B.

In the case where the process proceeds to step SUB660A, the drive control unit 40A updates and stores the right turn correction amount, and ends the process (in this case, returns and proceeds to step SD070 in FIG. 22).

In the case where the process proceeds to step SUB660B, the drive control unit 40A updates and stores the left turn correction amount, and ends the process (in this case, returns and proceeds to step SD070 in FIG. 22).

Figure 28:
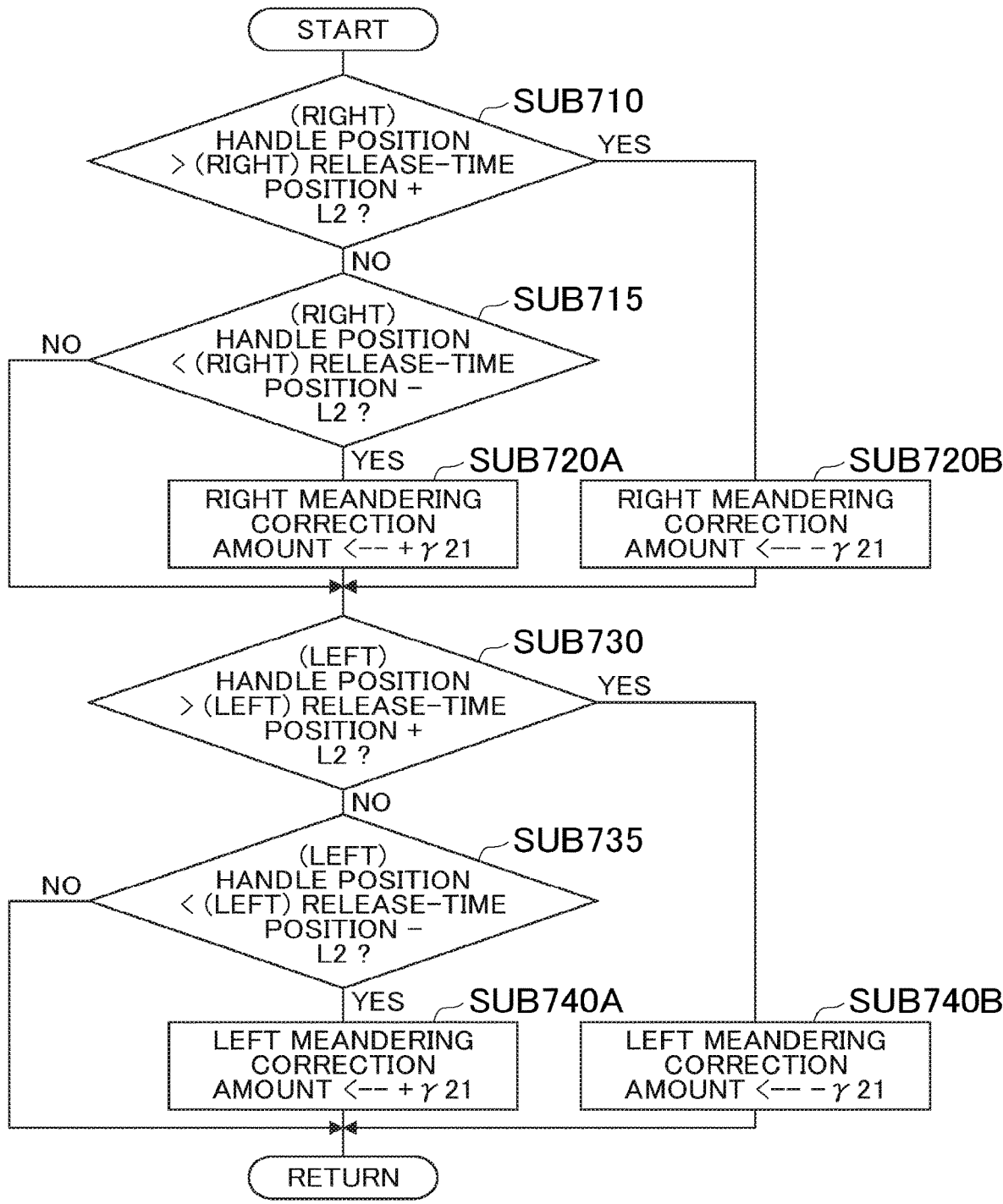
FIG. 28 is a flowchart illustrating a process procedure of a meandering correction process, of the overall process illustrated in FIG. 22.

Next, SB700 (meandering correction process) will be described in detail with reference to FIG. 28. When executing SB700 in step SD070 illustrated in FIG. 22, the drive control unit 40A proceeds to step SUB710 illustrated in FIG. 28.

In step SUB710, the drive control unit 40A determines whether or not the (right) handle position is forward of (larger than) a (right) release-time position plus a distance L2. In the case where the (right) handle position is forward of (larger than) the (right) release-time position plus the distance L2 (Yes), the process proceeds to step SUB720B. Otherwise (No), the process proceeds to step SUB715. The (right) release-time position is the position in the vicinity of the center of the rail 30Rb to which the (right) handle is returned by the elastic members when the user is not grasping the (right) handle. For example, the drive control unit 40A stores the position of the (right) handle at the time when the (right) handle is not grasped by the user as the (right) release-time position. The distance L2 is a distance set as a dead band as appropriate.

In the case where the process proceeds to step SUB715, the drive control unit 40A determines whether or not the (right) handle position is rearward of (smaller than) the (right) release-time position minus the distance L2. In the case where the (right) handle position is rearward of (smaller than) the (right) release-time position minus the distance L2 (Yes), the process proceeds to step SUB720A. Otherwise (No), the process proceeds to step SUB730.

In the case where the process proceeds to step SUB720A, the drive control unit 40A sets the right meandering correction amount to a (positive) meandering correction speed γ21 (+γ21), stores the set value as a new right meandering correction amount, and proceeds to step SUB730.

In the case where the process proceeds to step SUB720B, the drive control unit 40A sets the right meandering correction amount to a (negative) meandering correction speed γ21 (−γ21), stores the set value as a new right meandering correction amount, and proceeds to step SUB730.

In step SUB730, the drive control unit 40A determines whether or not the (left) handle position is forward of (larger than) a (left) release-time position plus a distance L2. In the case where the (left) handle position is forward of (larger than) the (left) release-time position plus the distance L2 (Yes), the process proceeds to step SUB740B. Otherwise (No), the process proceeds to step SUB735. The (left) release-time position is the position in the vicinity of the center of the rail 30Lb to which the (left) handle is returned by the elastic members when the user is not grasping the (left) handle. For example, the drive control unit 40A stores the position (predetermined position Op1; see FIG. 7) of the (left) handle at the time when the (left) handle is not grasped by the user as the (left) release-time position. The distance L2 is a distance set as a dead band as appropriate.

In the case where the process proceeds to step SUB735, the drive control unit 40A determines whether or not the (left) handle position is rearward of (smaller than) the (left) release-time position minus the distance L2. In the case where the (left) handle position is rearward of (smaller than) the (left) release-time position minus the distance L2 (Yes), the process proceeds to step SUB740A. Otherwise (No), the process ends (in this case, the process returns and proceeds to step SD080 in FIG. 22).

In the case where the process proceeds to step SUB740A, the drive control unit 40A sets the left meandering correction amount to a (positive) meandering correction speed γ21 (+γ21), stores the set value as a new left meandering correction amount, and ends the process (in this case, returns and proceeds to step SD080 in FIG. 22).

In the case where the process proceeds to step SUB740B, the drive control unit 40A sets the left meandering correction amount to a (positive) meandering correction speed γ21 (−γ21), stores the set value as a new left meandering correction amount, and ends the process (in this case, returns and proceeds to step SD080 in FIG. 22).

Figure 29:
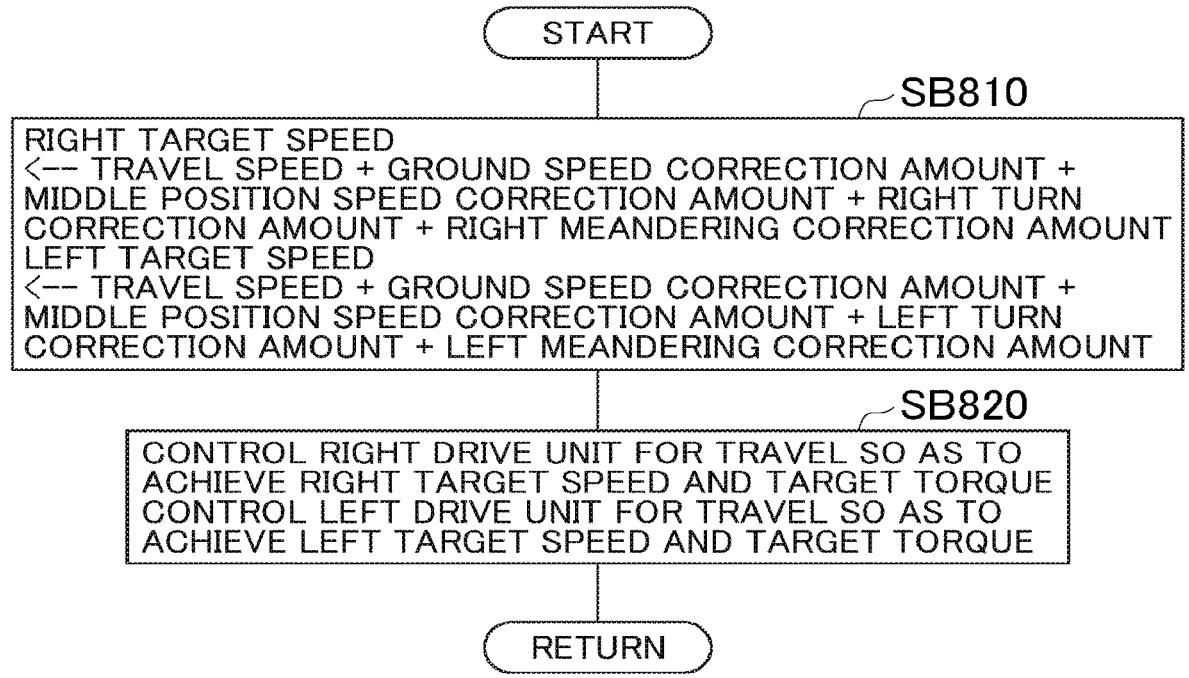
FIG. 29 is a flowchart illustrating a process procedure of a travel speed adjustment process, of the overall process illustrated in FIG. 22.

Next, SB800 (travel speed adjustment process) will be described in detail with reference to FIG. 29. When executing SB800 in step SD080 illustrated in FIG. 22, the drive control unit 40A proceeds to step SB810 illustrated in FIG. 29.

In step SB810, the drive control unit 40A calculates and stores "travel speed+ground speed correction amount+middle position speed correction amount+right turn correction amount+right meandering correction amount" as the right target speed, calculates and stores "travel speed+ground speed correction amount+middle position speed correction amount+left turn correction amount+left meandering correction amount" as the left target speed, and proceeds to step SB 820.

In step SB820, the drive control unit 40A controls the (right) drive unit 64R so as to achieve the right target speed and target torque, controls the (left) drive unit 64L so as to achieve the left target speed and target torque, and ends the process (returns).

The drive control unit 40A which executes the processes in steps SB810 and SB820 controls the right and left drive units 64R and 64L for travel so as to achieve the target speeds which are calculated on the basis of the travel speed, the ground speed correction amount, the middle position speed correction amount, the right (left) turn correction amount, and the right (left) meandering correction amount.

As described above, the walking assist device according to the first embodiment can be caused to operate in accordance with the state of arm swing by the user, and to travel forward as the user walks, by controlling the drive units in accordance with the acting forces which are input to the grasp portions which are grasped by the user. Thus, it is possible to reduce a burden on the user. The arm swing width is not fixed, and it is only necessary for the user to swing his/her arms with a natural swing width that matches his/her own stride length. Thus, it is possible to appropriately assist the user in performing training for high-quality natural walk, in which the user swings his/her arms correctly in synchronization with his/her legs in a correct posture with his/her body trunk straight.

The walking assist device according to the second embodiment can be caused to operate in accordance with the state of arm swing by the user, and to travel forward as the user walks, by controlling the drive units in accordance with the positions of the grasp portions (handles), which are grasped by the user, with respect to the frame. Thus, it is possible to reduce a burden on the user. The arm swing width is not fixed, and it is only necessary for the user to swing his/her arms with a natural swing width that matches his/her own stride length. Thus, it is possible to appropriately assist the user in performing training for high-quality natural walk, in which the user swings his/her arms correctly in synchronization with his/her legs in a correct posture with his/her body trunk straight.

The walking assist device according to the third embodiment can conveniently be used as a type of a walker to be pushed with both hands of the user without swinging his/her arms, with the handles (corresponding to the "grasp portions") restrained with respect to the frame. The user can easily drive the walking assist device by only pushing the handles forward, even without swinging his/her arms, in the restrained state.

The walking assist device according to the fourth embodiment can conveniently be used as a type of a walker to be pushed with both hands of the user without swinging his/her arms, with the handles (corresponding to the "grasp portions") restrained in a predetermined range in the front-rear direction of the frame. The user can easily drive the walking assist device by only pushing the handles forward, even without swinging his/her arms, in the restrained state.

The walking assist device according to the present invention is not limited to the configuration, the structure, the shape, the process procedure, etc. described in relation to the present embodiment, and may be modified, added, and deleted in various ways without departing from the scope and spirit of the present invention. Signs such as ≥(equal to or more than), ≤(equal to or less than), >(more than), and <(less than) may or may not include an equal sign. The numerical values used in the description of the present embodiment are exemplary, and the present invention is not limited to such values.

In the description of the present embodiment, the rails 30R and 30L (see FIGS. 1) and 30Ra and 30La (see FIG. 9) are shaped to be concavely curved upward. However, the rails 30R and 30L may have a straight shape. In addition, the walking assist device described in relation to the present embodiment includes rails and handles, and the handles are moved in the front-rear direction along the rails. However, handles may be provided at the respective distal ends of pole-like members provided swingably to project from rotary shafts provided on the frame, instead of the rails, and the handles may be swung in the front-rear direction with respect to the frame.

The drive control unit 40 (see FIG. 5) may store the respective first pressures (pressures for a case where the arms are not swung in the front-rear direction) detected by the acting force measurement units 25R and 25L (see FIG. 5) of the handles 20R and 20L (see FIG. 1), which are grasped by the user, after the drive control unit 40 is started as initial grasping force values. The drive control unit 40 may detect the amount of increase or the amount of decrease in the respective pressures, which are detected by the acting force measurement units 25R and 25L while the user is grasping the handles 20R and 20L and swinging his/her arms in the front-rear direction, from the initial grasping force values as acting forces (such as pushing forces, pulling forces, and restoring forces) on the handles 20R and 20L. Consequently, it is possible to more accurately determine whether or not the user is walking while swinging his/her arms.

In the case where the pressures detected by the forward acting force detection units 25$f$R and 25$f$L (see FIG. 3) exceed a predetermined pressure stored in advance, it may be determined that the handles 20R and 20L are located at the front end, or in the vicinity of the front end, of the rails 30R and 30L, respectively, and the walking assist device 10 (see FIG. 1) may be moved slightly forward with respect to the user by temporarily increasing drive torque for the rear wheels 60RR and 60RL which are the drive wheels. Similarly, in the case where the pressures detected by the rearward acting force detection units 25$b$R and 25$b$L (see FIG. 3) exceed a predetermined pressure stored in advance, it may be determined that the handles 20R and 20L are located at the rear end, or in the vicinity of the rear end, of the rails 30R and 30L, respectively, and the walking assist device 10 may be moved slightly rearward with respect to the user by temporarily decreasing drive torque for the rear wheels 60RR and 60RL which are the drive wheels.

The walking assist device 10 may be provided with a distance measurement unit such as an ultrasonic sensor to measure the position of the user in the front-rear direction of the walking assist device 10. The drive control unit 40 may adjust drive torque for the drive units 64R and 64L such that the position of the user in the front-rear direction of the walking assist device 10 is generally at the center, for example. Consequently, the walking assist device 10 can be synchronized with walk of the user more accurately, which assists training for more natural walk.

What is claimed is:

1. A walking assist device comprising:
a frame;
a pair of right and left arm portions provided on the frame;
a pair of right and left grasp portions provided on the pair of right and left arm portions, the grasp portions being graspable by a user and movable in a front-rear direction with respect to the frame;
a plurality of wheels provided at a lower end of the frame and including a pair of right and left drive wheels;
drive units that drive the respective drive wheels to cause the walking assist device to travel forward;
a battery that serves as a power source for the drive units;
a drive control unit that controls the drive units;
acting force measurement units that measure acting forces on the respective grasp portions; and
holding units that hold the respective grasp portions at a predetermined position set in advance with respect to the frame, wherein:
the walking assist device travels forward together with the user who walks while grasping the grasp portions and swinging his/her arms;
the holding units generate a restoring force for returning the respective grasp portions, which have been displaced from the predetermined position by arm swing by the user, to the predetermined position; and
the drive control unit controls the drive units on the basis of the acting forces which are calculated on the basis of detection signals from the acting force measurement units.

2. The walking assist device according to claim 1, wherein:
the acting force measurement units each include
a forward acting force detection unit that detects a forward acting force which is an acting force directed forward and input to the corresponding grasp portion, and
a rearward acting force detection unit that detects a rearward acting force which is an acting force directed rearward and input to the corresponding grasp portion; and
the drive control unit controls the drive units on the basis of a grasp portion acting force which is the acting force which is based on a difference between the forward acting force which is detected using the forward acting force detection unit and the rearward acting force which is detected using the rearward acting force detection unit.

3. The walking assist device according to claim 2, wherein the drive control unit determines whether or not the user is walking while swinging his/her arms on the basis of a difference between a magnitude of a right grasp portion acting force which is the grasp portion acting force which is input to the right grasp portion and a magnitude of a left grasp portion acting force which is the grasp portion acting force which is input to the left grasp portion, and controls the drive units on the basis of a determination result.

4. The walking assist device according to claim 3, wherein the drive control unit controls the drive units, in the case where the determination result indicates that the user is walking while swinging his/her arms, so as to reduce meandering of the walking assist device caused along with arm-swing walk of the user.

5. The walking assist device according to claim 1, wherein the arm portions are provided with respective grasp portion restraint units configured to restrain the grasp portions, which are held at the predetermined position by the restoring force of the holding units, at the predetermined position in the front-rear direction with respect to the frame.

6. The walking assist device according to claim 5, wherein:
the grasp portion restraint units are configured to be set to one of a restrained state, in which the grasp portions are restrained at the predetermined position, and a released state, in which the grasp portions are released rather than being restrained at the predetermined position; and
the drive control unit controls the drive units on the basis of the acting forces which are calculated on the basis of the detection signals from the acting force measurement units in the case where the grasp portion restraint units are set to the restrained state.

7. A walking assist device comprising:
a frame;
a pair of right and left arm portions provided on the frame;
a pair of right and left grasp portions provided on the pair of right and left arm portions, the grasp portions being graspable by a user and movable in a front-rear direction with respect to the frame;
a plurality of wheels provided at a lower end of the frame and including a pair of right and left drive wheels;
drive units that drive the respective drive wheels to cause the walking assist device to travel forward;
a battery that serves as a power source for the drive units;
a drive control unit that controls the drive units;
grasp portion position detection units that detect positions of the respective grasp portions with respect to the frame; and
holding units that hold the respective grasp portions at a predetermined position set in advance with respect to the frame, wherein:
the walking assist device travels forward together with the user who walks while grasping the grasp portions and swinging his/her arms;
the holding units generate a restoring force for returning the respective grasp portions, which have been displaced from the predetermined position by arm swing by the user, to the predetermined position; and
the drive control unit controls the drive units on the basis of the positions of the respective grasp portions which are calculated on the basis of detection signals from the grasp portion position detection units.

8. The walking assist device according to claim 7, wherein the drive control unit
calculates a user front-rear position, which is a position of the user in the front-rear direction with respect to the frame, on the basis of a right grasp portion front-rear position, which is a position of the right grasp portion in the front-rear direction with respect to the frame, and a left grasp portion front-rear position, which is a position of the left grasp portion in the front-rear direction with respect to the frame, the right grasp portion front-rear position and the left grasp portion front-rear position being calculated using the respective grasp portion position detection units, and
controls the drive units such that the user front-rear position approximates a predetermined position in the front-rear direction with respect to the frame.

9. The walking assist device according to claim 8, wherein the drive control unit
determines whether or not the user is walking while swinging his/her arms on the basis of the right grasp portion front-rear position and the left grasp portion front-rear position, and
corrects control amounts of the respective drive units, in the case where it is determined that the user is walking while swinging his/her arms, so as to reduce meandering of the walking assist device caused along with arm-swing walk of the user.

10. The walking assist device according to claim 7, wherein
the arm portions are provided with respective grasp portion restraint units configured to restrain the grasp portions, which are held at the predetermined position by the restoring force of the holding units, in the vicinity of the predetermined position in the front-rear direction with respect to the frame.

11. The walking assist device according to claim 10, wherein:
the grasp portion restraint units are configured to be set to one of a restrained state, in which the grasp portions are restrained in the vicinity of the predetermined position, and a released state, in which the grasp portions are released rather than being restrained in the vicinity of the predetermined position; and
the drive control unit controls the drive units on the basis of the positions of the respective grasp portions in the front-rear direction with respect to the frame, which are calculated on the basis of the detection signals from the grasp portion position detection units in the case where the grasp portion restraint units are set to the restrained state.

* * * * *